US012764309B2

(12) United States Patent
Zhang et al.

(10) Patent No.: US 12,764,309 B2
(45) Date of Patent: Oct. 13, 2026

(54) CONSTRAINTS FOR VIDEO CODING AND DECODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Zhipin Deng, Beijing (CN); Hongbin Liu, Beijing (CN); Li Zhang, San Diego, CA (US); Jizheng Xu, San Diego, CA (US); Ye-kui Wang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/508,721

(22) Filed: Nov. 14, 2023

(65) Prior Publication Data

US 2024/0107036 A1 Mar. 28, 2024

Related U.S. Application Data

(63) Continuation of application No. 17/861,728, filed on Jul. 11, 2022, now abandoned, which is a (Continued)

(30) Foreign Application Priority Data

Jan. 12, 2020 (WO) ................ PCT/CN2020/071620

(51) Int. Cl.

*H04N 19/186* (2014.01)
*H04N 19/132* (2014.01)

(Continued)

(52) U.S. Cl.

CPC ......... *H04N 19/186* (2014.11); *H04N 19/132* (2014.11); *H04N 19/159* (2014.11);

(Continued)

(58) Field of Classification Search

CPC .. H04N 19/186; H04N 19/132; H04N 19/159; H04N 19/167; H04N 19/176; H04N 19/1883; H04N 19/70

See application file for complete search history.

(56) References Cited

U.S. PATENT DOCUMENTS

| | | | |
|---|---|---|---|
| 5,047,112 | A | 9/1991 | Ciszek |
| 6,047,112 | A | 4/2000 | Wise |

(Continued)

FOREIGN PATENT DOCUMENTS

| | | | |
|---|---|---|---|
| AU | 2016273973 A1 | 7/2018 | |
| BR | 1120220063873 B1 | 1/2025 | |

(Continued)

OTHER PUBLICATIONS

US 12,184,845 B2, 12/2024, Deng et al. (withdrawn)

(Continued)

*Primary Examiner* — Boubacar Abdou Tchoussou
(74) *Attorney, Agent, or Firm* — Conley Rose, P.C.

(57) ABSTRACT

A method of video processing is provided that includes performing a conversion between a block of a video and a bitstream of the video. The bitstream conforms to a formatting rule specifying that a size of a merge estimation region (MER) is indicated in the bitstream and the size of the MER is based on a dimension of a video unit. The MER comprises a region used for deriving a motion candidate for the conversion.

12 Claims, 19 Drawing Sheets

Related U.S. Application Data continuation of application No. PCT/CN2021/071008, filed on Jan. 11, 2021.

(51) Int. Cl.
*H04N 19/159* (2014.01)
*H04N 19/167* (2014.01)
*H04N 19/169* (2014.01)
*H04N 19/176* (2014.01)
*H04N 19/70* (2014.01)

(52) U.S. Cl.
CPC ......... *H04N 19/167* (2014.11); *H04N 19/176* (2014.11); *H04N 19/1883* (2014.11); *H04N 19/70* (2014.11)

(56) References Cited

U.S. PATENT DOCUMENTS 8,988,531 B2 3/2015 Zhou
9,525,861 B2 12/2016 Zhang
9,554,133 B2 1/2017 Ye et al.
9,584,819 B2 2/2017 Wang et al.
9,743,066 B2 8/2017 Zhang
9,912,966 B2 3/2018 Hannuksela
9,924,168 B2 3/2018 Zhang
9,998,757 B2 6/2018 Chen
10,057,594 B2 8/2018 Xiu
10,097,846 B2 10/2018 Deshpande
10,165,252 B2 12/2018 An
10,200,709 B2 2/2019 Chen
10,205,968 B2 * 2/2019 Liu ..................... H04N 19/436
10,419,757 B2 9/2019 Chen et al.
10,455,231 B2 10/2019 Xu
10,483,493 B2 11/2019 Sargent
10,523,964 B2 12/2019 Chuang
10,523,967 B2 12/2019 Lee
10,567,804 B2 2/2020 Chen
10,587,859 B2 3/2020 An
10,757,417 B2 8/2020 Zhang
10,798,385 B2 10/2020 Lee
10,805,639 B2 10/2020 Lee
10,819,891 B2 10/2020 Wang
10,841,609 B1 11/2020 Liu
10,880,547 B2 12/2020 Xu
10,904,565 B2 1/2021 Chuang
11,076,169 B2 7/2021 Rusanovskyy et al.
11,095,898 B2 8/2021 Lim
11,095,917 B2 8/2021 Zhang
11,109,061 B2 8/2021 Chen
11,128,884 B2 9/2021 Liu
11,146,810 B2 10/2021 Chen
11,197,030 B2 12/2021 Li et al.
11,212,523 B2 12/2021 Chiu
11,234,010 B2 1/2022 Hu et al.
11,343,529 B2 5/2022 Zhang
11,343,533 B2 5/2022 Esenlik et al.
11,470,309 B2 10/2022 Zhang
11,496,733 B2 11/2022 Zhang
11,523,108 B2 12/2022 Zhang
11,523,109 B2 12/2022 Li
11,533,513 B2 12/2022 Zhang
11,539,950 B2 12/2022 Zhang
11,546,593 B2 1/2023 Zhang et al.
11,553,177 B2 1/2023 Zhang
11,627,313 B2 4/2023 Zhang
11,722,674 B2 8/2023 Zhang
11,838,554 B2 12/2023 Deng
11,956,432 B2 4/2024 Zhang
11,962,771 B2 4/2024 Zhang et al.
11,968,377 B2 4/2024 Zhang
11,985,340 B2 5/2024 Zhang
12,047,558 B2 7/2024 Zhang
12,075,030 B2 8/2024 Zhang et al.
12,192,459 B2 1/2025 Zhang et al.
12,206,859 B2 1/2025 Zhang
12,301,799 B2 5/2025 Deng et al.
12,348,761 B2 7/2025 Zhang et al.
12,413,714 B2 9/2025 Zhang
12,513,291 B2 12/2025 Deng
2003/0112867 A1 6/2003 Hannuksela
2004/0008766 A1 1/2004 Wang
2004/0177383 A1 9/2004 Martinolich
2005/0019006 A1 1/2005 Suh
2007/0086521 A1 4/2007 Wang
2008/0204472 A1 8/2008 Maertens
2008/0267297 A1 10/2008 Sampedro
2008/0273597 A1 11/2008 Kovalenko
2010/0086052 A1 4/2010 Park
2012/0294353 A1 11/2012 Fu
2013/0089145 A1 4/2013 Guo
2013/0101018 A1 4/2013 Chong
2013/0101035 A1 4/2013 Wang
2013/0182755 A1 7/2013 Chen
2013/0182774 A1 7/2013 Wang
2013/0202051 A1 8/2013 Zhou
2013/0242046 A1 9/2013 Zhang
2013/0266075 A1 10/2013 Wang
2013/0294524 A1 11/2013 Van der Auwera
2013/0322531 A1 12/2013 Chen
2013/0336406 A1 12/2013 Zhang
2014/0003492 A1 1/2014 Chen
2014/0003504 A1 1/2014 Ugur
2014/0003535 A1 1/2014 Haque
2014/0146869 A1 5/2014 Zhang
2014/0185682 A1 7/2014 Chen
2014/0192892 A1 7/2014 Van der Auwera
2014/0198844 A1 7/2014 Hsu
2014/0218473 A1 8/2014 Hannuksela
2014/0301441 A1 10/2014 Wang
2014/0301476 A1 10/2014 Deshpande
2015/0010050 A1 1/2015 Chen
2015/0010091 A1 1/2015 Hsu
2015/0103924 A1 4/2015 Misra
2015/0195577 A1 7/2015 Hannuksela
2015/0215631 A1 7/2015 Zhou
2015/0271515 A1 9/2015 Pang
2015/0281708 A1 10/2015 Chuang
2015/0341655 A1 11/2015 Joshi
2015/0341664 A1 11/2015 Zhang
2016/0100189 A1 4/2016 Pang
2016/0100196 A1 4/2016 Wu
2016/0105690 A1 4/2016 Denoual
2016/0165248 A1 6/2016 Lainema
2016/0173887 A1 6/2016 Deshpande
2016/0219278 A1 7/2016 Chen
2016/0234498 A1 * 8/2016 Misra ..................... H04N 19/46
2016/0234522 A1 8/2016 Lu
2016/0316215 A1 10/2016 Minoo
2016/0337661 A1 11/2016 Pang
2016/0381385 A1 12/2016 Ugur
2017/0006302 A1 1/2017 Lee
2017/0006304 A1 1/2017 Miyoshi
2017/0064339 A1 3/2017 Van der Auwera
2017/0237999 A1 8/2017 Hendry
2017/0272758 A1 9/2017 Lin
2017/0289566 A1 10/2017 He
2017/0295369 A1 10/2017 Nakagami
2017/0302951 A1 10/2017 Joshi
2017/0332095 A1 11/2017 Zou
2018/0048909 A1 2/2018 Liu
2018/0091829 A1 3/2018 Liu
2018/0098063 A1 4/2018 Chen
2018/0098090 A1 4/2018 Lin
2018/0184083 A1 6/2018 Panusopone
2018/0192072 A1 7/2018 Chen
2018/0199057 A1 7/2018 Chuang
2018/0270500 A1 9/2018 Li
2018/0310017 A1 10/2018 Chen
2018/0343463 A1 11/2018 Xiu
2018/0376126 A1 12/2018 Hannuksela
2019/0058884 A1 2/2019 Zhou
2019/0058896 A1 2/2019 Huang
2019/0082191 A1 3/2019 Chuang

(56) References Cited

U.S. PATENT DOCUMENTS

| | | | |
|---|---|---|---|
| 2019/0104319 | A1 | 4/2019 | Zhang |
| 2019/0110064 | A1 | 4/2019 | Zhang |
| 2019/0116376 | A1 | 4/2019 | Chen |
| 2019/0138889 | A1 | 5/2019 | Jiang |
| 2019/0141320 | A1 | 5/2019 | Wang |
| 2019/0149838 | A1 | 5/2019 | Zhang |
| 2019/0158865 | A1 | 5/2019 | Park |
| 2019/0208234 | A1 | 7/2019 | Van Brandenburg |
| 2019/0238845 | A1 | 8/2019 | Zhang et al. |
| 2019/0246143 | A1 | 8/2019 | Zhang |
| 2019/0273937 | A1 | 9/2019 | Yu |
| 2020/0112733 | A1 | 4/2020 | Li |
| 2020/0221117 | A1 | 7/2020 | Liu |
| 2020/0221122 | A1 | 7/2020 | Ye |
| 2020/0228827 | A1 | 7/2020 | Hannuksela |
| 2020/0252619 | A1 | 8/2020 | Zhang |
| 2020/0296405 | A1 | 9/2020 | Huang |
| 2020/0304805 | A1 | 9/2020 | Li |
| 2020/0329246 | A1 | 10/2020 | Yu |
| 2020/0382795 | A1 | 12/2020 | Zhang |
| 2020/0396453 | A1 | 12/2020 | Zhang |
| 2021/0029351 | A1 | 1/2021 | Zhang |
| 2021/0029362 | A1 | 1/2021 | Liu |
| 2021/0029378 | A1 | 1/2021 | He |
| 2021/0044818 | A1 | 2/2021 | Furht |
| 2021/0044838 | A1 | 2/2021 | Chen |
| 2021/0058637 | A1 | 2/2021 | Zhang |
| 2021/0076029 | A1 | 3/2021 | Han |
| 2021/0076050 | A1 | 3/2021 | Zhang |
| 2021/0084295 | A1 | 3/2021 | Chen |
| 2021/0084340 | A1 | 3/2021 | Li |
| 2021/0092393 | A1 | 3/2021 | Chao |
| 2021/0136363 | A1 | 5/2021 | Jang |
| 2021/0136407 | A1 | 5/2021 | Aono |
| 2021/0136422 | A1 | 5/2021 | Huang |
| 2021/0185347 | A1 | 6/2021 | Liu |
| 2021/0195177 | A1 | 6/2021 | Zhang |
| 2021/0211707 | A1 | 7/2021 | Liu |
| 2021/0211713 | A1 | 7/2021 | Zhang |
| 2021/0211714 | A1 | 7/2021 | Zhang |
| 2021/0219001 | A1 | 7/2021 | Jang |
| 2021/0227250 | A1 | 7/2021 | Liu |
| 2021/0235109 | A1 | 7/2021 | Liu |
| 2021/0243467 | A1 | 8/2021 | Zhang |
| 2021/0243468 | A1 | 8/2021 | Zhang |
| 2021/0266530 | A1 | 8/2021 | Liu |
| 2021/0266560 | A1 | 8/2021 | Jang |
| 2021/0266577 | A1 | 8/2021 | Zhang |
| 2021/0266584 | A1 | 8/2021 | Zhang |
| 2021/0266585 | A1 | 8/2021 | Liu |
| 2021/0266591 | A1 | 8/2021 | Zhang |
| 2021/0274208 | A1 | 9/2021 | Zhang |
| 2021/0274209 | A1 | 9/2021 | He |
| 2021/0274213 | A1 | 9/2021 | Xiu |
| 2021/0281865 | A1 | 9/2021 | Liu |
| 2021/0281875 | A1 | 9/2021 | Liu |
| 2021/0289209 | A1 | 9/2021 | Lee |
| 2021/0337184 | A1 | 10/2021 | Meng |
| 2021/0337228 | A1 | 10/2021 | Wang |
| 2021/0352302 | A1 | 11/2021 | Zhang |
| 2021/0352315 | A1 | 11/2021 | Zhang |
| 2021/0368198 | A1 | 11/2021 | Zhang |
| 2021/0368199 | A1 | 11/2021 | Zhang |
| 2021/0368203 | A1 | 11/2021 | Zhang |
| 2021/0385481 | A1 | 12/2021 | Liu |
| 2021/0385482 | A1 | 12/2021 | Liu |
| 2021/0392367 | A1 | 12/2021 | Zhang |
| 2021/0409730 | A1 | 12/2021 | Wang |
| 2022/0007048 | A1 | 1/2022 | He |
| 2022/0014735 | A1 | 1/2022 | Chen |
| 2022/0053207 | A1 | 2/2022 | Deshpande |
| 2022/0060695 | A1 | 2/2022 | Zhang |
| 2022/0060696 | A1 | 2/2022 | Zhang |
| 2022/0060718 | A1 | 2/2022 | Zhang |
| 2022/0070442 | A1 | 3/2022 | Jang |
| 2022/0094909 | A1 | 3/2022 | Hannuksela |
| 2022/0103817 | A1 | 3/2022 | Zhang |
| 2022/0132148 | A1 | 4/2022 | Wang |
| 2022/0159246 | A1 | 5/2022 | Zhang |
| 2022/0166971 | A1 | 5/2022 | Zhang |
| 2022/0166985 | A1 | 5/2022 | Zhang |
| 2022/0174322 | A1 | 6/2022 | Zhang |
| 2022/0217342 | A1 | 7/2022 | Hannuksela |
| 2022/0239912 | A1 | 7/2022 | Zhang |
| 2022/0239926 | A1 | 7/2022 | Jhu |
| 2022/0248007 | A1 | 8/2022 | Misra |
| 2022/0256146 | A1 | 8/2022 | Zhang |
| 2022/0256148 | A1 | 8/2022 | Zhang |
| 2022/0256195 | A1 | 8/2022 | Zhang |
| 2022/0272332 | A1 | 8/2022 | Lai |
| 2022/0272378 | A1 | 8/2022 | Samuelsson |
| 2022/0303571 | A1 | 9/2022 | Zhang |
| 2022/0394301 | A1 | 12/2022 | Deshpande |

FOREIGN PATENT DOCUMENTS

| | | | |
|---|---|---|---|
| CN | 1593065 | A | 3/2005 |
| CN | 1609957 | A | 4/2005 |
| CN | 1750659 | A | 3/2006 |
| CN | 101668219 | A | 3/2010 |
| CN | 101990103 | A | 3/2011 |
| CN | 103202016 | A | 7/2013 |
| CN | 103843349 | A | 6/2014 |
| CN | 103891292 | A | 6/2014 |
| CN | 103891293 | A | 6/2014 |
| CN | 103975596 | A | 8/2014 |
| CN | 104041033 | A | 9/2014 |
| CN | 104054347 | A | 9/2014 |
| CN | 104641648 | A | 5/2015 |
| CN | 104662914 | A | 5/2015 |
| CN | 104702963 | A | 6/2015 |
| CN | 104756495 | A | 7/2015 |
| CN | 104823449 | A | 8/2015 |
| CN | 104885464 | A | 9/2015 |
| CN | 105009587 | A | 10/2015 |
| CN | 105027567 | A | 11/2015 |
| CN | 105074819 | A | 11/2015 |
| CN | 105144720 | A | 12/2015 |
| CN | 105393536 | A | 3/2016 |
| CN | 105531999 | A | 4/2016 |
| CN | 105556975 | A | 5/2016 |
| CN | 105684448 | A | 6/2016 |
| CN | 106165419 | A | 11/2016 |
| CN | 106303543 | A | 1/2017 |
| CN | 106464893 | A | 2/2017 |
| CN | 106537915 | A | 3/2017 |
| CN | 106664424 | A | 5/2017 |
| CN | 106797229 | A | 5/2017 |
| CN | 106797476 | A | 5/2017 |
| CN | 107105295 | A | 8/2017 |
| CN | 107211156 | A | 9/2017 |
| CN | 107251555 | A | 10/2017 |
| CN | 107534783 | A | 1/2018 |
| CN | 107801039 | A | 3/2018 |
| CN | 107852490 | A | 3/2018 |
| CN | 108028929 | A | 5/2018 |
| CN | 108432250 | A | 8/2018 |
| CN | 108781284 | A | 11/2018 |
| CN | 108781294 | A | 11/2018 |
| CN | 108965871 | A | 12/2018 |
| CN | 109076214 | A | 12/2018 |
| CN | 109076216 | A | 12/2018 |
| CN | 109076218 | A | 12/2018 |
| CN | 109076236 | A | 12/2018 |
| CN | 109155855 | A | 1/2019 |
| CN | 109600611 | A | 4/2019 |
| CN | 109691102 | A | 4/2019 |
| CN | 109792531 | A | 5/2019 |
| CN | 109792533 | A | 5/2019 |
| CN | 109996072 | A | 7/2019 |
| CN | 110097889 | A | 8/2019 |
| CN | 110140355 | A | 8/2019 |
| CN | 110572658 | A | 12/2019 |
| CN | 110662032 | A | 1/2020 |

(56) References Cited

FOREIGN PATENT DOCUMENTS

| | | | |
|---|---|---|---|
| CN | 110662036 | A | 1/2020 |
| CN | 110677675 | A | 1/2020 |
| CN | 110677678 | A | 1/2020 |
| CN | 114270831 | | 4/2022 |
| CN | 114450943 | A | 5/2022 |
| CN | 114503577 | | 5/2022 |
| CN | 114208166 | B | 4/2024 |
| CN | 114631321 | B | 4/2024 |
| CN | 114556952 | B | 11/2024 |
| CN | 115398892 | B | 2/2025 |
| EP | 1672930 | A2 | 6/2006 |
| EP | 1672930 | A3 | 11/2010 |
| EP | 2941891 | A1 | 11/2015 |
| EP | 2870761 | B1 | 9/2018 |
| EP | 3468190 | A1 | 4/2019 |
| EP | 3942823 | A1 | 1/2022 |
| GB | 201902829 | | 3/2019 |
| GB | 201908535 | | 6/2019 |
| GB | 201911952 | | 8/2019 |
| GB | 2577318 | A | 3/2020 |
| GB | 2581852 | A | 9/2020 |
| GB | 2586484 | A | 2/2021 |
| GB | 2606281 | B | 5/2023 |
| IN | 201647016463 | A | 8/2016 |
| IN | 544863 | | 7/2024 |
| IN | 545368 | | 7/2024 |
| IN | 554139 | | 11/2024 |
| IN | 557704 | | 1/2025 |
| IN | 558521 | | 1/2025 |
| IN | 559063 | | 1/2025 |
| IN | 560569 | | 2/2025 |
| JP | 2015015575 | A | 1/2015 |
| JP | 2017520162 | A | 7/2017 |
| JP | 2017522839 | A | 8/2017 |
| JP | 6280679 | B2 | 2/2018 |
| JP | 2020017970 | A | 1/2020 |
| JP | 2021041314 | A | 3/2021 |
| JP | 2022552537 | A | 12/2022 |
| JP | 7372443 | B2 | 10/2023 |
| JP | 7454681 | B2 | 3/2024 |
| JP | 7571218 | B2 | 10/2024 |
| JP | 7575475 | B2 | 10/2024 |
| JP | 7583126 | B2 | 11/2024 |
| JP | 7632851 | B2 | 2/2025 |
| KR | 20140056342 | A | 5/2014 |
| KR | 20150057591 | A | 5/2015 |
| KR | 20170018819 | A | 2/2017 |
| KR | 20180128955 | A | 12/2018 |
| KR | 20180129584 | A | 12/2018 |
| KR | 20200126813 | A | 11/2020 |
| KR | 20220044023 | A | 4/2022 |
| KR | 102701594 | B1 | 8/2024 |
| MX | 418306 | | 11/2024 |
| MX | 423277 | | 4/2025 |
| RU | 2686559 | C2 | 4/2019 |
| RU | 2820844 | C2 | 6/2024 |
| WO | 2014049980 | A1 | 4/2014 |
| WO | 2014106692 | A1 | 7/2014 |
| WO | 2015008477 | A1 | 1/2015 |
| WO | 2015008479 | A1 | 1/2015 |
| WO | 2015011339 | A1 | 1/2015 |
| WO | 2015038877 | A1 | 3/2015 |
| WO | 2015056941 | A1 | 4/2015 |
| WO | 2015142556 | A2 | 9/2015 |
| WO | 2016100424 | A1 | 6/2016 |
| WO | 2016120468 | A1 | 8/2016 |
| WO | 2016127889 | A1 | 8/2016 |
| WO | 2016208241 | A1 | 12/2016 |
| WO | 2017083784 | A1 | 5/2017 |
| WO | 2017137444 | A1 | 8/2017 |
| WO | 2017157259 | A1 | 9/2017 |
| WO | 2018001208 | A1 | 1/2018 |
| WO | 2018099269 | A1 | 6/2018 |
| WO | 2018113658 | A1 | 6/2018 |
| WO | 2019004283 | A1 | 1/2019 |
| WO | 2019008174 | A1 | 1/2019 |
| WO | 2019010156 | A1 | 1/2019 |
| WO | 2019061537 | A1 | 4/2019 |
| WO | 2019073112 | A1 | 4/2019 |
| WO | 2019078169 | A1 | 4/2019 |
| WO | 2019132577 | A1 | 7/2019 |
| WO | 2019145262 | A1 | 8/2019 |
| WO | 2019194502 | A1 | 10/2019 |
| WO | 2019194507 | A1 | 10/2019 |
| WO | 2019194568 | A1 | 10/2019 |
| WO | 2019222060 | A1 | 11/2019 |
| WO | 2020003273 | A1 | 1/2020 |
| WO | 2020133313 | A1 | 7/2020 |
| WO | 2020146582 | A1 | 7/2020 |
| WO | 2020222588 | A1 | 11/2020 |
| WO | 2021049586 | A1 | 3/2021 |
| WO | 2021052794 | A1 | 3/2021 |

OTHER PUBLICATIONS

Foreign Communication From a Related Counterpart Application, European Application No. 20810559.3, Extended European Search Report dated May 19, 2022, 7 pages.

Foreign Communication From a Related Counterpart Application, European Application No. 20809576.0, Extended European Search Report dated May 19, 2022, 7 pages.

Foreign Communication From a Related Counterpart Application, European Application No. 20852734.1, Extended European Search Report dated Jan. 20, 2023, 8 pages.

Foreign Communication From a Counterpart Application, PCT Application No. PCT/CN2021/071008, English Translation of International Search Report dated Mar. 30, 2021, 13 pages.

Foreign Communication From a Counterpart Application, PCT Application No. PCT/CN2020/139389, English Translation of International Search Report dated Mar. 24, 2021, 9 pages.

Foreign Communication From a Counterpart Application, PCT Application No. PCT/CN2020/121768, English Translation of International Search Report dated Jan. 8, 2021, 13 pages.

Foreign Communication From a Counterpart Application, PCT Application No. PCT/CN2020/121767, English Translation of International Search Report dated Jan. 27, 2021, 12 pages.

Foreign Communication From a Counterpart Application, PCT Application No. PCT/CN2020/108142, English Translation of International Search Report dated Oct. 28, 2020, 9 pages.

Foreign Communication From a Counterpart Application, PCT Application No. PCT/CN2021/071360, English Translation of International Search Report dated Apr. 19, 2021, 10 pages.

Foreign Communication From a Counterpart Application, PCT Application No. PCT/CN2020/119932, English Translation of International Search Report dated Dec. 30, 2022, 9 pages.

Foreign Communication From a Counterpart Application, PCT Application No. PCT/CN2020/119931, English Translation of International Search Report dated Jan. 12, 2021, 10 pages.

Foreign Communication From a Counterpart Application, PCT Application No. PCT/CN2020/108182, English Translation of International Search Report dated Nov. 16, 2020, 11 pages.

Foreign Communication From a Counterpart Application, PCT Application No. PCT/CN2020/108175, English Translation of International Search Report dated Nov. 18, 2020, 10 pages.

Foreign Communication From a Counterpart Application, PCT Application No. PCT/CN2020/108159, English Translation of International Search Report dated Nov. 12, 2020, 9 pages.

Foreign Communication From a Counterpart Application, Indian Application No. 202247023112, English Translation of Office Action dated Aug. 18, 2022, 7 pages.

Foreign Communication From a Counterpart Application, Indian Application No. 202247022804, English Translation of Office Action dated Aug. 9, 2022, 6 pages.

Foreign Communication From a Counterpart Application, Indian Application No. 202247007118, English Translation of Office Action dated Jul. 6, 2022, 7 pages.

(56) References Cited

OTHER PUBLICATIONS

Foreign Communication From a Counterpart Application, European Application No. 20852929.7, English Translation of Extended European Search Report dated Sep. 26, 2022, 15 pages.
Office Action dated Aug. 1, 2022, 27 pages, U.S. Appl. No. 17/723,089, filed Apr. 18, 2022.
Office Action dated Apr. 15, 2022, 11 pages, U.S. Appl. No. 17/665,242, filed Feb. 4, 2022.
Office Action dated May 25, 2022, 25 pages, U.S. Appl. No. 17/665,275, filed Feb. 4, 2022.
Office Action dated May 24, 2022, 47 pages, U.S. Appl. No. 17/665,220, filed Feb. 4, 2022.
Office Action dated Jun. 8, 2022, 16 pages, U.S. Appl. No. 17/711,319, filed Apr. 1, 2022.
Office Action dated Jun. 7, 2022, 14 pages, U.S. Appl. No. 17/711,294, filed Apr. 1, 2022.
Notice of Allowance dated Sep. 29, 2022, 24 pages, U.S. Appl. No. 17/665,220, filed Feb. 4, 2022.
Foreign Communication From a Related Counterpart Application, European Application No. 20871705.8, Extended European Search Report dated Oct. 31, 2022, 10 pages.
Foreign Communication From a Related Counterpart Application, European Application No. 20876854.9, Extended European Search Report dated Oct. 31, 2022, 13 pages.
Non-Final Office Action dated Oct. 12, 2022, 26 pages, U.S. Appl. No. 17/723,175, filed Apr. 18, 2022.
Foreign Communication From a Related Counterpart Application, European Application No. 21738561.6, Extended European Search Report dated Dec. 22, 2022, 12 pages.
Foreign Communication From a Related Counterpart Application, Indian Application No. 202247039697, Indian Office Action dated Oct. 12, 2022, 7 pages.
Foreign Communication From a Related Counterpart Application, PCT Application No. PCT/CN2021/082242, English Translation of International Search Report dated Jun. 22, 2021, 11 pages.
Foreign Communication From a Related Counterpart Application, PCT Application No. PCT/CN2021/082243, English Translation of International Search Report dated Jun. 21, 2021, 13 pages.
Foreign Communication From a Related Counterpart Application, European Application No. 21774361.6, Extended European Search Report dated Mar. 22, 2023, 8 pages.
Non-Final Office Action dated Mar. 13, 2023, 15 pages, U.S. Appl. No. 17/950,411, filed Sep. 22, 2022.
Non-Final Office Action dated Feb. 16, 2023, 17 pages, U.S. Appl. No. 17/950,443, filed Sep. 22, 2022.
Foreign Communication From a Related Counterpart Application, International Application No. PCT/CN2020/091537, International Search Report dated Jul. 29, 2020, 8 pages.
Foreign Communication From a Related Counterpart Application, International Application No. PCT/CN2020/091538, International Search Report dated Aug. 19, 2020, 10 pages.
Foreign Communication From a Related Counterpart Application, International Application No. PCT/CN2020/091539, International Search Report dated Aug. 21, 2020, 9 pages.
Foreign Communication From a Related Counterpart Application, International Application No. PCT/CN2020/091540, International Search Report dated Jul. 30, 2020, 10 pages.
Foreign Communication From a Related Counterpart Application, International Application No. PCT/CN2020/133271, International Search Report dated Mar. 8, 2021, 10 pages.
Non-Final Office Action dated Feb. 4, 2022, 7 pages, U.S. Appl. No. 17/521,043, filed Nov. 8, 2021.
Non-Final Office Action dated May 6, 2022, 22 pages, U.S. Appl. No. 17/521,012, filed Nov. 8, 2021.
Final Office Action dated Jan. 11, 2023, 37 pages, U.S. Appl. No. 17/861,728, filed Jul. 11, 2022.
Non-Final Office Action dated Apr. 20, 2023, 33 pages, U.S. Appl. No. 17/861,728, filed Jul. 11, 2022.
Non-Final Office Action dated Sep. 26, 2022, 12 pages, U.S. Appl. No. 17/861,728, filed Jul. 11, 2022.
Non-Final Office Action dated Dec. 19, 2023, 67 pages, U.S. Appl. No. 17/831,074, filed Jun. 2, 2022.
Final Office Action dated Nov. 21, 2023, 21 pages, U.S. Appl. No. 17/861,728, filed Jul. 11, 2022.
European Office Action from European Application No. 20876854.9 dated Jan. 25, 2024, 6 pages.
Extended European Search Report from European Application No. 23214125.9 dated Feb. 6, 2024, 17 pages.
Document: JVET-M0247, Liu, H., et al., "CE2-related: Joint test of AMVR for Affine Inter mode (Test 2.1.1 and Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Xu, X., et al., "Intra Block Copy in HEVC Screen Content Coding Extensions," IEEE Journal on Emerging and Selected Topics in Circuits and Systems vol. 6, No. 4, ISSN: 2156-3357, DOI: 10.1109/JETCAS.2016.2597645, 2016, 11 pages.
Sun, Y., et al., "Improvements of HEVC SCC Palette Mode and Intra Block Copy," IEEE Journal on Emerging and Selected Topics in Circuits and Systems, vol. 6, No. 4, ISSN: 2156-3357, DOI: 10.1109/JETCAS.2016.2598193, Dec. 2016, 13 pages.
Pu, W., et al., "Palette Mode Coding in HEVC Screen Content Coding Extension," IEEE Journal on Emerging and Selected Topics in Circuits and Systems, vol. 6, No. 4, ISSN: 2156-3357, DOI: 10.1109/JETCAS.2016.2605661, Dec. 2016, 13 pages.
Liu, S., et al., "Overview of HEVC extensions on screen content coding," Transactions on Signal and Information Processing, Cambridge University Press, URL: https://www.cambridge.org/core/journals/apsipa-transactions-on-signal-and-information-processing/article/overview-of-hevc-extensions-on-screen-content-coding/E12DCF69B0A59DD269EFE14CD1AFBFBE DOI: https://doi.org/10.1017/ATSIP.2015.11, 2015, 12 pages.
Document: JVET-R2002-v2, Chen, J., et al., "Algorithm description for Versatile Video Coding and Test Model 9 (VTM 9)," Joint Video Experts Team (JVET) of ITU-T SG 16 WP 3 and ISO/IEC JTC 1/SC 29/WG 11 18th Meeting: by teleconference, Apr. 15-24, 2020, 98 pages.
Document: JVET-Q2002-v2-=, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11, 17th Meeting: Brussels, BE, Jan. 7-17, 2020, 24 pages.
Document: JVET-Q2001-v15, Bross, B., et al., "Versatile Video Coding (Draft 8)," Joint Video Experts Team (JVET) of ITU-T SG16 WP 3 and ISO/IEC JTC 1/SC 29/WG 11, 17th Meeting: Brussels, BE, Jan. 7-17, 2020, 46 pages.
Chinese Office Action from Chinese Application No. 202080056646.5 dated Apr. 3, 2024, 13 pages. With English Translation.
Korean Notice of Allowance from Korean Application No. 9-5-2024-016935679 dated Feb. 23, 2024, 10 pages. With English Translation.
Non-Final Office Action from U.S. Appl. No. 18/182,803 dated Apr. 12, 2024, 79 pages.
Japanese Notice of Allowance from Japanese Application No. 2022-508461 dated Mar. 15, 2024, 5 pages. With English Translation.
Non-Final Office Action from U.S. Appl. No. 18/320,782 dated Apr. 17, 2024, 70 pages.
Japanese Notice of Allowance from Japanese Application No. 2022-557167 dated Apr. 8, 2024, 14 pages. With English Translation.
Document: JVET-N0276, Boyce, J., "AHG15: On Interoperability Point Signalling," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.
Document: JVET-O0555-v1, Boyce., J., et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting: Gothenburg, SE, Jul. 3-12, 2019, 11 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(56) References Cited

OTHER PUBLICATIONS

Document: JVET-P2001-v8, Bross, B., et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 475 pages.
Document: JVET-N0073-v1, Chen, L., et al. "AHG17: [SYS-VVC] Signalling Subpicture Coded Video Sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, 7 pages.
Document: JVET-P0141-v1, Chen, L., et al., "AHG17/AHG12: On Signalling the Subpicture IDs," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-P0143-v1, Chen, L., et al. "AHG17/AHG12: On Signalling of Subpicture Structure in the SPS," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-P0144-v1, Chen, L., et al. "AHG17/AHG12: On Associating Slices with a Subpicture," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-M0154-v2, Choi, B., et al., "AHG17: On Decoded Picture Buffer Management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-O0334, Choi, B., et al., "AHG8/AHG12: On Sub-Picture Partitioning Support with Layers," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-P0219, Choi, B., et al. "AHG8/AHG17: On Signaling Reference Picture Resampling," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-M0350_v2, Fu, T., et al. "CE4-Related: Quadtree-Based Merge Estimation Region for VVC," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-P0884-v5, Gao, H., et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/ SC 29/WG 11 16th Meeting: Geneva, CH, Oct. 1-11, 2019, 9 pages.
Document: JVET-M0261, Hannuksela, M., et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, 11 pages.
Document: JVET-P0693, Hannuksela, M., et al. "AHG12: Summary of HLS Proposals on Subpictures," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-O0182r1, He, Y., et al. "AHG12: On Picture and Sub-Picture Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-O0636_r1, Misra, K., et al. "Cross-Component Adaptive Loop Filter for Chroma," Joint Video Experts Team (JVET) of ITU-T SG 16 WP 3 and ISO/IEC JTC 1/SC 29/WG 1115th Meeting: Gothenburg, SE, Jul. 3-12, 2019, 9 pages.
Document: JVET-P1008-v2, Misra, K., et al. "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-O2000, Sullivan, G., et al. "Meeting Report of the 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, 409 pages.
Document: JVET-N0107-v1, Wang, Y-K., et al., "AHG12: Sub-Picture-Based Coding for VVC," Joint Video Experts Team (JVET) of ITU-T Sg 16 WP 3 and ISO/IEC JTC 1/SC 29/WG 11 14th Meeting: Geneva, CH, Mar. 19-27, 2019, 4 pages.
Document: JVET-N0826-v1, Wang, Y-K., et al. "AHG12: Harmonized Proposal for Sub-Picture-based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-O0141-v2, Wang, Y-K., et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothernburg, SE, Jul. 3-12, 2019, 3 pages.
Document: JCTVC-AI0023-v2, Wennersten, P., et al. "Encoder-Only GOP-Based Temporal Filter," Joint Collaborative Team on Video Coding (JCT-VC) of ITU-T SG 16 WP 3 and ISO/IEC JTC 1/SC 29/WG 11 35th Meeting: Geneva, CH, Mar. 22-27, 2019, 7 pages.
Document: JVET-N0472_v2, Xu, J., et al. "Non-CE8: On IBC Reference Buffer Design," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-L0266-v1, Zhang, L., et al., "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-M0272, Zhang, L., et al. "CE4-Related: Restrictions on History-Based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-N0258-v1, Zhu, W., et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
http://phenix.it-sudparis.eu/jvet/doc_end_user/current_document.phpid=5755, Feb. 15, 2024.
Bossen, F., et al., Retrieved from the internet: https://vcgit.hhi.fraunhofer.de/jvet/VVCSoftware_VTM/tags/VTM-5.0, Sep. 25, 2022, 2 pages.
Document: JVET-Q0290, Hsiang, S., et al., "AHG9/AHG12: Modifications related to subpicture signalling and RPR," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-Q0043, Nishi, T., et al., "AHG9: Constraint about usage of reference picture resampling and subpictures," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-O0133, Hendry, F., et al., "AHG8: Support for reference picture resampling—handling of picture size signalling, conformance windows, and DPB management," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-O1164, Chen, P., et al., "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, 1 page.
Document: JVET-O0204, Samuelsson, J., et al., "AHG 8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-O0303-v2, Chen, P., et al., "AHG 8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
"High performance hardware architectures for intra Block Copy and Palette Coding for HEVC Screen Content Coding extension"-Rishan Senanayake et al.; 978-1-5090-4825-0/17/$31.00 2017 IEEE(Year 2017).
Document: JVET-Q0787-v2, Suehring, K., et al., "AHG9: Subpicture location signalling bugfix," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-Q2000-v2, Sullivan, G., et al., "Meeting Report of the 17th Meeting of the Joint Video Experts Team (JVET), Brussels, BE, Jan. 7-17, 2020," Joint Video Experts Team (JVET) of ITU-T

(56) References Cited

OTHER PUBLICATIONS

SG 16 WP 3 and ISO/IEC JTC 1/SC 29/WG 11 17th Meeting: Brussels, BE, Jan. 7-17, 2020, 378 pages.
Document: JVET-Q0590-v1, Wang, Y.K., et al., "AHG12: A summary of proposals on subpicture ID signalling," Joint Video Experts Team (JVET) of ITU-T SG 16 WP 3 and ISO/IEC JTC 1/SC 29/WG 11 17th Meeting: Brussels, BE, Jan. 7- 17, 2020, 4 pages.
"Information technology—High efficiency coding and media delivery in heterogeneous environments—Part 2: High Efficiency Video Coding," ISO/IEC JTC 1/SC 29/WG 11 N 17661, Text of DIS ISO/IEC 23008-2:201x (4th ed.), Apr. 20, 2018, 8 pages.
Document: JVET-Q0297, Huang, H., et al., "AHG16: Merge estimation region with constraint in HMVP update," Joint Video Experts Team (JVET) of ITU-T SG 16 WP 3 and ISO/IEC JTC 1/SC 29/WG 11 17th Meeting: Brussels, BE, 67—Jan. 17, 2020, 11 pages.
Document: JVET-L0278, Huang, H, et al., "CE4.2.5: Simplification of affine merge list construction and move ATMVP to affine merge list," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19- 27, 2019, 25 pages.
"Information technology—High efficiency coding and media delivery in heterogeneous environments—Part 2: High efficiency video coding", Rec. ITU-T H.265, ISO/IEC JTC 1/SC 29/WG 11 N17661 | ISO/IEC 23008-2 (in force edition), Apr. 20, 2018, 8 pages.
Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.
Document: JVET-G1001-v1, Chen, et al., "Algorithm description of Joint Exploration Test Model 7 (JEM7)" Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JEM-7.0, Retrieved from the internet: https://jvet.hhi.fraunhofer.de/svn/svn_HMJEMSoftware/tags/ HM-16.6-JEM-7.0, Apr. 10, 2023, 1 page.
Document: JVET-L0124-v2, Liao, R., et al., "CE10.3.1.b: Triangular prediction unit mode," Joint Video Exploration Team (JVET) of ITU-T SG 16 WP 3 and ISO/IEC JTC 1/SC 29/WG 11 12th Meeting: Macao, CN, Oct. 3-12, 2018, 8 pages.
Document: JVET-O2001-v6, Bross, B., et al., "Versatile Video Coding (Draft 6)," Joint Video Experts Team (JVET) ofITU-T SG 16 WP 3 and 1S0/IEC JTC 1/SC 29/WG 11 15th Meeting: Gothenburg, SE, Jul. 3-12, 2019, 426 pages.
Document: JVET-P0378, Zhang, K., et al., "AHG12: Removal of dependency between sub-pictures," Joint Video Experts Team (JVET) of ITU-T SG 16 WP 3 and 1S0/IEC JTC 1/SC 29/WG 11 16th Meeting: Geneva, CH, Oct. 1-11, 2019, 3 pages.
Extended European Search Report from European Application No. 23214088.9 dated Jun. 7, 2024, 12 pages.
Chinese Notice of Allowance from Chinese Patent Application No. 202080069924.0 dated Aug. 15, 2024, 7 pages.
Japanese Office Action from Japanese Patent Application No. 2023-180083 dated Aug. 13, 2024, 23 pages.
"Series H: Audiovisual and Multimedia Systems Infrastructure of audiovisual services—Coding of moving video High efficiency video coding," Recommendation ITU-T H.265, Feb. 2018, 16 pages.
Document: JVET-O0553_r1, Li, X., et al., "Non-CE4: On prediction refinement with optical flow," Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
Document: JVET-P0545-v1, Fan, K., et al., "CE6-2.3-related: Reduced 8x8 matrices for LFNST," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-Q0297, Huang, H., et al., "AHG16: Merge estimation region with constrain in HMVP update," Joint Video Experts Team (JVET) of ITU-T SG 16 WP 3 and ISO/IEC JTC 1/SC 29/WG 11 17th Meeting: Brussels, Jan. 6-17, 2020, 10 pages.
Notice of Allowance from Chinese Patent Application No. 202180023979.2 dated Dec. 11, 2024, 8 pages.
Document: JVET-N0236-r4, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 23 pages.
Document: JVET-K0247-v1, Lai, C-Y., et al., "CE4.3.4: Removal of AMVR flag constraint," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Vietnamese Office Action from Vietnamese Patent Application No. 1-2022-02118 dated Sep. 9, 2024, 4 pages.
Vietnamese Office Action from Vietnamese Patent Application No. 1-2022-00834 dated Aug. 30, 2024, 4 pages.
Vietnamese Office Action from Vietnamese Patent Application No. 1-2022-02495 dated Sep. 9, 2024, 3 pages.
Vietnamese Office Action from Vietnamese Patent Application No. 1-2022-04334 dated Aug. 30, 2024, 4 pages.
Japanese Notice of Allowance from Japanese Patent Application No. 2023-122288 dated Sep. 10, 2024, 5 pages.
Document: JVET-O2001-vE, Bross B., et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, 455 Pages.
Decision to Grant a Patent for Japanese Patent Application No. 2023-121558, mailed on Oct. 1, 2024, 5 pages.
Document: JVET-P0129-v1, He, Y., et al., "AHG12: On Subpicture Grid Syntax," Joint Video Experts Team (JVET) of ITU-T SG 16 WP 3 and ISO/IEC JTC 1/SC 29/WG 11, 16th Meeting: Geneva, CH, Oct. 1-11, 2019, 3 Pages.
Hearing Notice for Indian Patent Application No. 202247019983, mailed Oct. 4, 2024, 3 pages.
Final Office Action for U.S. Appl. No. 17/861,728, mailed Oct. 17, 2024, 23 pages.
Notice of Reasons for Refusal for Japanese Application No. 2023-189118, mailed Oct. 22, 2024, 24 pages.
Communication pursuant to Article 94(3) EPC for European Application No. 20871705.8, mailed Oct. 30, 2024, 12 pages.
Communication pursuant to Article 94(3) EPC for European Application No. 21738561.6, mailed on Nov. 5, 2024, 5 pages.
Notice of Allowance for Brazilian Application No. 112022006387-3, mailed Nov. 5, 2024, 12 pages.
Notice of Allowance for U.S. Appl. No. 17/994,085, mailed Nov. 14, 2024, 14 pages.
Hearing Notice for Indian Patent Application No. 202247007137, mailed Dec. 2, 2024, 2 pages.
Office Action for Mexican Application No. MX/a/2022/001465, mailed on Nov. 27, 2024, 12 pages.
Document: JVET-L0368-v2, Chen, H., et al., "CE4: Affine merge enhancement with simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-L0332-v1, Liu, H., et al., "CE4-related: Adaptive Motion Vector Resolution for Affine Inter Mode," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-K0247-v1, Lai, C., et al., "CE4.3.4: Removal of AMVR flag constraint," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Document: JVET-L1001-v5, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 193 pages.
Document: JVET-M0381, Laroche, G., et al., "CE2: On Subblock Merge index coding (Test CE2.2.2)," Joint Video Experts Team

(56) References Cited

OTHER PUBLICATIONS (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0240, Lee, H., et al., "CE2-related: Simplification of subblock-based temporal merging candidates," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-M0273, Zhang, L., et al., "CE2-related: Early awareness of accessing temporal blocks in sub-block merge list construction," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
Document: JVET-M0651, Li, G., "Crosscheck of JVET-N0236 (CE2-related: Prediction refinement with optical flow for affine mode)," Joint Video Experts Team (JVET) of ITU-T SG 16 WP 3 and ISO/IEC JTC 1/SC 29/WG 11 14th Meeting: Geneva, CH, Mar. 19-27, 2019, 2 pages.
Document: JVET-N1001-v5, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 374 pages.
Document: JVET-L0632-v1, Chen, H., et al., "Crosscheck of JVET-L0142 (CE4: Simplification of the common base for affine merge (Test 4.2.6))," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-K0337, Han, Y., et al., "CE4.1.3: Affine motion compensation prediction," Joint Video Exploration Team (JVET) of ITU-T SG 16 WP 3 and ISO/IEC JTC 1/SC 29/WG 11 11th Meeting: Ljubljana, SI, Jul. 10-18, 2018, 6 pages.
Document: JVET-L0368-v2, Chen, H., "CE4: Affine merge enhancement with simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Bossen, F., Retrieved from the Internet: vcgit.hhi.fraunhofer.de/jvet/VVCSoftware_VTM/tags/VTM-5.0, Apr. 10, 2023, 2 pages.
Document: JVET-M0246_r1, Liu, H., et al., "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 10 pages.
Document: JVET-N0055-v2, Choi, B., et al., "AHG12: On subpicture partitioning," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
Document: JVET-O1170-v1, Xu, J., et al., "Bitstream conformance with a virtual IBC buffer concept," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
Document: JVET-M0457-v1, Ye, J., et al., "CE8: Palette predictor list enhancement (Test 8.2.6)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-P0129, He, Y., et al., "AHG12: On subpicture grid syntax," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-M0377-v1, Sjoberg, R., et al., "AHG17: Picture header NAL unit type," Joint Video Experts Team (JVET) of ITU-T SG 16 WP 3 and ISO/IEC JTC 1/SC 29/WVG 11 14th Meeting: Marrakesh, MA, Jan. 9-18, 2019, pages.
Document: JVET-Q2001-vD, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 511 pages.
"Series H: Audiovisual and Multimedia Systems Infrastructure of audiovisual services—Coding of moving video High efficiency video coding," Rec. ITU-T H.265 | ISO/IEC 23008-2, Feb. 2018, 692 pages.
Document: JVET-G1001, Chen, J., et al., "Algorithm description of Joint Exploration Test Model 7 (JEM7)," Joint Video Experts Team (JVET) of ITU-T SG 16 WP 3 and ISO/IEC JTC 1/SC 29/WG 11 7th meeting: Torino, IT, Jul. 13-21, 2017, 48 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., VTM software: https://vcgit.hhi.fraunhofer.de/jvet/VVCSoftware_VTM.git, Dec. 20, 2022, 3 pages.
Document: JVET-Q0270, Pettersson, M., et al., "AHG9: On Picture Header Modifications," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-O0070, Luo, J., et al., "CE4: Prediction refinement with optical flow for affine mode (Test 2.1)," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-O2002-v2, Chen, J., et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 87 pages.
Alshin, A., et al., "Bi-directional optical flow for improvement motion compensation," 28th Picture Coding Symposium, PCS2010, Dec. 8-10, 2010, Nagoya, Japan, 4 pages.
Document: JVET-P0171-v2, Jingya L., et al., "AHG12: Modification for subpicture," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-P0377-v1, Zhang, K., et al., "AHG12: Cleanups on syntax design of sub-pictures," Joint Video Experts Team (JVET) of ITU-T SG 16 WP 3 and ISO/IEC JTC 1/SC 29/WG 11, 16th Meeting: Geneva, CH, Oct. 1-11, 2019, 4 pages.
Document: JVET-N0195-v1, Li, J., et al., "CE2: Memory bandwidth reduction for the affine mode(Test2.4.3)", Joint Video Experts Team(JVET) of ITU-T SG 16 WP 3 and ISO/IEC JTC 1/SC 29/WVG 11 14th Meeting: Geneva, CH, Mar. 19-27, 2019, 4 pages.
Document: JVET-O0530-v2, Li, G., et al., "Non-CE4: Adaptive subblock size for affine motion compensation," Joint Video Experts Team (JVET) of ITU-T SG 16 WP 3 and ISO/IEC JTC 1/SC 29/WG 11 15th Meeting: Gothenburg, SE, Jul. 3-12, 2019, 9 pages.
Document: JVET-O0336, Coi, B., et al., "AHG8: Region-wise scalability support with reference picture resampling," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-N1001-v8, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, JVET-00133-v2_SpecText, 399 pages.
Jizheng Xu, et al., "Overview of the Emerging HEVC Screen Content Coding Extension", IEEE Transactions on Circuits and Systems for Video Technology, vol. 26, No. 1, Jan. 2016, IEEE, ISSN: 1051-8215, DOI: 10.1109/TCSVT.2015.2478706, 18 pages.
Document: JCTVC-R1014, Joshi, R., et al., "Screen content coding test model 2 (SCM 2)," Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014, 10 pages.
Document: JVET-N0052, Wenger, S., et al., "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, 11 pages.
Document: JVET-Q0708-v1, Coban, M., "Cross-check of JVET-Q0243 (Additional support of dependent quantization with 8 states)," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-Q0311-v2, Wang, Y., et al., "Non-CE5: On CC-ALF padding for ALF virtual boundaries," Joint Video Experts

(56) References Cited

OTHER PUBLICATIONS

Team (JVET) of ITU-T SG 16 WP 3 and ISO/IEC JTC 1/SC 29/WG 11 17th Meeting: Brussels, BE, Jan. 7-17, 2020, 6 pages.
Document: JVET-Q0310-v1, Wang, Y., et al., "Non-CE5: Suggested text for CC-ALF padding process with rastar scan slices," Joint Video Experts Team (JVET) of Itu-T Sg 16 WP 3 and Iso/Iec Jtc 1/SC 29/WG 11 17th Meeting: Brussels, BE, Jan. 7-17, 2020, 3 pages.
Document: JVET-Q0780-v1, Segall, A., et al., "BoG Report on CE5 Related Contributions," Joint Video Experts Team (JVET) of ITU-T SG 16 WP 3 and ISO/IEC JTC 1/SC 29/WG 11 17th Meeting: Brussels, BE, Jan. 7-17, 2020, 10 pages.
Document: JVET-P0080-v1, Misra, K., et al., "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, 495 pages.
WG 11 (via JVET), "Test model 6 of versatile video coding (VTM 6)," ISO/IEC JTC 1/SC 29/WG 11 N 18693, Jul. 12, 2019, 89 pages.
Document: JVET-P2001-v9, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 495 pages.
Document: JVET-P1033-v1, Norkin, A., et al., "BoG report on CE5 loop[ filtering related contributions," Joint Video Experts Team (JVET) of ITU-T SG 16 WP 3 and ISO/IEC JTC 1/SC 29/WG 11 16th Meeting: Geneva, CH, Oct. 1-11, 2019, 34 pages.
Document: JVET-P0016-v1, Zhou, M., et al., "JVET AHG report: Implementation studies (AHG16)," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Non-Final Office Action dated Jan. 24, 2022, 8 pages, U.S. Appl. No. 17/521,012, filed Nov. 8, 2021.
Non-Final Office Action dated Mar. 3, 2022, 17 pages, U.S. Appl. No. 17/520,975, filed Nov. 8, 2021.
Document: JVET-R0388-v1, Deng, Z., et al., "AHG9: Cleanups on deblocking signalling," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-L0142_r2, Lee, J., et al., "CE4: Simplification of the common base for affine merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, 6 pages.
Document: JVET-L0266-v2, Zhang, L., et al., "CE4: History-based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0369-v2, Chen, H., et al., "CE4: Separate list for sub-block merge candidates (Test 4.2.8)," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
Document: JVET-P0545-v2, Fan, K., et al., "CE6-2.3-related: Reduced 8x8 matrices for LFNST," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
JVET-P1008-v3, MISRA et al., "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019 (See document file "CCALF-Text-JVET-P1008-v2-over-JVET-O2001-vE.docx" in the zip file "JVET-P1008-v3.zip".).
Notice of Allowance from U.S. Appl. No. 18/516,447 dated Aug. 25, 2025, 19 pages.
Japanese Office Action from Japanese Patent Application No. 2024-180906 dated Aug. 26, 2025, 18 pages.
Japanese Office Action from Japanese Patent Application No. 2023-189118 dated Oct. 21, 2025, 7 pages.
Document: JVET-O2001-vE, Bross B., et al., "Versatile Video Coding (Draft 6)," Joint Video Experts Team (JVET) of ITU-T SG 16 WP 3 and ISO/IEC JTC 1/SC 29/WVG 11, 15th Meeting: Gothenburg, SE, Jul. 3-12, 2019, Document: JVET-O2001-vE, 474 Pages.
Document: JVET-P2001-vE, Bross B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, 491 pages.
First Office Action for Chinese Application No. 202180009033.0, mailed May 26, 2025, 13 pages.
First Office Action for Chinese Application No. 202180023931.1, mailed Apr. 29, 2025, 26 pages.
Norkin A., et al., "CE11: Summary Report on Deblocking," Joint Video Experts Team (JVET) of ITU-T SG 16 WP 3 and ISO/IEC JTC 1/SC 29/WG 11 14th Meeting: Geneva, Switzerland, Mar. 19-27, 2019, Document: JVET-N0031-v3, 9 pages.
Notice of Allowance for U.S. Appl. No. 18/182,803, mailed Apr. 30, 2025, 46 pages.
Notice of Reasons for Refusal for Japanese Patent Application No. 2023-189118, mailed on May 27, 2025, 26 pages.
Park N., et al., "Non-CE4: HMVP buffer update for TPM block," Joint Video Experts Team (JVET) of ITU-T SG 16 WP 3 and ISO/LEC JTC 1/SC 29/WG 11, 16th Meeting: Geneva, CH, Oct. 1-11, 2019, Document: JVET-P0278, 9 pages.
Bross B., et al., "Versatile Video Coding (Draft 3)," Joint Video Experts Team (JVET) of ITU-T 16 WP 3 and ISO/IEC JTC 1/SC 29/WG 11, 12th Meeting, Macao, CN, Oct. 3, 2018-Oct. 12, 2018, Document: JVET-L1001-v9, 247 Pages.
Corrected Notice of Allowance for U.S. Appl. No. 17/950,411 , mailed Jan. 27, 2025, 13 pages.
First Office Action for Chinese Application No. 202080038018.4, mailed on Feb. 17, 2025, 17 pages.
Notice of Allowance for Mexican Application No. MX/a/2022/001465, mailed on Feb. 17, 2025, 8 pages.
Notice of Allowance for U.S. Appl. No. 17/831,074, mailed Feb. 27, 2025, 56 pages.
Li G., et al., "Non-CE4: Adaptive Subblock Size for Affine Motion Compensation," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0530-v2, 5 Pages.
Non-Final Office Action for U.S. Appl. No. 18/516,447, mailed May 5, 2025, 113 pages.
Norkin A., et al., "Two HEVC Encoder Methods for Block Artifact Reduction," Ericsson Research, Nov. 2013, 6 Pages.
Pu F., et al., "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, Document: JVET-L0246-v2, 9 Pages.
Wang Y-K., et al., "AHG17: On Header Parameter Set (HPS)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0132-v2, 4 Pages.
Document: JVET-L1001-v2, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 174 pages.
Document: JVET-N1001-v2, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 361 pages.
Document: JVET-N1001-v7, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 384 pages.
Document: JVET-P0126, Hannuksela, M., et al., "AHG12: Signalling of subpicture IDs and layout," Joint Video Experts Team (JVET) of ITU-T SG 16 WP 3 and ISO/IEC JTC 1/SC 29/WG 11 16th Meeting: Geneva, CH, Oct. 1-11, 2019, 2 pages.
Chinese Notice of Allowance from Chinese Patent Application No. 202080038018.4 dated Jan. 9, 2026, 8 pages.
Chinese Office Action from Chinese Patent Application No. 202180008983.1 dated Mar. 17, 2026, 16 pages.

* cited by examiner previous palette

| Index | G/Y | B/Cb | R/Cr |
|---|---|---|---|
| 0 | G0 | B0 | R0 |
| 1 | G1 | B1 | R1 |
| 2 | G2 | B2 | R2 |
| 3 | G3 | B3 | R3 |
| 4 | G4 | B4 | R4 |
| 5 | G5 | B5 | R5 |

current palette

| Pred flag | Index | G/Y | B/Cb | R/Cr |
|---|---|---|---|---|
| 1 | 0 | G0 | B0 | R0 |
| 0 | | | | |
| 1 | 1 | G2 | B2 | R2 |
| 1 | 2 | G3 | B3 | R3 |
| 0 | | | | |
| 0 | | | | |
| | 3 | G3N | B3N | R3N |
| | 4 | G4N | B4N | R4N |

Re-used palette entries (3)

New palette entries (2), signalled

FIG. 9

CONSTRAINTS FOR VIDEO CODING AND DECODING

CROSS REFERENCE TO RELATED APPLICATIONS

This application is a continuation of U.S. patent application Ser. No. 17/861,728, filed on Jul. 11, 2022, which is a continuation of International Patent Application No. PCT/CN2021/071008, filed on Jan. 11, 2021, which claims the priority to and benefits of International Patent Application No. PCT/CN2020/071620, filed on Jan. 12, 2020. The entire disclosure of the aforementioned applications is incorporated by reference as part of the disclosure of this application.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which sub-picture based coding or decoding is performed.

In one example aspect a method of video processing is disclosed. The method includes performing a conversion between a block of a video and a bitstream of the video. The bitstream conforms to a formatting rule specifying that a size of a merge estimation region (MER) is indicated in the bitstream. The size of the MER is based on a dimension of a video unit, and the MER comprises a region used for deriving a motion candidate for the conversion.

In another example aspect a method of video processing is disclosed. The method includes performing a conversion between a block of a video and a bitstream of the video in a palette coding mode in which a palette of representative sample values is used for coding the block of video in the bitstream. A maximum number of palette size or palette predictor size used in the palette mode is restricted to m×N, m and N being positive integers.

In another example aspect a method of video processing is disclosed. The method includes determining, for a conversion between a current block of a video and a bitstream of the video, that a deblocking filtering process is disabled for a boundary of the current block in case the boundary coincides with a boundary of a sub-picture having a sub-picture index X and a loop filtering operation is disabled across boundaries of the subpicture, X being a non-negative integer. The method also includes performing the conversion based on the determining.

In another example aspect a method of video processing is disclosed. The method includes determining, for a video block in a first video region of a video, whether a position at which a temporal motion vector predictor is determined for a conversion between the video block and a bitstream representation of the current video block using an affine mode is within a second video region; and performing the conversion based on the determining.

In another example aspect, another method of video processing is disclosed. The method includes determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

In another example aspect, another method of video processing is disclosed. The method includes determining, for a video block in a first video region of a video, whether a position at which a reconstructed luma sample value is fetched for a conversion between the video block and a bitstream representation of the current video block is within a second video region; and performing the conversion based on the determining.

In another example aspect, another method of video processing is disclosed. The method includes determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.

In another example aspect, another method of video processing is disclosed. The method includes performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

In another example aspect, another method of video processing is disclosed. The method includes performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

In another example aspect, another method of video processing is disclosed. The method includes performing a conversion between a first video region of a video and a coded representation of the video, wherein a set of parameters defining coding characteristics of the first video region is included at the first video region level in the coded representation.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 9 shows an example of using of predictor palette to signal palette entries.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Initial Discussion

This document is related to video coding technologies. Specifically, it is related to palette coding employing base colors based representation in video coding. It may be applied to the existing video coding standard like High Efficiency Video Coding (HEVC), or the standard Versatile Video Coding (VVC) to be finalized. It may be also applicable to future video coding standards or video codec.

2. Video Coding Introduction

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards[1,2]. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC)1 SC29/WG11 (MPEG) was created to work on the VVC standard targeting at 50% bitrate reduction compared to HEVC.

2.1 the Region Constraint in TMVP and Sub-Block TMVP in VVC

Figure 1:
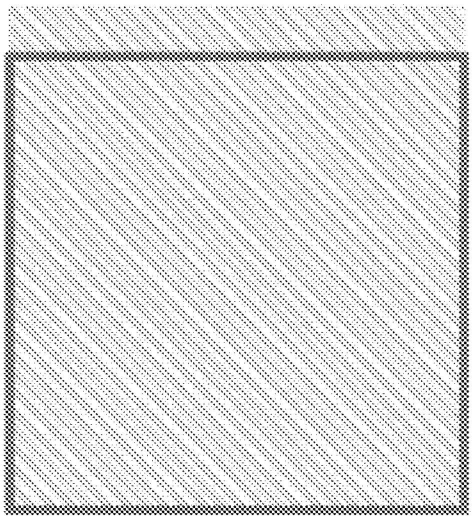
FIG. 1 shows an example of region constraint in temporal motion vector prediction (TMVP) and sub-block TMVP.

FIG. 1 illustrates example region constraint in TMVP and sub-block TMVP. In TMVP and sub-block TMVP, it is constrained that a temporal motion vector (MV) can generally only be fetched from the collocated coding tree unit (CTU) plus a column of 4×4 blocks as shown in FIG. 1.

2.2 Example Sub-Picture

In some embodiments, sub-picture-based coding techniques based on flexible tiling approach can be implemented. Summary of the sub-picture-based coding techniques includes the following:

(1) Pictures can be divided into sub-pictures.

(2) The indication of existence of sub-pictures is indicated in the sequence parameter set (SPS), along with other sequence-level information of sub-pictures.

(3) Whether a sub-picture is treated as a picture in the decoding process (excluding in-loop filtering operations) can be controlled by the bitstream.

(4) Whether in-loop filtering across sub-picture boundaries is disabled can be controlled by the bitstream for each sub-picture. The deblocking filter (DBF), sample adaptive offset (SAO), and adaptive loop_filter (ALF) processes are updated for controlling of in-loop filtering operations across sub-picture boundaries.

(5) For simplicity, as a starting point, the sub-picture width, height, horizontal offset, and vertical offset are signalled in units of luma samples in SPS. Sub-picture boundaries are constrained to be slice boundaries.

(6) Treating a sub-picture as a picture in the decoding process (excluding in-loop filtering operations) is specified by slightly updating the coding_tree_unit( ) syntax, and updates to the following decoding processes:

The derivation process for (advanced) temporal luma motion vector prediction

The luma sample bilinear interpolation process

The luma sample 8-tap interpolation filtering process

The chroma sample interpolation process (7) Sub-picture identifiers (IDs) are explicitly specified in the SPS and included in the tile group headers to enable extraction of sub-picture sequences without the need of changing video coding layer (VCL) network abstraction layer (NAL) units.

(8) Output sub-picture sets (OSPS) are proposed to specify normative extraction and conformance points for sub-pictures and sets thereof.

2.3 Example Sub-Pictures in Versatile Video Coding Sequence Parameter Set RBSP Syntax

| | Descriptor |
|---|---|
| seq_parameter_set_rbsp( ) { | |
| sps_decoding_parameter_set_id | u (4) |
| sps_video_parameter_set_id | u (4) |
| ... | |
| pic_width_max_in_luma_samples | ue (v) |
| pic_height_max_in_luma_samples | ue (v) |
| subpics_present_flag | u (1) |
| if( subpics_present_flag ) { | |
| max_subpics_minus1 | u (8) |
| subpic_grid_col_width_minus1 | u (v) |
| subpic_grid_row_height_minus1 | u (v) |
| for( i = 0; i < NumSubPicGridRows; i++ ) | |
| for( j = 0; j < NumSubPicGridCols; j++ ) | |
| subpic_grid_idx[ i ][ j ] | u (v) |
| for( i = 0; i <= NumSubPics; i++ ) { | |
| subpic_treated_as_pic_flag[ i ] | u (1) |
| loop_filter_across_subpic_enabled_flag[ i ] | u (1) |
| } | |
| } | |
| ... | |
| } | |

subpics_present_flag equal to 1 indicates that sub-picture parameters are present in the SPS RBSP syntax. subpics_present_flag equal to 0 indicates that sub-picture parameters are not present in the SPS RBSP syntax.

NOTE 2-When a bitstream is the result of a sub-bitstream extraction process and contains only a subset of the sub-pictures of the input bitstream to the sub-bitstream extraction process, it might be required to set the value of subpics_present_flag equal to 1 in the RBSP of the SPSs.

max_subpics_minus1 plus 1 specifies the maximum number of sub-pictures that may be present in the CVS. max_subpics_minus1 may be in the range of 0 to 254. The value of 255 is reserved for future use by ITU-T|ISO/IEC.

subpic_grid_col_width_minus1 plus 1 specifies the width of each element of the sub-picture identifier grid in units of 4 samples. The length of the syntax element is Ceil(Log2(pic_width_max_in_luma_samples/4)) bits.

The variable NumSubPicGridCols is derived as follows:

NumSubPicGridCols=(pic_width_max_in_luma_samples+subpic_grid_col_width_minus1*4+3)/(subpic_grid_col_width_minus1*4+4) (7-5)

subpic_grid_row_height_minus1 plus 1 specifies the height of each element of the sub-picture identifier grid in units of 4 samples. The length of the syntax element is Ceil(Log2(pic_height_max_in_luma_samples/4)) bits.

The variable NumSubPicGridRows is derived as follows:

```
NumSubPicGridRows = ( pic_height_max_in_luma_samples + subpic_grid_row_height_minus1 * 4 + 3 ) /
    ( subpic_grid_row_height_minus1 * 4 + 4)   (7-6)
```

subpic_grid_idx[ i ][ j ] specifies the sub-picture index of the grid position (i, j). The lemgth of the syntax element is Ceil( Log2( max_subpics_minus1 + 1 ) ) bits.

The varuiables SubPicTop[ subpic_grid_idx[ i ][ j ] ], SubPicLeft[ subpic_grid_idx[ i ][ j ] ], SubPicWidth[ subpic_grid_idx [ i ][ j ] ], SumPicHeight[ subpic_grid_idx[ i ][ j ] ], and NumSubPics are derived as follows:

```
NumSubPics = 0
for( i = 0; i. < NumSubPicGridRows; i++ ) {
    for( j = 0; j < NumSubPicGridCols; j++ ) {
      if ( i = = 0)
    SubPicTop[ subpic_grid_idx[ i ][ j ] ] = 0
      else if( subpic_grid_idx[ i ][ j ] != subpic_grid_idx[ i − 1 ][ j ] ) {
        SubPicTop[ subpic_grid_idx[ i ][ j ] ] = i
      SubPicHeight[ subpic_grid_idx[ i − 1][ j ] ] =
i - SubPicTop[ subpic_grid_idx[ i − 1 ][ j ] ]
        }
        if ( j = = 0 )
          SubPicLeft subpic_grid_idx[ i ][ j ] ] = 0
        else if (subpic_grid_idx[ i ][ j ] != subpic_grid_idx[ i ][ j − 1 ] ) {
          SubPicLeft[ subpic_grid_idx[ i ][ j ] ] = j
      SubPicWidth[ subpic_grid_idx[ i ][ j ] ] =
j - SubPicLeft subpic_grid_idx[ i ][ j − 1 ] ]
        }
        if ( i = = NumSubPicGridRows − 1)
      SubPicHeight[ subpic_grid_idx[ i ][ j ] ] =
i - SubPicTop[ subpic_grid_idx[ i − 1 ][ j ] ] + 1
        if (j = = NumSubPicGridRows − 1)
      SubPicWidth[ subpic_grid_idx[ i ][ j ] ] =
j - SubPicLeft[ subpic_grid_idx[ i ][ j − 1 ] ] + 1
        if( subpic_grid_idx[ i ][ j ] > NumSubPics)
          NumSubPics = subpic_grid_idx[ i ][ j ]
      }
}
```

subpic_treated_as_pic_flag[i] equal to 1 specifies that the i-th sub-picture of each coded picture in the CVS is treated as a picture in the decoding process excluding in-loop filtering operations. subpic_treated_as_pic_flag[i] equal to 0 specifies that the i-th sub-picture of each coded picture in the Coded Vide Sequence (CVS) is not treated as a picture in the decoding process excluding in-loop filtering operations. When not present, the value of subpic_treated_as_pic_flag [i] is inferred to be equal to 0.

loop_filter_across_subpic_enabled_flag[i] equal to 1 specifies that in-loop filtering operations may be performed across the boundaries of the i-th sub-picture in each coded picture in the CVS. loop_filter_across_subpic_enabled_flag [i] equal to 0 specifies that in-loop filtering operations are not performed across the boundaries of the i-th sub-picture in each coded picture in the CVS. When not present, the value of loop_filter_across_subpic_enabled_pic_flag[i] is inferred to be equal to 1.

It may be a requirement of bitstream conformance that the following constraints apply:

For any two sub-pictures subpicA and subpicB, when the index of subpicA is less than the index of subpicB, any coded NAL unit of subPicA may succeed any coded NAL unit of subPicB in decoding order.

The shapes of the sub-pictures may be such that each sub-picture, when decoded, may have its entire left boundary and entire top boundary consisting of picture boundaries or consisting of boundaries of previously decoded sub-pictures.

The list CtbToSubPicIdx[ctbAddrRs] for ctbAddrRs ranging from 0 to PicSizeInCtbsY-1, inclusive, specifying the conversion from a coding tree block (CTB) address in picture raster scan to a sub-picture index, is derived as follows:

```
for( ctbAddrRs = 0; ctbAddrRs < PicSizeInCtbsY; ctbAddrRs++ ) {
  posX = ctbAddrRs % PicWidthInCtbsY * CtbSizeY
  posY = ctbAddrRs / PicWidthInCtbsY * CtbSizeY
  CtbToSubPicIdx[ ctbAddrRs ] = −1
  for( i = 0; CtbToSubPicIdx[ ctbAddrRs ] < 0 && i < NumSubPics;
  i++ ) {
    if( ( posX >= SubPicLeft i ] * ( subpic_grid_col_width_minus1 + 1 )
    * 4 ) &&
      ( posX < ( SubPicLeft i ] + SubPicWidth[ i ] ) *
        ( subpic_grid_col_width_minus1 + 1 ) * 4 ) &&
      ( posY >= SubPicTop[ i ] *
        ( subpic_grid_row_height_minus1 + 1 ) * 4 ) &&
      ( posY < ( SubPicTop[ i ] + SubPicHeight[ i ] ) *
        ( subpic_grid_row_height_minus1 + 1 ) * 4 ) )
      CtbToSubPicIdx[ ctbAddrRs ] = i
  }
}
```

num_bricks_in_slice_minus1, when present, specifies the number of bricks in the slice minus 1. The value of num_bricks_in_slice_minus1 may be in the range of 0 to NumBricksInPic—1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
  sliceIdx = 0
  while( slice_address != slice_id[ sliceIdx ] )
    sliceIdx++
  NumBricksInCurrSlice = NumBricksInSlice[ sliceIdx ]
  brickIdx = TopLeftBrickIdx[ sliceIdx ]
  for( bIdx = 0; brickIdx <= BottomRightBrickIdx[ sliceIdx ];
  brickIdx++ ) (7-92)
    if( BricksToSliceMap[ brickIdx ] = = sliceIdx )
      SliceBrickIdx[ bIdx++ ] = brickIdx
} else {
  NumBricksInCurrSlice = num_bricks_in_slice_minus1 + 1
  SliceBrickIdx[ 0 ] = slice_address
  for( i = 1; i < NumBricksInCurrSlice; i++ )
    SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
SubPicLeftBoundaryPos = SubPicLeft[ SubPicIdx ] * ( subpic_grid_col_width_minus1 + 1 ) * 4
SubPicRightBoundaryPos = ( SubPicLeft[ SubPicIdx ] + SubPicWidth[ SubPicIdx ] ) *
  ( subpic_grid_col_width_minus1 + 1 ) * 4
SubPicTopBoundaryPos = SubPicTop[ SubPicIdx ] * ( subpic_grid_row_height_minus1 + 1 )* 4
SubPicBotBoundaryPos = ( SubPicTop[ SubPicIdx ] + SubPicHeight[ SubPicIdx ] ) *
  ( subpic_grid_row_height_minus1 + 1 ) * 4
}
...
```

Derivation process for temporal luma motion vector prediction

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples, a reference index refIdxLX, with X being 0 or 1.

Outputs of this process are:

the motion vector prediction mvLXCol in 1/16 fractional-sample accuracy, the availability flag availableFlagLXCol.

The variable currCb specifies the current luma coding block at luma location (xCb, yCb).

The variables mvLXCol and availableFlagLXCol are derived as follows:

If slice_temporal_mvp_enabled_flag is equal to 0 or (cbWidth*cbHeight) is less than or equal to 32, both components of mvLXCol are set equal to 0 and availableFlagLXCol is set equal to 0.

Otherwise (slice_temporal_mvp_enabled_flag is equal to 1), the following ordered steps apply:

1. The bottom right collocated motion vector and the bottom and right boundary sample locations are derived as follows:

xColBr=xCb+cbWidth (8-421)

yColBr=yCb+cbHeight (8-422)

rightBoundaryPos=subpic_treated_as_pic_flag[SubPicIdx]?SubPicRightBoundaryPos: pic_width_in_luma_samples-1 (8-423)

botBoundaryPos=subpic_treated_as_pic_flag[SubPicIdx]?SubPicBotBoundaryPos: pic_height_in_luma_samples-1 (8-424)

If yCb>>CtbLog2SizeY is equal to yColBr>>CtbLog2SizeY, yColBr is less than or equal to botBoundaryPos and xColBr is less than or equal to rightBoundaryPos, the following applies:

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

Otherwise, both components of mvLXCol are set equal to 0 and availableFlagLXCol is set equal to 0.

. . .

Luma sample bilinear interpolation process

Inputs to this process are:

a luma location in full-sample units ($xInt_L$, $yInt_L$), a luma location in fractional-sample units ($xFrac_L$, $yFrac_L$), the luma reference sample array $refPicLX_L$.

Output of this process is a predicted luma sample value predSampleLXL

The variables shift1, shift2, shift3, shift4, offset1, offset2 and offset3 are derived as follows:

shift1=BitDepthY-6 (8-453)

offset1=1<<(shift1-1) (8-454)

shift2=4 (8-455)

offset2=1<<(shift2-1) (8-456)

shift3=10-$BitDepth_Y$ (8-457)

shift4=$BitDepth_Y$−10 (8-458)

offset4=1<<(shift4-1) (8-459)

The variable picW is set equal to pic_width_in_luma_samples and the variable picH is set equal to pic_height_in_luma_samples.

The luma interpolation filter coefficients $fb_L$ [p] for each 1/16 fractional sample position p equal to $xFrac_L$ or $yFrac_L$ are specified in Table 8-10.

The luma locations in full-sample units ($xInt_i$, $yInt_i$) are derived as follows for i=0 . . . 1:

If subpic_treated_as_pic_flag[SubPicIdx] is equal to 1, the following applies:

$xInt_i$=Clip3(SubPicLeftBoundaryPos, SubPicRightBoundaryPos, $xInt_L$+i) (8-460)

$yInt_i$=Clip3(SubPicTopBoundaryPos, SubPicBotBoundaryPos, $yInt_L$+i) (8-461)

Otherwise (subpic_treated_as_pic_flag[SubPicIdx] is equal to 0), the following applies:

$xInt_i$=Clip3(0, picW-1, sps_ref_wraparound_enabled_flag?ClipH((sps_ref_wraparound_offset_minus1+1)*MinCbSizeY, picW, ($xInt_L$+i)): (8-462)

$xInt_L$+i) $yInt_i$=Clip3(0, picH−1, $yInt_{0+i}$) (8-463)

. . .

Derivation process for subblock-based temporal merging candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

the availability flag $availableFlagA_1$ of the neighbouring coding unit, the reference index $refIdxLXA_1$ of the neighbouring coding unit with X being 0 or 1, the prediction list utilization flag $predFlagLXA_1$ of the neighbouring coding unit with X being 0 or 1, the motion vector in 1/16 fractional-sample accuracy $mvLXA_1$ of the neighbouring coding unit with X being 0 or 1.

Outputs of this process are:

the availability flag availableFlagSbCol, the number of luma coding subblocks in horizontal direction numSbX and in vertical direction numSbY, the reference indices refIdxLOSbCol and refIdxL1SbCol, the luma motion vectors in 1/16 fractional-sample accuracy mvLOSbCol[xSbIdx] [ySbIdx] and mvL1SbCol[xSbIdx][ySbIdx] with xSbIdx=0..numSbX-1, ySbIdx=0..numSbY-1, the prediction list utilization flags predFlagLOSbCol[xSbIdx][ySbIdx] and predFlagL1SbCol[xSbIdx][ySbIdx] with xSbIdx=0..numSbX-1, ySbIdx=0..numSbY-1.

The availability flag availableFlagSbCol is derived as follows.

If one or more of the following conditions is true, availableFlagSbCol is set equal to 0.

slice_temporal_mvp_enabled_flag is equal to 0.

sps_sbtmvp_enabled_flag is equal to 0.

cbWidth is less than 8.

cbHeight is less than 8 . . .

Otherwise, the following ordered steps apply:

1. The location (xCtb, yCtb) of the top-left sample of the luma coding tree block that contains the current coding block and the location (xCtr, yCtr) of the below-right center sample of the current luma coding block are derived as follows:

xCtb=(xCb>>CtuLog2Size)<<CtuLog2Size (8-542)

yCtb=(yCb>>CtuLog2Size)<<CtuLog2Size (8-543)

xCtr=xCb+(cbWidth/2) (8-544)

yCtr=yCb+(cbHeight/2) (8-545)

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.
3. The derivation process for subblock-based temporal merging base motion data as specified in clause 8.5.5.4 is invoked with the location (xCtb, yCtb), the location (xColCtrCb, yColCtrCb), the availability flag availableFlag$A_1$, and the prediction list utilization flag predFlagLX$A_1$, and the reference index refIdxLXA1, and the motion vector mvLX$A_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
4. The variable availableFlagSbCol is derived as follows:
   If both ctrPredFlagL0 and ctrPredFlagL1 are equal to 0, availableFlagSbCol is set equal to 0.
   Otherwise, availableFlagSbCol is set equal to 1.

When availableFlagSbCol is equal to 1, the following applies:

The variables numSbX, numSbY, sbWidth, sbHeight and reflexLXSbCol are derived as follows:

$$\text{numSb}X=\text{cbWidth}>>3 \quad (8\text{-}546)$$

$$\text{numSb}Y=\text{cbHeight}>>3 \quad (8\text{-}547)$$

$$\text{sbWidth}=\text{cbWidth}/\text{numSb}X \quad (8\text{-}548)$$

$$\text{sbHeight}=\text{cbHeight}/\text{numSb}Y \quad (8\text{-}549)$$

$$\text{refIdxLXSbCol}=0 \quad (8\text{-}550)$$

For xSbIdx=0..numSbX-1 and ySbIdx=0..numSbY-1, the motion vectors mvLXSbCol[xSbIdx][ySbIdx] and prediction list utilization flags predFlagLXSbCol[xSbIdx][ySbIdx] are derived as follows:

The luma location (xSb, ySb) specifying the top-left sample of the current coding subblock relative to the top-left luma sample of the current picture is derived as follows:

$$x\text{Sb}=\text{xCb}+x\text{SbIdx}*\text{sbWidth}+\text{sbWidth}/2 \quad (8\text{-}551)$$

$$y\text{Sb}=\text{yCb}+y\text{SbIdx}*\text{sbHeight}+\text{sbHeight}/2 \quad (8\text{-}552)$$

The location (xColSb, yColSb) of the collocated subblock inside ColPic is derived as follows.

The following applies:

$$y\text{ColSb}=\text{Clip3}(y\text{Ctb}, \text{Min}(\text{CurPicHeightInSamplesY}-1, y\text{Ctb}+(1<<\text{CtbLog2Size}Y)-1), \quad (8\text{-}553)$$

$$ySb+(\text{tempMv}[1]>>4))$$

If subpic_treated_as_pic_flag[SubPicIdx] is equal to 1, the following applies:

$$x\text{ColSb}=\text{Clip3}(\text{xCtb}, \text{Min}(\text{SubPicRightBoundaryPos}, x\text{Ctb}+(1<<\text{CtbLog2Size}Y)+3), \quad (8\text{-}554)$$

$$x\text{Sb}+(\text{tempMv}[0]>>4))$$

Otherwise (subpic_treated_as_pic_flag[SubPicIdx] is equal to 0), the following applies:

$$x\text{ColSb}=\text{Clip3}(x\text{Ctb}, \text{Min}(\text{CurPicWidthInSamplesY}-1, x\text{Ctb}+(1<<\text{CtbLog2Size}Y)+3), \quad (8\text{-}555)$$

$$x\text{Sb}+(\text{tempMv}[0]>>4))$$

. . .

Derivation process for subblock-based temporal merging base motion data

Inputs to this process are:

the location (xCtb, yCtb) of the top-left sample of the luma coding tree block that contains the current coding block, the location (xColCtrCb, yColCtrCb) of the top-left sample of the collocated luma coding block that covers the below-right center sample.

the availability flag availableFlag$A_1$ of the neighbouring coding unit, the reference index refIdxLX$A_1$ of the neighbouring coding unit, the prediction list utilization flag predFlagLX$A_1$ of the neighbouring coding unit, the motion vector in 1/16 fractional-sample accuracy mvLX$A_1$ of the neighbouring coding unit.

Outputs of this process are:

the motion vectors ctrMvL0 and ctrMvL1, the prediction list utilization flags ctrPredFlagL0 and ctrPredFlagL1, the temporal motion vector tempMv.

The variable tempMv is set as follows:

$$\text{tempMv}[0]=0 \quad (8\text{-}558)$$

$$\text{tempMv}[1]=0 \quad (8\text{-}559)$$

The variable currPic specifies the current picture.

When availableFlag$A_1$ is equal to TRUE, the following applies:

If all of the following conditions are true, tempMv is set equal to mvLOA1:
   predFlagLOA; is equal to 1,
   DiffPicOrderCnt (ColPic, RefPicList[0][refIdxL0$A_1$]) is equal to 0, Otherwise, if all of the following conditions are true, tempMv is set equal to mvL1$A_1$:
   slice_type is equal to B,
   predFlagL1$A_1$ is equal to 1,
   DiffPicOrderCnt (ColPic, RefPicList[1][refIdxL1$A_1$]) is equal to 0.

The location (xColCb, yColCb) of the collocated block inside ColPic is derived as follows.

The following applies:

$$y\text{ColCb}=\text{Clip3}(y\text{Ctb}, \text{Min}(\text{CurPicHeightInSamplesY}-1, y\text{Ctb}+(1<<\text{CtbLog2Size}Y)-1), \quad (8\text{-}560)$$

$$y\text{ColCtrCb}+(\text{tempMv}[1\pi>>4))$$

If subpic_treated_as_pic_flag[SubPicIdx] is equal to 1, the following applies:

$$x\text{ColCb}=\text{Clip3}(x\text{Ctb}, \text{Min}(\text{SubPicRightBoundaryPos}, x\text{Ctb}+(1<<\text{CtbLog2Size}Y)+3), \quad (8\text{-}561)$$

$$x\text{ColCtrCb}+(\text{tempMv}[0]>>4))$$

Otherwise (subpic_treated_as_pic_flag[SubPicIdx] is equal to o, the following applies:

$$x\text{ColCb}=\text{Clip3}(x\text{Ctb}, \text{Min}(\text{CurPicWidthInSamplesY-1}, x\text{Ctb}+(1<<\text{CtbLog2Size}Y)+3), \quad (8\text{-}562)$$

$$x\text{ColCtrCb}+(\text{tempMv}[0]>>4))$$

. . .

Luma sample interpolation filtering process

Inputs to this process are:

a luma location in full-sample units ($\text{xInt}_L$, $\text{yInt}_L$), a luma location in fractional-sample units ($xFract_L$, $yFrac_L$), a luma location in full-sample units ($xSbInt_L$, $ySbInt_L$) specifying the top-left sample of the bounding block for reference sample padding relative to the top-left luma sample of the reference picture, the luma reference sample array $refPicLX_L$, the half sample interpolation filter index hpelIfIdx, a variable sbWidth specifying the width of the current subblock, a variable sbHeight specifying the height of the current subblock, a luma location (xSb, ySb) specifying the top-left sample of the current subblock relative to the top-left luma sample of the current picture, Output of this process is a predicted luma sample value predSampleLXL The variables shift1, shift2 and shift3 are derived as follows:

The variable shift1 is set equal to Min (4, $BitDepth_Y$-8), the variable shift2 is set equal to 6 and the variable shift3 is set equal to Max (2, 14-$BitDepth_Y$).

The variable picW is set equal to pic_width_in_luma_samples and the variable picH is set equal to pic_height_in_luma_samples.

The luma interpolation filter coefficients $f_L[p]$ for each 1/16 fractional sample position p equal to xFract or $yFrac_L$ are derived as follows:

If MotionModelIdc[xSb][ySb] is greater than 0, and sbWidth and sbHeight are both equal to 4, the luma interpolation filter coefficients $f_L[p]$ are specified in Table 8-12.

Otherwise, the luma interpolation filter coefficients $f_L[p]$ are specified in Table 8-11 depending on hpelIfIdx.

The luma locations in full-sample units ($xInt_i$, $yInt_i$) are derived as follows for i=0 . . . 7:

If subpic_treated_as_pic_flag[SubPicIdx] is equal to 1, the following applies:

$$xInt_i=Clip3(SubPicLeftBoundaryPos, SubPicRightBoundaryPos, xInt_L+i-3) \quad (8\text{-}771)$$

$$yInt_i=Clip3(SubPicTopBoundaryPos, SubPicBotBoundaryPos, yInt_L+i-3) \quad (8\text{-}772)$$

Otherwise (subpic_treated_as_pic_flag[SubPicIdx] is equal to 0), the following applies:

$$xInt_i=Clip3(0, picW-1, sps\_ref\_wraparound\_enabled\_flag?$$

$$ClipH((sps\_ref\_wraparound\_offset\_minus1+1)*MinCbSizeY, picW, xInt_L+i-3): \quad (8\text{-}773)$$

$$xInt_L+i-3)\ yInt_i=Clip3(0, picH-1, yInt_L+i-3) \quad (8\text{-}774)$$

. . .

Chroma Sample Interpolation Process

Inputs to this process are:

a chroma location in full-sample units ($xInt_C$, $yInt_C$), a chroma location in 1/32 fractional-sample units ($xFrac_C$, $yFrac_C$), a chroma location in full-sample units (xSbIntC, ySbIntC) specifying the top-left sample of the bounding block for reference sample padding relative to the top-left chroma sample of the reference picture, a variable sbWidth specifying the width of the current subblock, a variable sbHeight specifying the height of the current subblock, the chroma reference sample array refPicLXc.

Output of this Process is a Predicted Chroma Sample Value $predSampleLX_C$

The variables shift1, shift2 and shift3 are derived as follows:

The variable shift1 is set equal to Min (4, $BitDepth_C$-8), the variable shift2 is set equal to 6 and the variable shift3 is set equal to Max (2, 14-$BitDepth_C$).

The variable picWC is set equal to pic_width_in_luma_samples/SubWidthC and the variable $picH_C$ is set equal to pic_height_in_luma_samples/SubHeightC.

The chroma interpolation filter coefficients fc[p] for each 1/32 fractional sample position p equal to $xFrac_C$ or $yFrac_C$ are specified in Table 8-13.

The variable xOffset is set equal to $$(sps\_ref\_wraparound\_offset\_minus1+1)*MinCbSizeY)/SubWidthC.$$

The chroma locations in full-sample units ($xInt_i$, $yInt_i$) are derived as follows for i=0 . . . 3:

If subpic_treated_as_pic_flag[SubPicIdx] is equal to 1, the following applies:

$$xInt_i=Clip3(SubPicLeftBoundaryPos/SubWidthC, SubPicRightBoundaryPos/SubWidt\ hC, xInt_L+i) \quad (8\text{-}785)$$

$$yInt_i=Clip3(SubPicTopBoundaryPos/SubHeightC, SubPicBotBoundaryPos/SubHeight\ C, yInt_L+i) \quad (8\text{-}786)$$

Otherwise (subpic_treated_as_pic_flag[SubPicIdx] is equal to 0), the following applies:

$$xInt_i=Clip3(0, picW_C-1, sps\_ref\_wraparound\_enabled\_flag?ClipH(xOffset, picW_C, xInt_C+i-1)\ (8\text{-}787)\ xInt_C+i-1)$$

$$yInt_i=Clip3(0, picHc-1, yInt_C+i-1) \quad (8\text{-}788)$$

2.4 Example Encoder-Only Group of Pictures (GOP)-Based Temporal Filter

In some embodiments, an encoder-only temporal filter can be implemented. The filtering is done at the encoder side as a pre-processing step. Source pictures before and after the selected picture to encode are read and a block based motion compensation method relative to the selected picture is applied on those source pictures. Samples in the selected picture are temporally filtered using sample values after motion compensation.

The overall filter strength is set depending on the temporal sub layer of the selected picture as well as the quantization parameter (QP). Generally, only pictures at temporal sub layers 0 and 1 are filtered and pictures of layer 0 are filtered by a stronger filter than pictures of layer 1. The per sample filter strength is adjusted depending on the difference between the sample value in the selected picture and the co-located samples in motion compensated pictures so that small differences between a motion compensated picture and the selected picture are filtered more strongly than larger differences.

GOP Based Temporal Filter

A temporal filter is introduced directly after reading picture and before encoding. Below are the steps described in more detail.

Operation 1: Pictures are read by the encoder

Operation 2: If a picture is low enough in the coding hierarchy, it is filtered before encoding. Otherwise the picture is encoded without filtering. Random access (RA) pictures with picture order count (POC) % 8==0 are filtered as well as low delay (LD) pictures with POC % 4==0. Artificial intelligence (AI) pictures are generally not filtered.

The overall filter strength, $s_o$, is set according to the equation below for RA.

$$s_o(n) = \begin{cases} 1.5, & n \bmod 16 = 0 \\ 0.95, & n \bmod 16 \neq 0 \end{cases}$$

where n is the number of pictures read.

For the LD case, $s_o(n)=0.95$ is used.

Operation 3: Two pictures before and/or after the selected picture (referred to as original picture further down) are read. In the edge cases e.g., if it is the first picture or close to the last picture, generally only the available pictures are read.

Operation 4: Motion of the read pictures before and after, relative to the original picture is estimated per 8×8 picture block.

Figure 2:
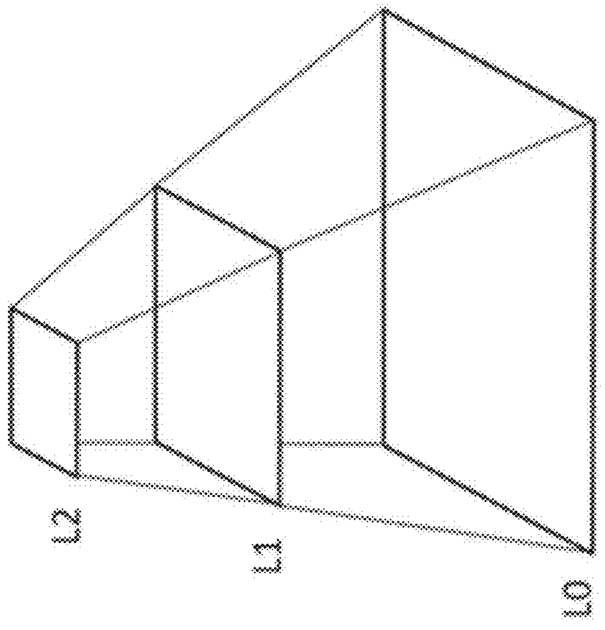
FIG. 2 shows an example of a hierarchical motion estimation scheme.

A hierarchical motion estimation scheme is used and the layers L0, L1 and L2, are illustrated in FIG. 2. Subsampled pictures are generated by averaging each 2×2 block for all read pictures and the original picture, e.g. L1 in FIG. 1. L2 is derived from L1 using the same subsampling method.

FIG. 2 shows examples of different layers of the hierarchical motion estimation. L0 is the original resolution. L1 is a subsampled version of L0. L2 is a subsampled version of L1.

First, motion estimation is done for each 16×16 block in L2. The squared difference is calculated for each selected motion vector and the motion vector corresponding to the smallest difference is selected. The selected motion vector is then used as initial value when estimating the motion in L1. Then the same is done for estimating motion in L0. As a final step, subpixel motion is estimated for each 8×8 block by using an interpolation filter on L0.

The VVC Test Model (VTM) 6-tap interpolation filter can used:

| | | | | | | |
|---|---|---|---|---|---|---|
| 0: | 0, | 0, | 64, | 0, | 0, | 0 |
| 1: | 1, | −3, | 64, | 4, | −2, | 0 |
| 2: | 1, | −6, | 62, | 9, | −3, | 1 |
| 3: | 2, | −8, | 60, | 14, | −5, | 1 |
| 4: | 2, | −9, | 57, | 19, | −7, | 2 |
| 5: | 3, | −10, | 53, | 24, | −8, | 2 |
| 6: | 3, | −11, | 50, | 29, | −9, | 2 |
| 7: | 3, | −11, | 44, | 35, | −10, | 3 |
| 8: | 1, | −7, | 38, | 38, | −7, | 1 |
| 9: | 3, | −10, | 35, | 44, | −11, | 3 |
| 10: | 2, | −9, | 29, | 50, | −11, | 3 |
| 11: | 2, | −8, | 24, | 53, | −10, | 3 |
| 12: | 2, | −7, | 19, | 57, | −9, | 2 |
| 13: | 1, | −5, | 14, | 60, | −8, | 2 |
| 14: | 1, | −3, | 9, | 62, | −6, | 1 |
| 15: | 0, | −2, | 4, | 64, | −3, | 1 |

Operation 5: Motion compensation is applied on the pictures before and after the original picture according to the best matching motion for each block, e.g., so that the sample coordinates of the original picture in each block have the best matching coordinates in the referenced pictures.

Operation 6: The samples are processed one by one for the luma and chroma channels as described in the following steps.

Operation 7: The new sample value, $I_n$, is calculated using the following formula.

$$I_n = \frac{I_o + \sum_{i=0}^{3} w_r(i, a) I_r(i)}{1 + \sum_{i=0}^{3} w_r(i, a)}$$

Where $I_o$ is the sample value of the original sample, $I_r$ (i) is the intensity of the corresponding sample of motion compensated picture i and $w_r$ (i, a) is the weight of motion compensated picture i when the number of available motion compensated pictures is a.

In the luma channel, the weights, $w_r$ (i, a), is defined as follows:

$$w_r(i, a) = s_l s_o(n) s_r(i, a) e^{-\frac{\Delta I(i)^2}{2\sigma_l(QP)^2}}$$

Where $$s_l = 0.4$$

$$s_r(i, 2) = \begin{cases} 1.2, & i = 0 \\ 1.0, & i = 1 \end{cases}$$

$$s_r(i, 4) = \begin{cases} 0.60, & i = 0 \\ 0.85, & i = 1 \\ 0.85, & i = 2 \\ 0.60, & i = 3 \end{cases}$$

For all other cases of i, and a: $s_r$ (i, a)=0.3

$$\sigma_l(QP)=3*(QP-10)$$

$$\Delta I(i)=I_r(i)-I_o$$

For the chroma channels, the weights, $w_r$ (i, a), is defined as follows:

$$w_r(i, a) = s_c s_o(n) s_r(i, a) e^{-\frac{\Delta I(i)^2}{2\sigma_c^2}}$$

Where $s_c$=0.55 and $\sigma_c$=30

Operation 8: The filter is applied for the current sample. The resulting sample value is stored separately.

Operation 9: The filtered picture is encoded.

2.5 Example Picture Partitions (Tiles, Bricks, Slices)

In some embodiments, a picture is divided into one or more tile rows and one or more tile columns. A tile is a sequence of CTUs that covers a rectangular region of a picture.

A tile is divided into one or more bricks, each of which consist of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A sub-picture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 5:
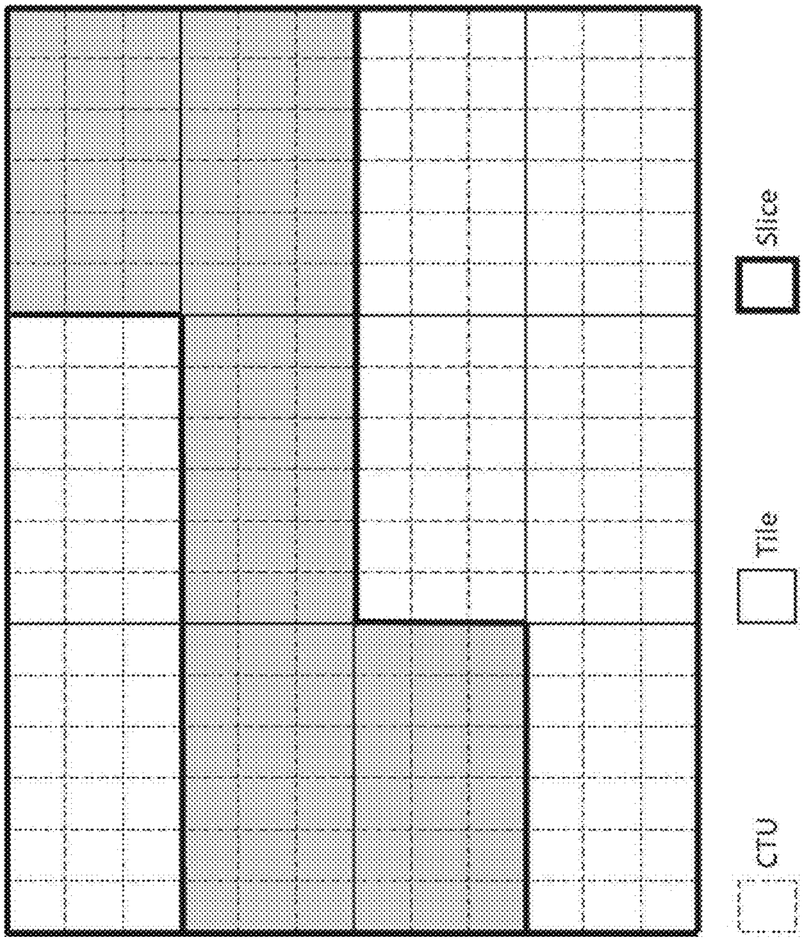
FIG. 5 shows an example of a picture with 18 by 12 luma coding tree units (CTUs) that is partitioned into 12 tiles and 3 raster-scan slices (informative).

FIG. 5 shows an example of raster-scan slice partitioning of a picture, where the picture is divided into 12 tiles and 3 raster-scan slices.

Figure 6:
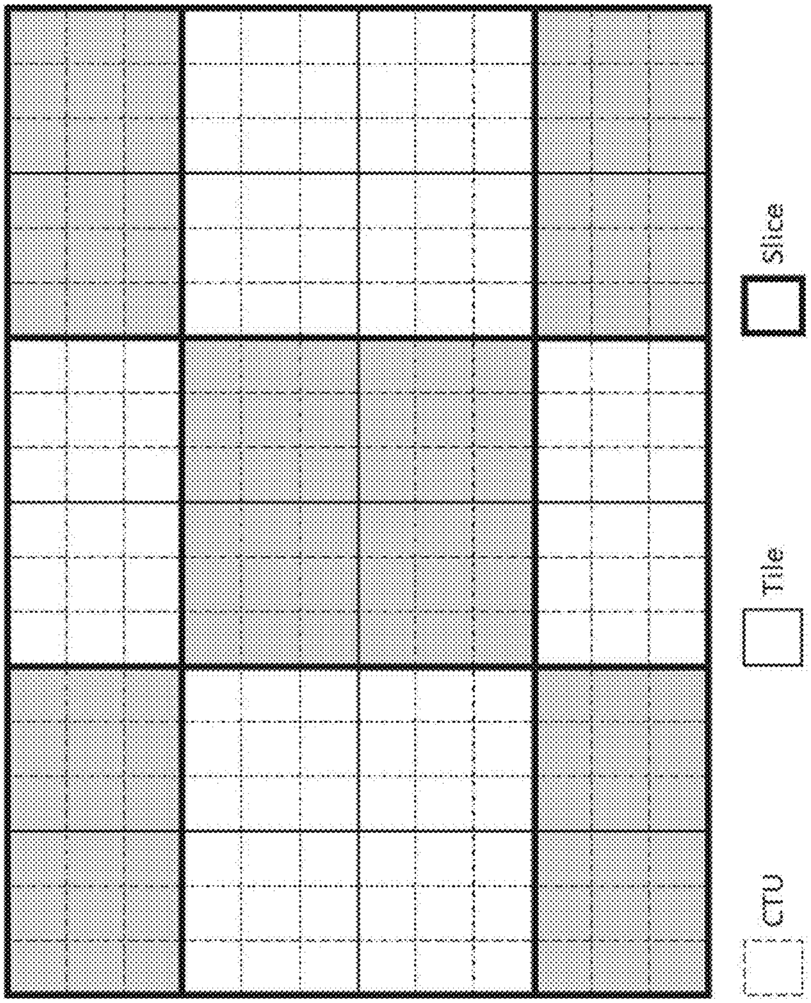
FIG. 6 shows an example of a picture with 18 by 12 luma CTUs that is partitioned into 24 tiles and 9 rectangular slices (informative).

FIG. 6 shows an example of rectangular slice partitioning of a picture, where the picture is divided into 24 tiles (6 tile columns and 4 tile rows) and 9 rectangular slices.

Figure 7:
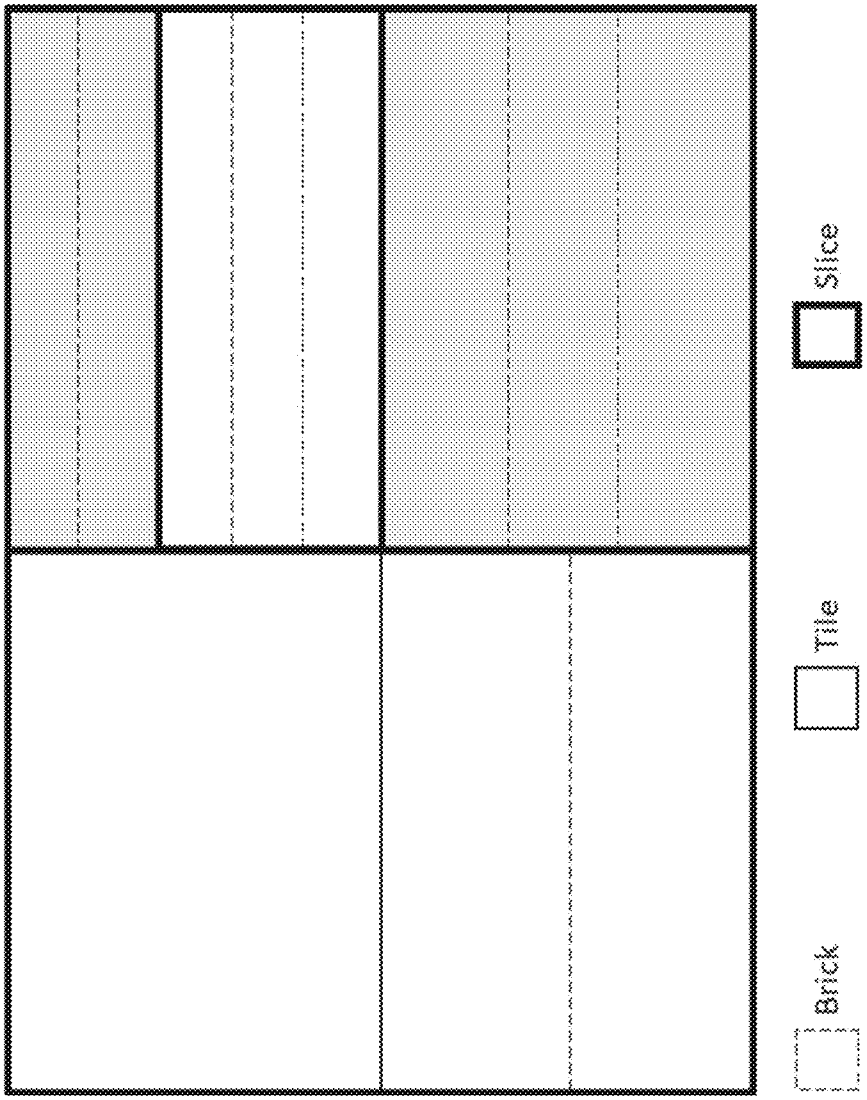
FIG. 7 shows an example of a picture that is partitioned into 4 tiles, 11 bricks, and 4 rectangular slices (informative).
Figure 8:
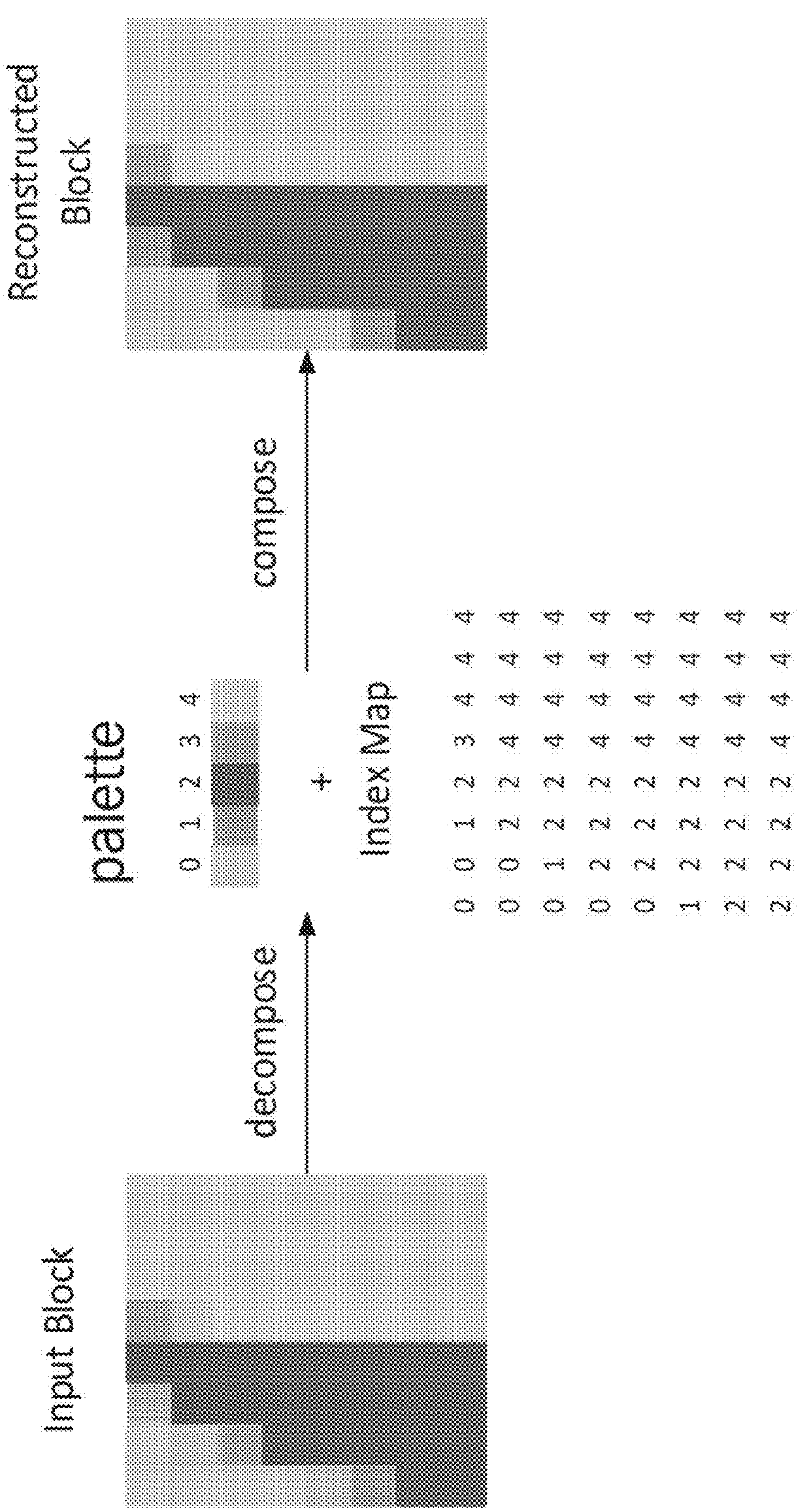
FIG. 8 shows an example of a block coded in palette mode.

FIG. 7 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Picture Parameter Set RBSP Syntax

| | Descriptor |
|---|---|
| pic_parameter_set_rbsp( ) { | |
| ... | |
| single_tile_in_pic_flag | u (1) |
| if( !single_in_pic_flag ) { | |
| uniform_tile_spacing_flag | u (1) |
| if( uniform_tile_spacing_flag ) { | |
| tile_cols_width_minus1 | ue (v) |
| tile_rows_height_minnsl | ue (v) |
| } else { | |
| num_tile_columns_minus1 | ue (v) |
| num_tile_rows_minus1 | ue (v) |
| for( i = 0; i < num_tile_columns_minus1; i++ ) | |
| tile_column_width_minus1[ i ] | ue (v) |
| for( i = 0; i < num_tile_rows_minus1; i++ ) | |
| tile_row_height_minus1[ i ] | ue (v) |
| } | |
| brick_splitting_present_flag | u (1) |
| if( uniform_tile_spacing_flag && brick_splitting_present_flag ) | |
| num_tiles_in_pic_minus1 | ue (v) |
| for( i = 0; brick_splitting_present_flag && i <= num_tiles_in_pic_minus1 + 1; i++ ) { | |
| if( RowHeight[ i ] > 1 ) | |
| brick_split_flag[ i ] | u (1) |
| if( brick_split_flag[ i ] ) { | |
| if( RowHeight[ i ] > 2 ) | |
| uniform_brick_spacing_flag[ i ] | u (1) |
| if( uniform_brick_spacing_flag[ i ] ) | |
| brick_height_minus1[ i ] | ue (v) |
| else { | |
| num_brick_rows_minus2[ i ] | ue (v) |
| for( j = 0; j <= num_brick_rows_minus2[ i ]; j++ ) | |
| brick_row_height_minus1[ i ][ j ] | ue (v) |
| } | |
| } | |
| } | |
| single_brick_per_slice_flag | u (1) |
| if( !single_brick_per_slice_flag ) | |
| rect_slice_flag | u (1) |
| if( rect_slice_flag && !single_brick_per_slice_flag ) { | |
| num_slices_in_pic_minus1 | ue (v) |
| bottom_right_brick_idx_length_minus1 | ue (v) |
| for( i = 0; i < num_slices_in_pic_minus1; i++ ) { | |
| bottom_right_brick_idx_delta[ i ] | u (v) |
| brick_idx_delta_sign_flag[ i ] | u (1) |
| } | |
| } | |
| loop_filter_across_bricks_enabled_flag | u (1) |
| if( loop_filter_across_bricks_enabled_flag ) | |
| loop_filter_across_slices_enabled_flag | u (1) |
| } | |
| if( rect_slice_flag ) { | |
| signalled_slice_id_flag | u (1) |
| if( signalled_slice_id_flag ) { | |
| signalled_slice_id_length_minus1 | ue (v) |
| for( i = 0; i <= num_slices_in_pic_minus1; i++ ) | |
| slice_id[ i ] | u (v) |
| } | |
| } | |
| ... | |

| | Descriptor |
|---|---|
| slice_header( ) { | |
| slice_pic_parameter_set_id | ue (v) |
| if( rect_slice_flag \| \| NumBricksInPic > 1 ) | |
| slice_address | u (v) |

-continued

| | |
|---|---|
| if( !rect_slice_flag && !single_brick_per_slice_flag ) | |
| num_bricks_in_slice_minus1 | ue (v) |
| non_reference_picture_flag | u (1) |
| slice_type | ue (v) |
| ... | |

single_tile_in_pic_flag equal to 1 specifies that there is only one tile in each picture referring to the Picture Parameter Set (PPS). single_tile_in_pic_flag equal to 0 specifies that there is more than one tile in each picture referring to the PPS.

NOTE—In absence of further brick splitting within a tile, the whole tile is referred to as a brick.

When a picture contains only a single tile without further brick splitting, it is referred to as a single brick.

It may be a requirement of bitstream conformance that the value of single_tile_in_pic_flag may be the same for all PPSs that are referred to by coded pictures within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1 [i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 may be in the range of 0 to PicWidthInCtbsY-1, inclusive. When not present, the value of tile_cols_width_minus1 is inferred to be equal to Pic WidthInCtbsY-1.

tile_rows_height_minus1 plus 1 specifies the height of the tile rows excluding the bottom tile row of the picture in units of CTBs when uniform_tile_spacing_flag is equal to 1. The value of tile_rows_height_minus1 may be in the range of 0 to PicHeightInCtbsY-1, inclusive. When not present, the value of tile_rows_height_minus1 is inferred to be equal to PicHeightInCtbsY-1.

num_tile_columns_minus1 plus 1 specifies the number of tile columns partitioning the picture when uniform_tile_spacing_flag is equal to 0. The value of num_tile_columns_minus1 may be in the range of 0 to PicWidthInCtbsY-1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified in clause 6.5.1.

num_tile_rows_minus1 plus 1 specifies the number of tile rows partitioning the picture when uniform_tile_spacing_flag is equal to 0. The value of num_tile_rows_minus1 may be in the range of 0 to PicHeightInCtbsY-1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in clause 6.5.1.

The variable NumTilesInPic is set equal to (*num*_tile_columns_minus1+1)*(*num*_tile_rows_minus1+1).

When single_tile_in_pic_flag is equal to 0, NumTilesInPic may be greater than 1. tile_column_width_minus1[i] plus 1 specifies the width of the i-th tile column in units of CTBs. tile_row_height_minus1[i] plus 1 specifies the height of the i-th tile row in units of CTBs. brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks. num_tiles_in_pic_minus1 plus 1 specifies the number of tiles in each picture referring to the PPS. The value of num_tiles_in_pic_minus1 may be equal to NumTilesInPic-1. When not present, the value of num_tiles_in_pic_minus1 is inferred to be equal to NumTilesInPic-1. brick_split_flag[i] equal to 1 specifies that the i-th tile is divided into two or more bricks. brick_split_flag[i] equal to 0 specifies that the i-th tile is not divided into two or more bricks. When not present, the value of brick_split_flag[i] is inferred to be equal to 0. In some embodiments, PPS parsing dependency on SPS is introduced by adding the syntax condition "if (RowHeight[i]>1)" (e.g., similarly for uniform_brick_spacing_flag[i]). uniform_brick_spacing_flag [i] equal to 1 specifies that horizontal brick boundaries are distributed uniformly across the i-th tile and signalled using the syntax element brick_height_minus1 [i]. uniform_brick_spacing_flag[i] equal to 0 specifies that horizontal brick boundaries may or may not be distributed uniformly across i-th tile and signalled using the syntax element num_brick_rows_minus2 [i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 may be in the range of 0 to RowHeight[i]-2, inclusive. When not present, the value of brick_height_minus1[i] is inferred to be equal to RowHeight[i]-1.

num_brick_rows_minus2 [i] plus 2 specifies the number of bricks partitioning the i-th tile when uniform_brick_spacing_flag[i] is equal to 0. When present, the value of num_brick_rows_minus2 [i] may be in the range of 0 to RowHeight[i]-2, inclusive. If brick_split_flag[i] is equal to 0, the value of num_brick_rows_minus2 [i] is inferred to be equal to −1. Otherwise, when uniform_brick_spacing_flag [i] is equal to 1, the value of num_brick_rows_minus2 [i] is inferred as specified in 6.5.1.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic-1, inclusive, when uniform_brick_spacing_flag[i] is equal to 1, the value of num_brick_rows_minus2 [i] is inferred, by invoking the CTB raster and brick scanning conversion process as specified in clause 6.5.1:

- the list RowHeight[j] for j ranging from 0 to num_tile_rows_minus1, inclusive, specifying the height of the j-th tile row in units of CTBs,
- the list CtbAddrRsToBs[ctbAddrRs] for ctbAddrRs ranging from 0 to PicSizeInCtbsY-1, inclusive, specifying the conversion from a CTB address in the CTB raster scan of a picture to a CTB address in the brick scan,
- the list CtbAddrBsToRs[ctbAddrBs] for ctbAddrBs ranging from 0 to PicSizeInCtbsY-1, inclusive, specifying the conversion from a CTB address in the brick scan to a CTB address in the CTB raster scan of a picture,
- the list BrickId[ctbAddrBs] for ctbAddrBs ranging from 0 to PicSizeInCtbsY-1, inclusive, specifying the conversion from a CTB address in brick scan to a brick ID,
- the list NumCtusInBrick[brickIdx] for brickIdx ranging from 0 to NumBricksInPic-1, inclusive, specifying the conversion from a brick index to the number of CTUs in the brick,
- the list FirstCtbAddrBs[brickIdx] for brickIdx ranging from 0 to NumBricksInPic-1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When brick_splitting_present_flag is equal to 1, the value of rect_slice_flag may be equal to 1. When not present, rect_slice_flag is inferred to be equal to 1.

num_slices_in_pic_minus1 plus 1 specifies the number of slices in each picture referring to the PPS. The value of num_slices_in_pic_minus1 may be in the range of 0 to NumBricksInPic-1, inclusive. When not present and single_brick_per_slice_flag is equal to 1, the value of num_slices_in_pic_minus1 is inferred to be equal to NumBricksInPic-1.

bottom_right_brick_idx_length_minus1 plus 1 specifies the number of bits used to represent the syntax element bottom_right_brick_idx_delta[i]. The value of bottom_right_brick_idx_length_minus1 may be in the range of 0 to Ceil(Log2 (NumBricksInPic))−1, inclusive.

bottom_right_brick_idx_delta[i] when i is greater than 0 specifies the difference between the brick index of the brick located at the bottom-right corner of the i-th slice and and the brick index of the bottom-right corner of the (i−1)−th slice. bottom_right_brick_idx_delta[0] specifies the brick index of the bottom right corner of the 0-th slice. When single_brick_per_slice_flag is equal to 1, the value of bottom_right_brick_idx_delta[i] is inferred to be equal to 1. The value of the BottomRightBrickIdx[num_slices_in_pic_minus1] is inferred to be equal to NumBricksInPic-1. The length of the bottom_right_brick_idx_delta[i] syntax element is bottom_right_brick_idx_length_minus1+1 bits.

brick_idx_delta sign flag[i] equal to 1 indicates a positive sign for bottom_right_brick_idx_delta[i]. sign_bottom_right_brick_idx_delta[i] equal to 0 indicates a negative sign for bottom_right_brick_idx_delta[i].

It may be a requirement of bitstream conformance that a slice may include either a number of complete tiles or only a consecutive sequence of complete bricks of one tile.

The variable TopLeftBrickIdx[i], BottomRightBrickIdx[i], NumBricksInSlice[i] and BricksToSliceMap[j], which specify the brick index of the brick located at the top left corner of the i-th slice, the brick index of the brick located at the bottom right corner of the i-th slice, the number of bricks in the i-th slice and the mapping of bricks to slices, are derived as follows:

```
for( j = 0; i = = 0 && j < NumBricksInPic; j++ )
   BricksToSliceMap[ j ] = −1
NumBricksInSlice[ i ] = 0
BottomRightBrickIdx[ i ] = bottom_right_brick_idx_delta[ i ] ] +
( ( i = = 0 ) ? 0 :
            ( brick_idx_delta_sign_flag[ i ] ? BottomRightBrickIdx[ i − 1 ] :
-BottomRightBrickIdx[ i−1 ] )
for( j = BottomRightBrickIdx[ i ]; j >= 0; j− − ) {
   if( BrickColBd[ j ] <= BrickColBd[ BottomRightBrickIdx[ i ] ] &&
   (7-43)
         BrickRowBd[ j ] <= BrickRowBd[ BottomRightBrickIdx[ i ] ] &&
      BricksToSliceMap[ j ] = = −1 ) {
      TopLeftBrickIdx[ i ] = j
      NumBricksInSlice[ i ]++
      BricksToSliceMap[ j ] = i
   }
}
```

General Slice Header Semantics

When present, the value of each of the slice header syntax elements slice_pic_parameter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag may be the same in all slice headers of a coded picture.

The variable CuQpDeltaVal, specifying the difference between a luma quantization parameter for the coding unit containing cu_qp_delta_abs and its prediction, is set equal to 0. The variables CuQpOffsetcb, CuQpOffsetcr, and CuQpOffsetcbCr, specifying values to be used when determining the respective values of the Qp'cb, Qp'cr, and Qp'cbCr quantization parameters for the coding unit containing cu_chroma_qp_offset_flag, are all set equal to 0.

slice_pic_parameter_set_id specifies the value of pps_pic_parameter_set_id for the PPS in use.

The value of slice_pic_parameter_set_id may be in the range of 0 to 63, inclusive.

It may be a requirement of bitstream conformance that the value of TemporalId of the current picture may be greater than or equal to the value of TemporalId of the PPS that has pps_pic_parameter_set_id equal to slice_pic_parameter_set_id.

slice_address specifies the slice_address of the slice. When not present, the value of slice_address is inferred to be equal to 0.

If rect_slice_flag is equal to 0, the following applies:

- The slice address is the brick ID as specified by Equation (7-59).
- The length of slice_address is Ceil(Log2(NumBricksInPic)) bits.
- The value of slice_address may be in the range of 0 to NumBricksInPic-1, inclusive.

Otherwise (rect_slice_flag is equal to 1), the following applies:

- The slice address is the slice ID of the slice.
- The length of slice_address is signalled_slice_id_length_minus1+1 bits.
- If signalled_slice_id_flag is equal to 0, the value of slice_address may be in the range of 0 to num_slices_in_pic_minus1, inclusive. Otherwise, the value of slice_address may be in the range of 0 to $2^{(signalled\_slice\_id\_length\_minus1+1)}$-1, inclusive.

It may be a requirement of bitstream conformance that the following constraints apply:

The value of slice_address may not be equal to the value of slice_address of any other coded slice NAL unit of the same coded picture.

When rect_slice_flag is equal to 0, the slices of a picture may be in increasing order of their slice address values.

The shapes of the slices of a picture may be such that each brick, when decoded, may have its entire left boundary and entire top boundary consisting of a picture boundary or consisting of boundaries of previously decoded brick(s).

num_bricks_in_slice_minus1, when present, specifies the number of bricks in the slice minus 1. The value of num_bricks_in_slice_minus1 may be in the range of 0 to NumBricksInPic-1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

```
if( rect_slice_flag ) {
  sliceIdx = 0
  while( slice address != slice_id[ sliceIdx ] )
    sliceIdx++
  NumBricksInCurrSlice = NumBricksInSlice[ sliceIdx ]
  brickIdx = TopLeftBrickIdx[ sliceIdx ]
  for( bIdx = 0; brickIdx <= BottomRightBrickIdx[ sliceIdx ];
  brickIdx++ )(7-92)
    if( BricksToSliceMap[ brickIdx ] = = sliceIdx )
      SliceBrickIdx[ bIdx++ ] = brickIdx
} else {
  NumBricksInCurrSlice = num_bricks_in_slice_minus1 + 1
  SliceBrickIdx[ 0 ] = slice_address
  for( i = 1; i < NumBricksInCurrSlice; i++ )
    SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx =
CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
  SubPicLeftBoundaryPos =
SubPicLeft[ SubPicIdx ] * ( subpic_grid_col_width_minus1 + 1 ) * 4
  SubPicRightBoundaryPos =
( SubPicLeft[ SubPicIdx ] + SubPicWidth[ SubPicIdx ] ) *
    ( subpic_grid_col_width_minus1 + 1 ) * 4                    (7-93)
  SubPicTopBoundaryPos =
SubPicTop[ SubPicIdx ] * ( subpic_grid_row_height_minus1 + 1 )* 4
  SubPicBotBoundaryPos = ( SubPicTop[ SubPicIdx ] + SubPicHeight[ SubPicIdx ] ) *
    ( subpic_grid_row_height_minus1 + 1 ) * 4
}
```

2.6 Example Syntax and Semantics

Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | u(4) |
| chroma_format_idc | u(2) |
| if( chroma_format_idc = = 3 ) | |
| separate_colour_plane_flag | u(1) |
| ref_pic_resampling_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_max_in_luma_samples | ue(v) |
| pic_height_max_in_luma_samples | ue(v) |
| sps_log2_ctu_size_minus5 | u(2) |
| ***subpics_present_flag*** | ***u(1)*** |
| ***sps_num_subpics_minus1*** | ***u(8)*** |
| ***for( i = 0; i <= sps_num_subpics_minus1; i++ ) {*** | |
| ***subpic_ctu_top_left_x[ i ]*** | ***u(v)*** |
| ***subpic_ctu_top_left_y[ i ]*** | ***u(v)*** |
| ***subpic_width_minus1[ i ]*** | ***u(v)*** |
| ***subpic_height_minus1[ i ]*** | ***u(v)*** |
| ***subpic_treated_as_pic_flag[ i ]*** | ***u(1)*** |
| ***loop_filter_across_subpic_enabled_flag[ i ]*** | ***u(1)*** |
| } | |

-continued

| | Descriptor |
|---|---|
| } | |
| ***sps_subpic_id_present_flag*** | ***u(1)*** |
| ***if( sps_subpics_id_present_flag ) {*** | |
| ***sps_subpic_id_signalling_present_flag*** | ***u(1)*** |
| ***if( sps_subpic_id_signalling_present_flag ) {*** | |
| ***sps_subpic_id_len_minus1*** | ***ue(v)*** |
| ***for( i = 0; i <= sps_num_subpics_minus1; i++ )*** | |
| ***sps_subpic_id[ i ]*** | ***u(v)*** |
| } | |
| } | |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| if( sps_max_sub_layers_minus1 > 0 ) | |
| sps_sub_layer_ordering_info_present_flag | u(1) |
| for( i = ( sps_sub_layer_ordering_info_present_flag ? 0 : sps_max_sub_layers_minus1 ); | |
| i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++ ) | |
| ref_pic_list_struct( i, j ) | |
| } | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| sps_joint_cbcr_enabled_flag | u(1) |
| if( ChromaArrayType != 0 ) { | |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
| sps_bdpcm_enabled_flag | u(1) |

-continued

| | Descriptor |
|---|---|
| if( sps_bdpcm_enabled_flag && chroma_format_idc = = 3 ) | |
| sps_bdpcm_chroma_enabled_flag | u(1) |
| sps_ref_wraparound_enabled_flag | u(1) |
| if( sps_ref_wraparound_enabled_flag ) | |
| sps_ref_wraparound_offset_minus1 | ue(v) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag ) | |
| sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( sps_cclm_enabled_flag && chroma_format_idc = = 1 ) | |
| sps_cclm_colocated_chroma_flag | u(1) |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| sps_sbt_enabled_flag | u(1) |
| sps_affine_enabled_flag | u(1) |
| if( sps_affine_enabled_flag ) { | |
| sps_affine_type_flag | u(1) |
| sps_affine_amvr_enabled_flag | u(1) |
| sps_affine_prof_enabled_flag | u(1) |
| if( sps_affine_prof_enabled_flag ) | |
| sps_prof_pic_present_flag | u(1) |
| } | |
| if( chroma_format_idc = = 3 ) { | |
| sps_palette_enabled_flag | u(1) |
| sps_act_enabled_flag | u(1) |
| } | |
| sps_bcw_enabled_flag | u(1) |
| sps_ibc_enabled_flag | u(1) |
| sps_ciip_enabled_flag | u(1) |
| if( sps_mmvd_enabled_flag ) | |
| sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| general_hrd_parameters_present_flag | u(1) |
| if( general_hrd_parameters_present_flag ) { | |
| num_units_in_tick | u(32) |
| time_scale | u(32) |
| sub_layer_cpb_parameters_present_flag | u(1) |

-continued

| | Descriptor |
|---|---|
| if( sub_layer_cpb_parameters_present_flag ) | |
| general_hrd_parameters( 0, sps_max_sub_layers_minus1 ) | |
| else | |
| general_hrd_parameters( sps_max_sublayers_minus1, sps_max_sub_layers _minus1 ) | |
| } | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Picture Parameter Set RBSP Syntax

| pic_parameter_set_rbsp( ) { | Descriptor |
|---|---|
| pps_pic_parameter_set_id | ue(v) |
| pps_seq_parameter_set_id | u(4) |
| pps_seq_parameter_set_id | ue(v) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| scaling_window_flag | u(1) |
| if( scaling_window_flag ) { | |
| scaling_win_left_offset | ue(v) |
| scaling_win_right_offset | ue(v) |
| scaling_win_top_offset | ue(v) |
| scaling_win_bottom_offset | ue(v) |
| } | |
| output_flag_present_flag | u(1) |
| mixed_nalu_types_in_pic_flag | u(1) |
| ***pps_subpic_id_signalling_present_flag*** | ***u(1)*** |
| ***if( pps_subpic_id_signalling_present_flag ) {*** | |
| ***pps_num_subpics_minus1*** | ***ue(v)*** |
| ***pps_subpic_id_len_minus1*** | ***ue(v)*** |
| ***for( i = 0;i <= pps_num_subpic_minus1; i++ )*** | |
| ***pps_subpic_id[ i ]*** | ***u(v)*** |
| } | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| rect_slice_flag | u(1) |
| if( rect_slice_flag ) | |
| single_slice_per_subpic_flag | u(1) |
| if( rect_slice_flag && !single_slice_per_subpic_flag ) { | |
| num_slices_in_pic_minus1 | ue(v) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 && slice_height_in_tiles_minus1[ i ] = = 0 ) { | |
| num_slices_in_tile_minus1[ i ] | ue(v) |
| numSlicesInTileMinus1 = num_slices_in_tile_minus1[ i ] | |
| for( j = 0; j < numSlicesInTileMinus1; j++ ) | |
| slice_height_in_ctu_minus1[ i++ ] | ue(v) |
| } | |

-continued

| pic_parameter_set_rbsp( ) { | Descriptor |
|---|---|
| if( tile_idx_delta_present_flag && i < num_slices_in_pic_minus1 ) | |
| tile_idx_delta[ i ] | se(v) |
| } | |
| } | |
| loop_filter_across_tiles_enabled_flag | u(1) |
| loop_filter_across_slices_enabled_flag | u(1) |
| } | |
| entropy_coding_sync_enabled_flag | u(1) |
| if( !no_pic_partition_flag \| \| entropy_coding_sync_enabled_flag ) | |
| entry_point_offsets_present_flag | u(1) |
| cabac_init_present_flag | u(1) |
| for( i = 0; i < 2; i++ ) | |
| num_ref_idx_default_active_minus1[ i ] | ue(v) |
| rpl1_idx_present_flag | u(1) |
| init_qp_minus26 | se(v) |
| ***if( sps_transform_skip_enabled_flag )*** | |
| ***log2_transform_skip_max_size_minus2*** | ***ue(v)*** |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
| pps_joint_cbcr_qp_offset_value | se(v) |
| pps_slice_chroma_qp_offsets_present_flag | u(1) |
| cu_chroma_qp_offset_enabled_flag | u(1) |
| if( cu_chroma_qp_offset_enabled_flag ) { | |
| chroma_qp_offset_list_len_minus1 | ue(v) |
| for( i = 0; i <= chroma_qp_offset_list_len_minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| } | |
| } | |
| constant_slice_header_params_enabled_flag | u(1) |
| if( constant_slice_header_params_enabled_flag ) { | |
| pps_dep_quant_enabled_idc | u(2) |
| for( i = 0; i < 2; i++ ) | |
| pps_ref_pic_list_sps_idc[ i ] | u(2) |
| pps_mvd_l1_zero_idc | u(2) |
| pps_collocated_from_l0_idc | u(2) |
| pps_six_minus_max_num_merge_cand_plus1 | ue(v) |
| pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag ) | |
| while( more_rbsp_data( )) | |
| pps_extension_data_flag | u(1) |
| rbsp_trailing_bits( ) | |
| } | |

Picture Header RBSP Syntax

| picture_header_rbsp( ) { | Descriptor |
|---|---|
| non_reference_picture_flag | u(1) |
| gdr_pic_flag | u(1) |
| no_output_of_prior_pics_flag | u(1) |
| if( gdr_pic_flag ) | |
| recovery_poc_cnt | ue(v) |
| ph_pic_parameter_set_id | ue(v) |

-continued

| picture_header_rbsp( ) { | Descriptor |
|---|---|
| ***if (sps_subpic_id_present_flag && !sps_subpic_id_signalling_flag ) {*** | |
| ***ph_subpic_id_signalling_flag*** | ***u(1)*** |
| ***if( ph_subpic_id_signalling_flag ) {*** | |
| ***ph_subpic_id_len_minus1*** | ***ue(v)*** |
| ***for(i = 0;i <= sps_num_subpics_minus1; i++ )*** | |
| ***ph_subpic_id[ i ]*** | ***u(v)*** |
| } | |
| } | |
| if( !sps_loop_filter_across_virtual_boundaries_disabled_present_flag ) { | |
| ph_loop_filter_across_virtual_boundaries_disabled_present_flag | u(1) |
| if( ph_loop_filter_across_virtual_boundaries_disabled_present flag ) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++ ) | |
| ph_virtual_boundaries_pos_y[ i ] | u(13) |
| } | |
| } | |
| if( separate_colour_plane_flag = = 1 ) | |
| colour_plane_id | u(2) |
| if( output_flag_present_flag ) | |
| pic_output_flag | u(1) |
| pic_rpl_present_flag | u(1) |
| if( pic_rpl_present_flag ) { | |
| for( i = 0; i < 2; i++ ) { | |
| if( num_ref_pic_lists_in_sps[ i ] > 0 && !pps_ref_pic_list_sps_idc[ i ] && | |
| ( i = = 0 \| \| ( i = = 1 && rpl1_idx_present_flag ) ) ) | |
| pic_rpl_sps_flag[ i ] | u(1) |
| if( pic_rpl_sps_flag[ i ] ) { | |
| if( num_ref_pic_lists_in_sps[ i ] > 1 && | |
| ( i = = 0 \| \| ( i = = 1 && rpl1_idx_present_flag ) ) ) | |
| pic_rpl_idx[ i ] | u(v) |
| } else | |
| ref_pic_list_struct( i, num_ref_pic_lists_in_sps[ i ] ) | |
| for( j = 0; j < NumLtrpEntries[ i ][ RplsIdx[ i ] ]; j++ ) { | |
| if( ltrp_in_slice_header_flag[ i ][ RplsIdx[ i ] ] ) | |
| pic_poc_lsb_lt[ i ][ j ] | u(v) |
| pic_delta_poc_msb_present_flag[ i ][ j ] | u(1) |
| if( pic_delta_poc_msb_present_flag[ i ][ j ] ) | |
| pic_delta_poc_msb_cycle_lt[ i ][ j ] | ue(v) |
| } | |
| } | |
| } | |
| if( partition_constraints_override_enabled_flag ) { | |
| partition_constraints_override_flag | ue(v) |
| if( partition_constraints_override_flag ) { | |
| pic_log2_diff_min_qt_min_cb_intra_slice_luma | ue(v) |
| pic_log2_diff_min_qt_min_cb_inter_slice | ue(v) |
| pic_max_mtt_hierarchy_depth_inter_slice | ue(v) |
| pic_max_mtt_hierarchy_depth_intra_slice_luma | ue(v) |
| if( pic_max_mtt_hierarchy_depth_intra_slice_luma != 0 ) { | |
| pic_log2_diff_max_bt_min_qt_intra_slice_luma | ue(v) |
| pic_log2_diff_max_tt_min_qt_intra_slice_luma | ue(v) |
| } | |
| if( pic_max_mtt_hierarchy_depth_inter_slice != 0 ) { | |
| pic_log2_diff_max_bt_min_qt_inter_slice | ue(v) |
| pic_log2_diff_max_tt_min_qt_inter_slice | ue(v) |
| } | |
| if( qtbtt_dual_tree_intra_flag ) { | |
| pic_log2_diff_min_qt_min_cb_intra_slice_chroma | ue(v) |
| pic_max_mtt_hierarchy_depth_intra_slice_chroma | ue(v) |
| if( pic_max_mtt_hierarchy_depth_intra_slice_chroma != 0 ) { | |
| pic_log2_diff_max_bt_min_qt_intra_slice_chroma | ue(v) |
| pic_log2_diff_max_tt_min_qt_intra_slice_chroma | ue(v) |
| } | |
| } | |
| } | |
| } | |
| if( cu_qp_delta_enabled_flag ) { | |
| pic_cu_qp_delta_subdiv_intra_slice | ue(v) |
| pic_cu_qp_delta_subdiv_inter_slice | ue(v) |
| } | |

-continued

```
picture_header_rbsp( ) {                                                        Descriptor
  if( cu_chroma_qp_offset_enabled_flag ) {
    pic_cu_chroma_qp_offset_subdiv_intra_slice                                  ue(v)
    pic_cu_chroma_qp_offset_subdiv_inter_slice                                  ue(v)
  }
  if( sps_temporal_mvp_enabled_flag )
    pic_temporal_mvp_enabled_flag                                               u(1)
  if(!pps_mvd_l1_zero_idc)
    mvd_l1_zero_flag                                                            u(1)
  if( !pps_six_minus_max_num_merge_cand_plusl )
    pic_six_minus_max_num_merge_cand                                            ue(v)
  if( sps_affine_enabled_flag)
    pic_five_minus_max_num_subblock_merge_cand                                  ue(v)
  if( sps_fpel_mmvd_enabled_flag)
    pic_fpel_mmvd_enabled_flag                                                  u(1)
  if( sps_bdof_pic_present_flag )
    pic_disable_bdof_flag                                                       u(1)
  if( sps_dmvr_pic_present_flag )
    pic_disable_dmvr_flag                                                       u(1)
  if( sps_prof_pic_present_flag )
    pic_disable_prof_flag                                                       u(1)
  if( sps_triangle_enabled_flag && MaxNumMergeCand >= 2 &&
      !pps_max_num_merge_cand_minus_max_num_triangle_cand_minus1 )
    pic_max_num_merge_cand_minus_max_num_triangle_cand                          ue(v)
  if ( sps_ibc_enabled_flag )
    pic_six_minus_max_num_ibc_merge_cand                                        ue(v)
  if( sps_joint_cbcr_enabled_flag )
    pic_joint_cbcr_sign_flag                                                    u(1)
  if( sps_sao_enabled_flag ) {
    pic_sao_enabled_present_flag                                                u(1)
    if( pic_sao_enabled_present_flag ) {
      pic_sao_luma_enabled_flag                                                 u(1)
      if(ChromaArrayType != 0 )
        pic_sao_chroma_enabled_flag                                             u(1)
    }
  }
  if( sps_alf_enabled_flag ) {
    pic_alf_enabled_present_flag                                                u(1)
    if( pic_alf_enabled_present_flag ) {
      pic_alf_enabled_flag                                                      u(1)
      if( pic_alf_enabled_flag ) {
        pic_num_alf_aps_ids_luma                                                u(3)
        for( i = 0; i < pic_num_alf_aps_ids_luma; i++ )
          pic_alf_aps_id_luma[ i ]                                              u(3)
        if( ChromaArrayType != 0 )
          pic_alf_chroma_idc                                                    u(2)
        if( pic_alf_chroma_idc )
          pic_alf_aps_id_chroma                                                 u(3)
      }
    }
  }
  if ( !pps_dep_quant_enabled_flag )
    pic_dep_quant_enabled_flag                                                  u(1)
  if( !pic_dep_quant_enabled_flag )
    sign_data_hiding_enabled_flag                                               u(1)
  if( deblocking_filter_override_enabled_flag ) {
    pic_deblocking_filter_override_present_flag                                 u(1)
    if( pic_deblocking_filter_override_present_flag ) {
      pic_deblocking_filter_override_flag                                       u(1)
      if( pic_deblocking_filter_override_flag ) {
        pic_deblocking_filter_disabled_flag                                     u(1)
        if( !pic_deblocking_filter_disabled_flag ) {
          pic_beta_offset_div2                                                  se(v)
          pic_tc_offset_div2                                                    se(v)
        }
      }
    }
  }
  if( sps_lmcs_enabled_flag ) {
    pic_lmcs_enabled_flag                                                       u(1)
    if( pic_lmcs_enabled_flag ) {
      pic_lmcs_aps_id                                                           u(2)
      if( ChromaArrayType != 0 )
        pic_chroma_residual_scale_flag                                          u(1)
    }
  }
```

-continued

| picture_header_rbsp( ) { | Descriptor |
|---|---|
| if( sps_scaling_list_enabled_flag ) { | |
| pic_scaling_list_present_flag | u(1) |
| if( pic_scaling_list_present_flag ) | |
| pic_scaling_list_aps_id | u(3) |
| } | |
| if( picture_header_extension_present_flag ) { | |
| ph_extension_length | ue(v) |
| for( i = 0; i < ph_extension_length; i++ ) | |
| ph_extension_data_byte[ i ] | u(8) |
| } | |
| rbsp_trailing_bits( ) | |
| } | |

subpics_present_flag equal to 1 indicates that sub-picture parameters are present in the SPS RBSP syntax. subpics_present_flag equal to 0 indicates that sub-picture parameters are not present in the SPS RBSP syntax.

NOTE 2-When a bitstream is the result of a sub-bitstream extraction process and contains only a subset of the sub-pictures of the input bitstream to the sub-bitstream extraction process, it might be required to set the value of subpics_present_flag equal to 1 in the RBSP of the SPSs. sps_num_subpics_minus1 plus 1 specifies the number of sub-pictures. sps_num_subpics_minus1 may be in the range of 0 to 254. When not present, the value of sps_num_subpics_minus1 is inferred to be equal to 0.

subpic_ctu_top_left_x[i] specifies horizontal position of top left CTU of i-th sub-picture in unit of CtbSizeY. The length of the syntax element is Ceil(Log2 (pic_width_max_in_luma_samples/CtbSizeY)) bits. When not present, the value of subpic_ctu_top_left_x[i] is inferred to be equal to 0.

subpic_ctu_top_left_y[i] specifies vertical position of top left CTU of i-th sub-picture in unit of CtbSizeY. The length of the syntax element is Ceil(Log2(pic_height_max_in_luma_samples/CtbSizeY)) bits. When not present, the value of subpic_ctu_top_left_y[i] is inferred to be equal to 0.

subpic_width_minus1[i] plus 1 specifies the width of the i-th sub-picture in units of CtbSizeY.

The length of the syntax element is Ceil(Log2(pic_width_max_in_luma_samples/CtbSizeY)) bits. When not present, the value of subpic_width_minus1[i] is inferred to be equal to Ceil(pic_width_max_in_luma_samples/CtbSizeY)−1.

subpic_height_minus1[i] plus 1 specifies the height of the i-th sub-picture in units of CtbSizeY. The length of the syntax element is Ceil(Log2(pic_height_max_in_luma_samples/CtbSizeY)) bits. When not present, the value of subpic_height_minus1[i] is inferred to be equal to Ceil(pic_height_max_in_luma_samples/CtbSizeY)−1.

subpic_treated_as_pic_flag[i] equal to 1 specifies that the i-th sub-picture of each coded picture in the CVS is treated as a picture in the decoding process excluding in-loop filtering operations. subpic_treated_as_pic_flag[i] equal to 0 specifies that the i-th sub-picture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th sub-picture in each coded picture in the CVS. loop_filter_across_subpic_enabled_flag[i] equal to 0 specifies that in-loop filtering operations are not performed across the boundaries of the i-th sub-picture in each coded picture in the CVS. When not present, the value of loop_filter_across_subpic_enabled_pic_flag[i] is inferred to be equal to 1.

It may be a requirement of bitstream conformance that the following constraints apply:

For any two sub-pictures subpicA and subpicB, when the index of subpicA is less than the index of subpicB, any coded NAL unit of subPicA may succeed any coded NAL unit of subPicB in decoding order.

The shapes of the sub-pictures may be such that each sub-picture, when decoded, may have its entire left boundary and entire top boundary consisting of picture boundaries or consisting of boundaries of previously decoded sub-pictures.

sps_subpic_id_present_flag equal to 1 specifies that sub-picture Id mapping is present in the SPS. sps_subpic_id_present_flag equal to 0 specifies that sub-picture Id mapping is not present in the SPS.

sps_subpic_id_signalling_present_flag equal to 1 specifies that sub-picture Id mapping is signalled in the SPS. sps_subpic_id_signalling_present_flag equal to 0 specifies that sub-picture Id mapping is not signalled in the SPS. When not present, the value of sps_subpic_id_signalling_present_flag is inferred to be equal to 0.

sps_subpic_id_len_minus1 plus 1 specifies the number of bits used to represent the syntax element sps_subpic_id[i]. The value of sps_subpic_id_len_minus1 may be in the range of 0 to 15, inclusive.

sps_subpic_id[i] specifies that sub-picture Id of the i-th sub-picture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive. ph_pic_parameter_set_id specifies the value of pps_pic_parameter_set_id for the PPS in use.

The value of ph_pic_parameter_set_id may be in the range of 0 to 63, inclusive.

It may be a requirement of bitstream conformance that the value of TemporalId of the picture header may be greater than or equal to the value of TemporalId of the PPS that has pps_pic_parameter_set_id equal to ph_pic_parameter_set_id.

ph_subpic_id_signalling_present_flag equal to 1 specifies that sub-picture Id mapping is signalled in the picture header. ph_subpic_id_signalling_present_flag equal to 0 specifies that sub-picture Id mapping is not signalled in the picture header.

ph_subpic_id_len_minus1 plus 1 specifies the number of bits used to represent the syntax element ph_subpic_id[i]. The value of pic_subpic_id_len_minus1 may be in the range of 0 to 15, inclusive.

It may be a requirement of bitstream conformance that the value of ph_subpic_id_len_minus1 may be the same for all picture headers that are referred to by coded pictures in a CVS.

ph_subpic_id[i] specifies that sub-picture Id of the i-th sub-picture. The length of the ph_subpic_id[i] syntax element is ph_subpic_id_len_minus1+1 bits.

The list SubpicIdList[i] is derived as follows:

for(*i*=0; *i*<=*sps_num*_subpics_minus1; *i*++) SubpicIdList[*i*]=*sps*_subpic_*id*_present_flag? (7-39)

(sps_subpic_*id*_signalling_present_flag?sps_subpic_*id*[*i*]: (*ph*_subpic_*id*_signalling_present_flag?*ph*_subpic_*id*[*i*]: *pps*_subpic_*id*[*i*])): *i*

Deblocking Filter Process

General

Inputs to this process are the reconstructed picture prior to deblocking, i.e., the array $recPicture_L$ and, when ChromaArrayType is not equal to 0, the arrays $recPicture_{Cb}$ and $recPicture_{Cr}$. Outputs of this process are the modified reconstructed picture after deblocking, i.e., the array $recPicture_L$ and, when ChromaArrayType is not equal to 0, the arrays $recPicture_{Cb}$ and $recPicture_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,

Edges that coincide with the boundaries of a sub-picture for which loop_filter_across_subpic_enabled_flag [SubPicIdx] is equal to 0, Edges that coincide with the virtual boundaries of the picture when pps_loop_filter_across_virtual_boundaries_disabled_flag is equal to 1, Edges that coincide with tile boundaries when loop_filter_across_tiles_enabled_flag is equal to 0, Edges that coincide with slice boundaries when loop_filter_across_slices_enabled_flag is equal to 0, Edges that coincide with upper or left boundaries of slices with slice_deblocking_filter_disabled_flag equal to 1, Edges within slices with slice_deblocking_filter_disabled_flag equal to 1, Edges that do not correspond to 4×4 sample grid boundaries of the luma component, Edges that do not correspond to 8×8 sample grid boundaries of the chroma component, Edges within the luma component for which both sides of the edge have intra_bdpcm_luma_flag equal to 1, Edges within the chroma components for which both sides of the edge have intra_bdpcm_chroma_flag equal to 1, Edges of chroma subblocks that are not edges of the associated transform unit.

. . .

Deblocking Filter Process for One Direction

Inputs to this process are:

the variable treeType specifying whether the luma (DUAL_TREE_LUMA) or chroma components (DUAL_TREE_CHROMA) are currently processed, when treeType is equal to DUAL_TREE_LUMA, the reconstructed picture prior to deblocking, i.e., the array $recPicture_L$, when ChromaArrayType is not equal to 0 and treeType is equal to DUAL_TREE_CHROMA, the arrays $recPicture_{Cb}$ and $recPicture_{Cr}$, a variable edgeType specifying whether a vertical (EDGE_VER) or a horizontal (EDGE_HOR) edge is filtered.

Outputs of this process are the modified reconstructed picture after deblocking, i.e:

when treeType is equal to DUAL_TREE_LUMA, the array $recPicture_L$, when ChromaArrayType is not equal to 0 and treeType is equal to DUAL_TREE_CHROMA, the arrays $recPicture_{Cb}$ and $recPicture_{Cr}$.

The variables firstCompIdx and lastCompIdx are derived as follows:

firstCompIdx=(treeType==DUAL_TREE_CHROMA)?1:0 (8-1010)

lastCompIdx=(treeType==DUAL_TREE_LUMA||ChromaArrayType==0)?0:2 (8-1011)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edgeType is equal to EDGE_HOR and yCb % 8 is equal to 0, the edges are filtered by the following ordered steps:

1. The variable filterEdgeFlag is derived as follows:

If edgeType is equal to EDGE_VER and one or more of the following conditions are true, filterEdgeFlag is set equal to 0:

The left boundary of the current coding block is the left boundary of the picture.

The left boundary of the current coding block is the left or right boundary of the sub-picture and loop_filter_across_subpic_enabled_flag[SubPicIdx] is equal to 0.

The left boundary of the current coding block is the left boundary of the tile and loop_filter_across_tiles_enabled_flag is equal to 0.

The left boundary of the current coding block is the left boundary of the slice and loop_filter_across_slices_enabled_flag is equal to 0.

The left boundary of the current coding block is one of the vertical virtual boundaries of the picture and VirtualBoundariesDisabledFlag is equal to 1.

Otherwise, if edgeType is equal to EDGE_HOR and one or more of the following conditions are true, the variable filterEdgeFlag is set equal to 0:

The top boundary of the current luma coding block is the top boundary of the picture.

The top boundary of the current coding block is the top or bottom boundary of the sub-picture and loop_filter_across_subpic_enabled_flag[SubPicIdx] is equal to 0.

The top boundary of the current coding block is the top boundary of the tile and loop_filter_across_tiles_enabled_flag is equal to 0.

The top boundary of the current coding block is the top boundary of the slice and loop_filter_across_slices_enabled_flag is equal to 0.

The top boundary of the current coding block is one of the horizontal virtual boundaries of the picture and VirtualBoundariesDisabledFlag is equal to 1.

Otherwise, filterEdgeFlag is set equal to 1.

2.7 Example TPM, HMVP and GEO triangular Prediction Mode (TPM) in VVC divides a block into two triangles with different motion information.

History-based Motion vector Prediction (HMVP) in VVC maintains a table of motion information to be used for motion vector prediction. The table is updated after decoding an inter-coded block, but it is not updated if the inter-coded block is TPM-coded.

geometry partition mode (GEO) is an extension of TPM. With GEO, a block can be divided by a straight-line into two partitions, which may be or may not be triangles.

2.8 ALF, CC-ALF and Virtual Boundary

Adaptive Loop-Filter (ALF) in VVC is applied after a picture has been decoded, to enhance the picture quality.

VB (Virtual Boundary) is adopted in VVC to make ALF friendly to hardware design. With VB, ALF is conducted in an ALF processing unit bounded by two ALF virtual boundaries.

CC-ALF (Cross-Component ALF) as filters the chroma samples by referring to the information of luma samples.

2.9 Example Supplemental Enhancement Information (SEI) for Sub-Pictures

D.2.8 Sub-Picture Level Information SEI Message Syntax

| subpic_level_info( payloadSize ) { | Descriptor |
|---|---|
| sli_seq_parameter_set_id | u(4) |
| num_ref_levels_minus1 | u(3) |
| explicit_fraction_present_flag | u(1) |
| for( i = 0; i <= num_ref_levels_minus1; i++ ) { | |
| ref_level_idc[ i ] | u(8) |
| if( explicit_fraction_present_flag ) | |
| for( j = 0; j <= sps_num_subpics_minus1; j++ ) | |
| ref_level_fraction_minus1[ i ][ j ] | u(8) |
| } | |
| } | |

D.3.8 Sub-Picture Level Information SEI Message Semantics

The sub-picture level information SEI message contains information about the level that sub-pictures in the bitstream conform to when testing conformance of extracted bitstreams containing the sub-pictures according to Annex A.

When a sub-picture level information SEI message is present for any picture of a Coded Layer Video Sequence (CLVS), a sub-picture level information SEI message may be present for the first picture of the CLVS. The sub-picture level information SEI message persists for the current layer in decoding order from the current picture until the end of the CLVS. All sub-picture level information SEI messages that apply to the same CLVS may have the same content.

sli_seq_parameter_set_id indicates and may be equal to the sps_seq_parameter_set_id for the SPS that is referred to by the coded picture associated with the sub-picture level information SEI message. The value of sli_seq_parameter_set_id may be equal to the value of pps_seq_parameter_set_id in the PPS referenced by the ph_pic_parameter_set_id of the Picture Header (PH) of the coded picture associated with the sub-picture level information SEI message.

It may be a requirement of bitstream conformance that, when a sub-picture level information SEI message is present for a CLVS; the value of subpic_treated_as_pic_flag[i] may be equal to 1 for each value of i in the range of & to sps_num_subpics_minus1, inclusive.

num_ref_levels_minus1 plus 1 specifies the number of reference levels signalled for each of the sps_num_subpics_minus1+1 sub-pictures.

explicit_fraction_present_flag equal to 1 specifies that the syntax elements ref_level_fraction_minus1[i] are present. explicit_fraction_present_flag equal to 0 specifies that the syntax elements ref_level_fraction_minus1[i] are not present.

ref_level_idc[ i] indicates a level to which each sub-picture conforms as specified in Annex A. Bitstreams may not contain values of ref_level_idc other than those specified in Annex A. Other values of ref_level_idc[i] are reserved for future use by ITU-T| ISO/IEC. It may be a requirement of bitstream conformance that the value of ref_level_idc[i] may be less than or equal to ref_level_idc[k] for any value of k greater than i.

ref_level_fraction_minus1[i][j] plus 1 specifies the fraction of the level limits associated with ref_level_idc[i] that the j-th sub-picture conforms to as specified in clause A.4.1.

The variable SubPicSize Y[j] is set equal to (subpic_width_minus1 [j]+1)*(subpic_height_minus1 [j]+1).

When not present, the value of ref_level_fraction_minus1 [i][j] is inferred to be equal to Ceil(256*SubPicSizeY[j]+PicSizeInSamplesY*MaxLumaPs (general_level_idc)+MaxLu maPs (ref_level_idc[i])−1.

The variable RefLevelFraction[i][j] is set equal to ref_level_fraction_minus1[i][j]+1.

The variables SubPicNumTileCols[j] and SubPicNumTileRows[j] are derived as follows:

```
for( i = 0; i <= sps_num_subpics_minus1; i++) {
  SubPicNumTileCols[ i ] = 1
  SubPicNumTileRows[ i ] = 1
  for( ctbAddrRs = subpic_ctu_top_left_x[ i ] + 1; ctbAddrRs <=
  subpic_ctu_top_left_x[ i ] + subpic_width_minus1[ i ]; ctbAddrRs++ )
    if( CtbToTileColBd[ ctbAddrRs ] != CtbToTileColBd
    [ ctbAddrRs − 1 ] )
      SubPicNumTileCols[ i ]++
  (D.5)
  for( ctbAddrRs = ( subpic_ctu_top_left_y[ i ] + 1 ) * PicWidthInCtbsY;
      ctbAddrRs <= ( subpic_ctu_top_left_y[ i ] + subpic_height_minus1
[ i ] ) * PicWidthInCtbsY;
      ctbAddrRs += PicWidthInCtbsY )
    if( CtbToTileRowBd[ ctbAddrRs ] !=
CtbToTileRowBd[ ctbAddrRs − PicWidthInCtbsY ] )
      SubPicNumTileRows[ i ]++
}
```

The variables SubPicCpbSizeVcl[i][j] and SubPicCpbSizeNal[i][j] are derived as follows:

$$SubPicCpbSizeVcl[i][j]=Floor(CpbVclFactor*MaxCPB*RefLevelFraction[i][j]+256) \quad (D.6)$$

$$SubPicCpbSizeNal[i][j]=Floor(CpbNalFactor*MaxCPB*RefLevelFraction[i][j]+256) \quad (D.7)$$

with MaxCPB derived from ref_level_idc[ i] as specified in clause A.4.2.

NOTE 1-When a sub-picture is extracted, the resulting bitstream has a CpbSize (either indicated in the SPS or inferred) that is greater than or equal to SubPicCpbSizeVel[i][j] and SubPicCpbSizeNal[i][j].

It may be a requirement of bitstream conformance that the bitstreams resulting from extracting the j-th sub-picture for j in the range of 0 to sps_num_subpics_minus1, inclusive, and conforming to a profile with general_tier_flag equal to 0 and level equal to ref_level_idc[i] for i in the range of 0 to num_ref_level_minus1, inclusive, may obey the following constraints for each bitstream conformance test as specified in Annex C:

Ceil(256*SubPicSizeY[i]+RefLevelFraction[i][j]) may be less than or equal to MaxLumaPs, where MaxLumaPs is specified in Table A.1.

The value of Ceil(256*(subpic_width_minus1[i]+1)+RefLevelFraction[i][j]) may be less than or equal to Sqrt (MaxLumaPs*8).

The value of Ceil(256*(subpic_height_minus1[i]+1)+RefLevelFraction[i][j]) may be less than or equal to Sqrt (MaxLumaPs*8).

The value of SubPicNumTileCols[j] may be less than or equal to MaxTileCols and of SubPicNumTileRows[j] may be less than or equal to MaxTileRows, where MaxTileCols and MaxTileRows are specified in Table A.1.

For any sub-picture set containing one ore more sub-pictures and consisting of a list of sub-picture indices SubPicSetIndices and a number of sub-pictures in the sub-picture set NumSubPicInSet, the level information of the sub-picture set is derived.

The variable SubPicSetAccLevelFraction[i] for the total level_fraction with respect to the reference level ref_level_idc[ i], and the variables SubPicSetCpbSize Vel [i][j] and SubPicSetCpbSizeNal[i][j] of the sub-picture set, are derived as follows:

```
for (i = 0; i <= num_ref_level_minus1; i ++) {
  SubPicSetAccLevelFraction[ i ] = 0
  SubPicSetCpbSizeVcl[ i ] = 0
  SubPicSetCpbSizeNal[ i ] = 0
  for (j = 0; j < NumSubPicInSet; j ++) {
    SubPicIdx = SubPicSetIndices[ j ]
    SubPicSetAccLevelFraction[ i ] += RefLevelFraction[ i ]
    [ SubPicIdx ](D.8)
    SubPicSetCpbSizeVcl[ i ] += SubPicSetCpbSizeVcl[ i ][ SubPicIdx ]
    SubPicSetCpbSizeNal[ i ] += SubPicSetCpbSizeNal[ i ][ SubPicIdx ]
    SubPicSetNumTiles[ i ] += SubPicNumTileCols[ SubPicIdx ] *
      SubPicNumTileRow[ SubPicIdx ]
  }
}
```

The value of the sub-picture set sequence level indicator, SubPicSetLevelIdc, is derived as follows:

```
SubPicSetLevelIdc = general_level_idc
for (i = num_ref_level_minus1; i >= 0; i– – )
  if( SubPicSetNumTiles[ i ] <= ( MaxTileCols * MaxTileRows )
  && (D.9)
      SubPicSetAccLevelFraction[ i ] <= 256 )
    SubPicSetLevelIdc = ref_level_idc[ i ]
```

where MaxTileCols and MaxTileRows are specified in Table A.1 for ref_level_idc[i].

The sub-picture set bitstream conforming to a profile with general_tier_flag equal to 0 and a level equal to SubPicSetLevelIdc may obey the following constraints for each bitstream conformance test as specified in Annex C:

For the VCL Hypothetical Reference Decoder (HRD) parameters, SubPicSetCpbSizeVcl[i] may be less than or equal to CpbVclFactor*MaxCPB, where CpbVclFactor is specified in Table A.3 and MaxCPB is specified in Table A.1 in units of CpbVclFactor bits.

For the NAL HRD parameters, SubPicSetCpbSizeVcl[i] may be less than or equal to CpbNalFactor*MaxCPB, where CpbNalFactor is specified in Table A.3, and MaxCPB is specified in Table A. 1 in units of CpbNalFactor bits. MaxCPB NOTE 2-When a sub-picture set is extracted, the resulting bitstream has a CpbSize (either indicated in the SPS or inferred) that is greater than or equal to SubPicCpbSizeVcl[i][j] and SubPicSetCpbSizeNal[i][j].

2.10. Palette Mode 2.10.1 Concept of Palette Mode

Figure 10:
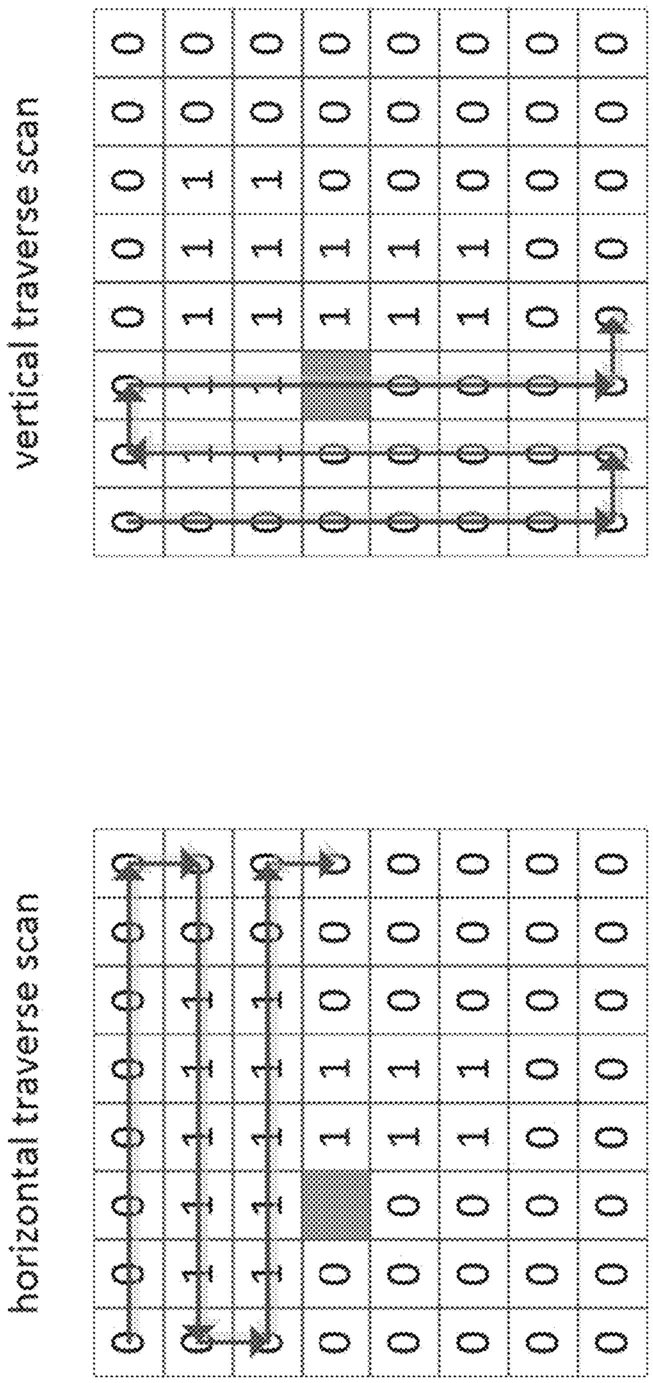
FIG. 10 shows an example of horizontal and vertical traverse scans.
Figure 11:
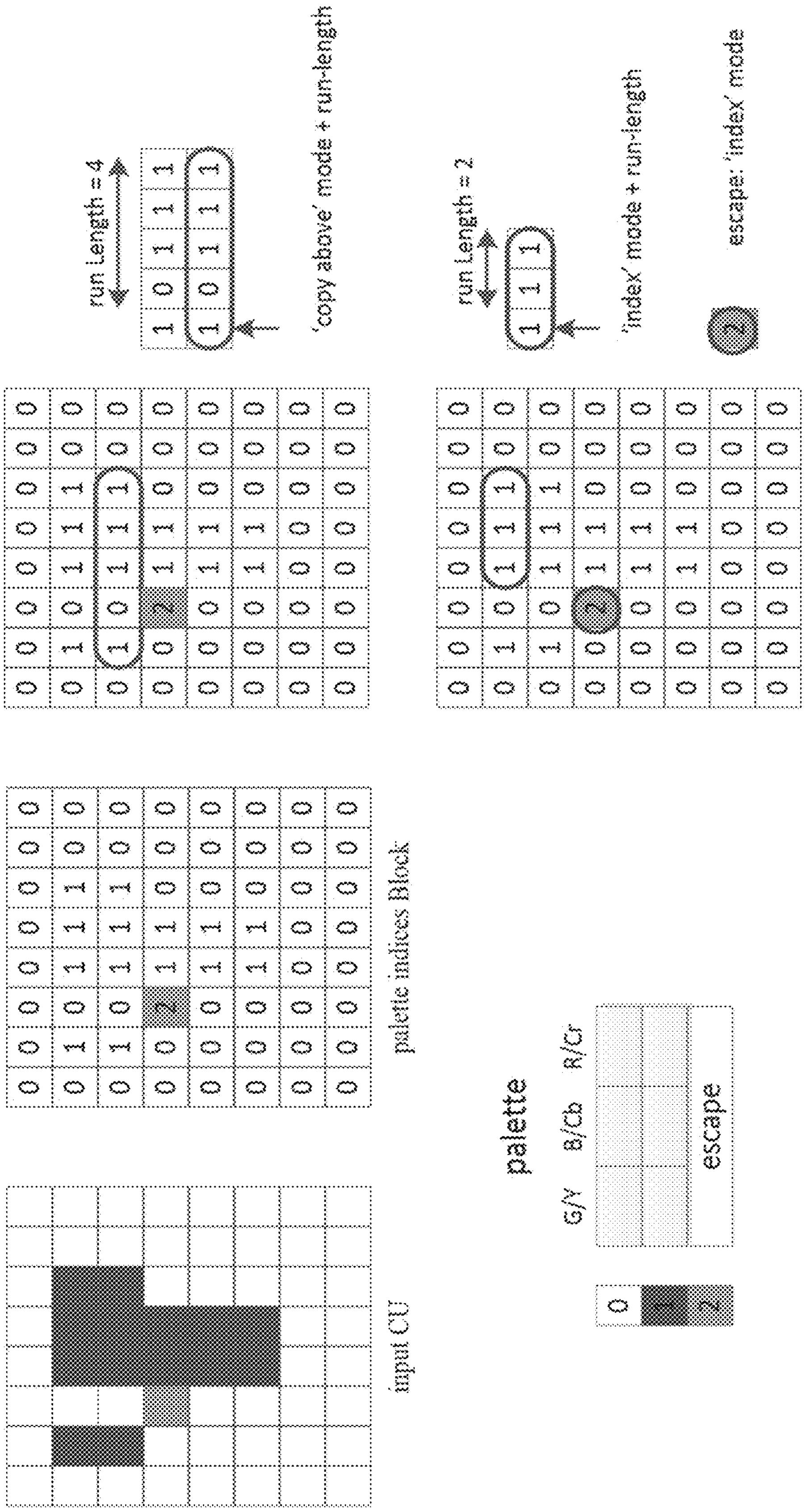
FIG. 11 shows an example of coding of palette indices.

The basic idea behind a palette mode is that the pixels in the coding unit (CU) are represented by a small set of representative colour values. This set is referred to as the palette. And it is also possible to indicate a sample that is outside the palette by signalling an escape symbol followed by (possibly quantized) component values. This kind of pixel is called an escape pixel. The palette mode is illustrated in FIG. 10. As depicted in FIG. 10, for each pixel with three color components (luma, and two chroma components), an index to the palette is founded, and the block could be reconstructed based on the founded values in the palette.

2.10.2 Coding of the palette entries

For a palette coded blocks, the following key aspects are introduced:

(1) Construct the current palette based on a predictor palette and new entries signaled for current palette, if existing.

(2) Classify the current samples/pixels to two categories: one (1st category) to include samples/pixels in the current palette, and the other (2nd category) to include samples/pixels beyond the current palette.

A. For the samples/pixels in the 2nd category, quantization (at encoder) is applied to samples/pixels and quantized values are signaled; and dequantization (at decoder) is applied.

2.10.2.1 Predictor Palette

For coding of the palette entries, a predictor palette is maintained which is updated after decoding a palette coded block.

2.10.2.1.1 Initialization of Predictor Palette

The predictor palette is initialized at the beginning of each slice and each tile. The maximum size of the palette as well as the predictor palette is signalled in the SPS. In HEVC-Screen Content Coding (SCC), a palette_predictor_initializer_present_flag is introduced in the PPS. When this flag is 1, entries for initializing the predictor palette are signalled in the bitstream.

Depending on the value of the palette_predictor_initializer_present_flag, the size of predictor palette is reset to 0 or initialized using the predictor palette initializer entries signalled in the PPS. In HEVC-SCC, a predictor palette initializer of size 0 was enabled to allow explicit disabling of the predictor palette initialization at the PPS level.

Corresponding syntax, semantics and decoding process are defined as follows:

7.3.2.2.3 Sequence Parameter Set Screen Content Coding Extension Syntax

| sps_scc_extension( ) { | Descriptor |
|---|---|
| **sps_curr_pic_ref_enabled_flag** | u(1) |
| ***palette_mode_enabled_flag*** | *u(1)* |
| *if( palette_mode_enabled_flag ) {* | |
| ***palette_max_size*** | *ue(v)* |
| ***delta_palette_max_predictor_size*** | *ue(v)* |
| ***sps_palette_predictor_initializer_present_flag*** | *u(1)* |
| *if( sps_palette_predictor_initializer_present_flag) {* | |
| ***sps_num_palette_predictor_initializer_minus1*** | *ue(v)* |
| *numComps = ( chroma_format_idc = = 0 ) ? 1 : 3* | |
| *for( comp = 0; comp < numComps; comp++ )* | |
| *for( i = 0; i <= sps_num_palette_predictor_initializer_minus1; i++ )* | |
| ***sps_palette_predictor_initializers[ comp ][ i ]*** | *u(v)* |
| } | |
| } | |
| **motion_vector_resolution_control_idc** | u(2) |
| **intra_boundary_filtering_disabled_flag** | u(1) |
| } | |

palette_mode_enabled_flag equal to 1 specifies that the decoding process for palette mode may be used for intra blocks. palette_mode_enabled_flag equal to 0 specifies that the decoding process for palette mode is not applied. When not present, the value of palette_mode_enabled_flag is inferred to be equal to 0.

palette_max_size specifies the maximum allowed palette size. When not present, the value of palette_max_size is inferred to be 0.

delta_palette_max_predictor_size specifies the difference between the maximum allowed palette predictor size and the maximum allowed palette size. When not present, the value of delta_palette_max_predictor size is inferred to be 0. The variable PaletteMaxPredictorSize is derived as follows:

PaletteMaxPredictorSize=palette_max_size+delta_palette_max_predictor_size (0-57) It may be a requirement of bitstream conformance that the value of delta_palette_max_predictor size may be equal to 0 when palette_max_size is equal to 0. sps_palette_predictor_initializer_present_flag equal to 1 specifies that the sequence palette predictors are initialized using the sps_palette_predictor_initializers.

sps_palette_predictor_initializer_flag equal to 0 specifies that the entries in the sequence palette predictor are initialized to 0. When not present, the value of sps_palette_predictor_initializer_flag is inferred to be equal to 0.

It may be a requirement of bitstream conformance that the value of sps_palette_predictor_initializer_present_flag may be equal to 0 when palette_max_size is equal to 0.

sps_num_palette_predictor_initializer_minus1 plus 1 specifies the number of entries in the sequence palette predictor initializer.

It may be a requirement of bitstream conformance that the value of sps_num_palette_predictor_initializer_minus1 plus 1 may be less than or equal to PaletteMaxPredictorSize.

sps_palette_predictor_initializers[comp][i] specifies the value of the comp-th component of the i-th palette entry in the SPS that is used to initialize the array PredictorPaletteEntries. For values of i in the range of 0 to sps_num_palette_predictor_initializer_minus1, inclusive, the value of the sps_palette_predictor_initializers[0][i] may be in the range of 0 to (1<<BitDepth$_Y$)−1, inclusive, and the values of sps_palette_predictor_initializers[1][i] and sps_palette_predictor_initializers[2][i] may be in the range of 0 to (1<<BitDepth$_C$)−1, inclusive.

7.3.2.3.3 Picture Parameter Set Screen Content Coding Extension Syntax

| pps_scc_extension( ) { | Descriptor |
|---|---|
| **pps_curr_pic_ref_enabled_flag** | u(1) |
| **residual_adaptive_colour_transform_enabled_flag** | u(1) |
| if( residual_adaptive_colour_transform_enabled_flag ) { | |
| **pps_slice_act_qp_offsets_present_flag** | u(1) |
| **pps_act_y_qp_offset_plus5** | se(v) |
| **pps_act_cb_qp_offset_plus5** | se(v) |
| **pps_act_cr_qp_offset_plus3** | se(v) |
| } | |
| ***pps_palette_predictor_initializer_present_flag*** | *u(1)* |
| *if( sps_palette_predictor_initializer_present_flag) {* | |
| ***pps_num_palette_predictor_initializer*** | *ue(v)* |
| *if( pps_num_palette_predictor_initializer> 0 ) {* | |
| ***monochrome_palette_flag*** | *u(1)* |
| ***luma_bit_depth_entry_minus8*** | *ue(v)* |
| *if( !monochrome_palette_flag )* | |
| ***chroma_bit_depth_entry_minus8*** | *ue(v)* |
| *numComps = monochrome_palette_flag? 1 : 3* | |
| *for( comp = 0; comp < numComps; comp++ )* | |
| *for( i = 0; i < pps_num_palette_predictor_initializer; i++ )* | |
| ***pps_palette_predictor_initializers[ comp ][ i ]*** | *u(v)* |
| } | |
| } | |
| } | |

pps_palette_predictor_initializer_present_flag equal to 1 specifies that the palette predictor initializers used for the pictures referring to the PPS are derived based on the palette predictor initializers specified by the PPS. pps_palette_predictor_initializer_flag equal to 0 specifies that the palette predictor initializers used for the pictures referring to the PPS are inferred to be equal to those specified by the active SPS. When not present, the value of pps_palette_predictor_initializer_present_flag is inferred to be equal to 0.

It may be a requirement of bitstream conformance that the value of pps_palette_predictor_initializer_present_flag may be equal to 0 when either palette_max_size is equal to 0 or palette_mode_enabled_flag is equal to 0.

pps_num_palette_predictor_initializer specifies the number of entries in the picture palette predictor initializer.

It may be a requirement of bitstream conformance that the value of pps_num_palette_predictor_initializer may be less than or equal to PaletteMaxPredictorSize.

The palette predictor variables are initialized as follows:

If the coding tree unit is the first coding tree unit in a tile, the following applies:

The initialization process for palette predictor variables is invoked

Otherwise, if entropy_coding_sync_enabled_flag is equal to 1 and either CtbAddrInRs % PicWidthInCtbsY is equal to 0 or TileId[CtbAddrInTs] is not equal to TileId[CtbAddrRsToTs[CtbAddrInRs-1]], the following applies:

The location (xNbT, yNbT) of the top-left luma sample of the spatial neighbouring block T is derived using the location (x0, y0) of the top-left luma sample of the current coding tree block as follows:

$$(xNbT, yNbT)=(x0+CtbSizeY, y0-CtbSizeY) \quad (0\text{-}58)$$

The availability derivation process for a block in z-scan order is invoked with the location (xCurr, yCurr) set equal to (x0, y0) and the neighbouring location (xNbY, yNbY) set equal to (xNbT, yNbT) as inputs, and the output is assigned to availableFlagT.

The synchronization process for context variables, Rice parameter intialization states, and palette predictor variables is invoked as follows:

If availableFlagT is equal to 1, the synchronization process for context variables, Rice parameter initialization states, and palette predictor variable is invoked with TableStateIdxWpp, TableMpsValWpp, TableStatCoeffWpp, PredictorPaletteSizeWpp, and TablePredictorPaletteEntriesWpp as inputs.

Otherwise, the following applies:

The initialization process for palette predictor variables is invoked.

Otherwise, if CtbAddrInRs is equal to slice_segment_address and dependent_slice_segment_flag is equal to 1, the synchronization process for context variables and Rice parameter initialization states is invoked with TableStateIdxDs, TableMpsValDs, TableStatCoeffDs, PredictorPaletteSizeDs, and TablePredictorPaletteEntriesDs as inputs.

Otherwise, the following applies:

The initialization process for palette predictor variables is invoked.

9.3.2.3 Initialization Process for Palette Predictor Entries

Outputs of this process are the initialized palette predictor variables PredictorPaletteSize and PredictorPaletteEntries.

The variable numComps is derived as follows:

$$numComps=(ChromaArrayType==0)?1:3 \quad (0\text{-}59)$$

If pps_palette_predictor_initializer_present_flag is equal to 1, the following applies:

PredictorPaletteSize is set equal to pps_num_palette_predictor_initializer.

The array PredictorPaletteEntries is derived as follows:

$$for(comp=0;\ comp<numComps;\ comp++)\ for(i=0;\ i<PredictorPaletteSize;\ i++) \quad (0\text{-}60)$$

$$PredictorPaletteEntries[comp][i]=pps\_palette\_predictor\_initializers[comp][i]$$

Otherwise (pps_palette_predictor_initializer_present_flag is equal to 0), if sps_palette_predictor_initializer_present_flag is equal to 1, the following applies:

PredictorPaletteSize is set equal to sps_num_palette_predictor_initializer_minus1 plus 1.

The array PredictorPaletteEntries is derived as follows:

$$for(comp=0;\ comp<numComps;\ comp++)\ for(i=0;\ i<PredictorPaletteSize;\ i++) \quad (0\text{-}61)$$

$$PredictorPaletteEntries[comp][i]= sps\_palette\_predictor\_initializers[comp][i]$$

Otherwise (pps_palette_predictor_initializer_present_flag is equal to 0 and sps_palette_predictor_initializer_present_flag is equal to 0), PredictorPaletteSize is set equal to 0.

2.10.2.1.2 Usage of Predictor Palette

For each entry in the palette predictor, a reuse flag is signalled to indicate whether it is part of the current palette. This is illustrated in FIG. 9. The reuse flags are sent using run-length coding of zeros. After this, the number of new palette entries are signalled using Exponential Golomb (EG) code of order 0, i.e., EG-0. Finally, the component values for the new palette entries are signalled.

2.10.2.2 Updating of Predictor Palette

Updating of predictor palette is performed with the follow steps:

(1) before decoding current block, there is a predictor palette, denoted by PltPred0

(2) construct current palette table by inserting those from PltPred0 firstly, followed by new entries for current palette.

(3) Constructing PltPred1:

A. first add those in current palette table (which may include those from PltPred0)

B. if not full, then add un-referenced in PltPred0 according to ascending entry index.

2.10.3 Coding of Palette Indices

Figure 15:
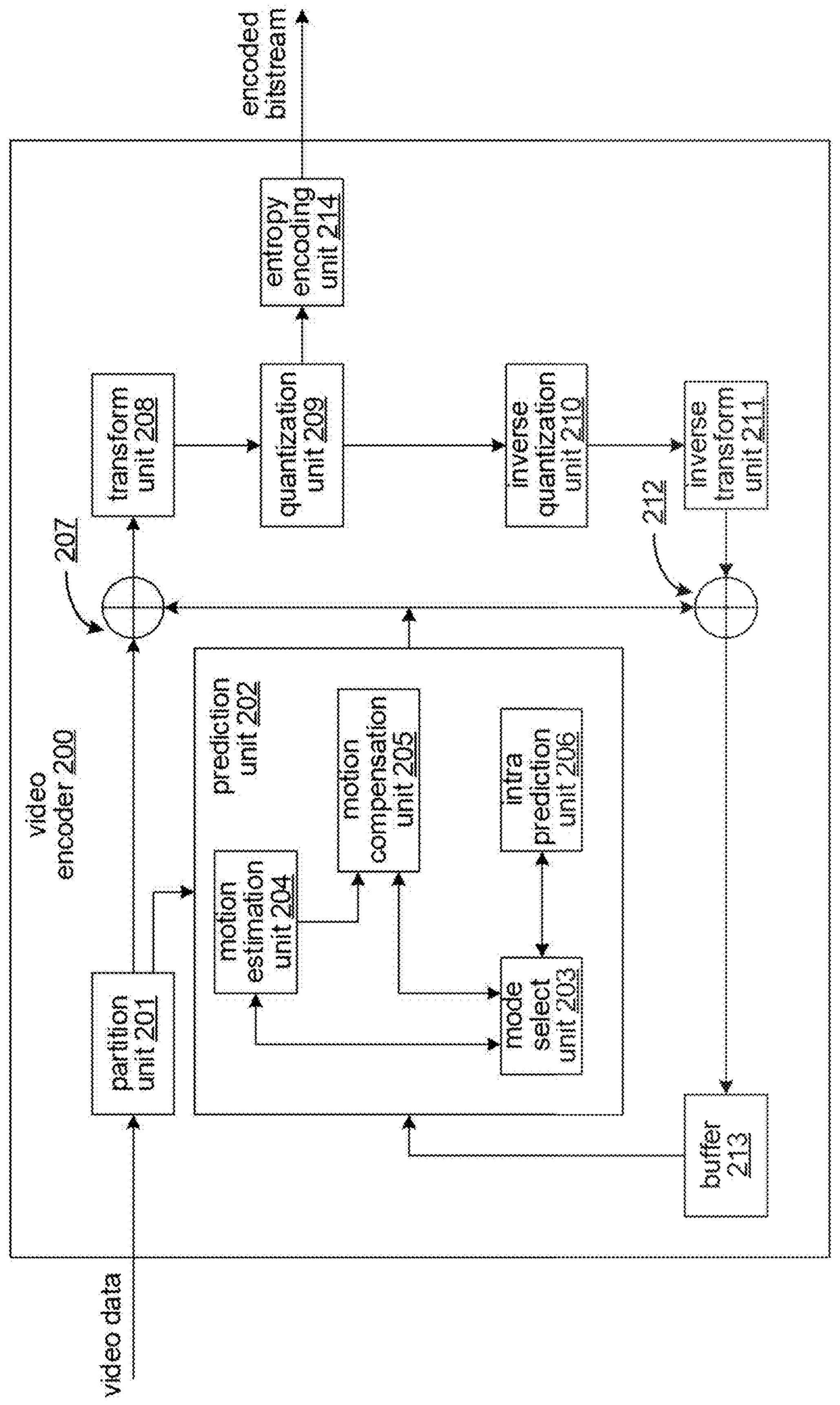
FIG. 15 is a block diagram that illustrates an encoder in accordance with some embodiments of the present disclosure.

The palette indices are coded using horizontal and vertical traverse scans as shown in FIG. 15. The scan order is explicitly signaled in the bitstream using the palette_transpose_flag. For the rest of the subsection it is assumed that the scan is horizontal.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT' and 'COPY_ABOVE' modes, a run value is signaled which specifies the number of subsequent samples that are also coded using the same mode.

Figure 16:
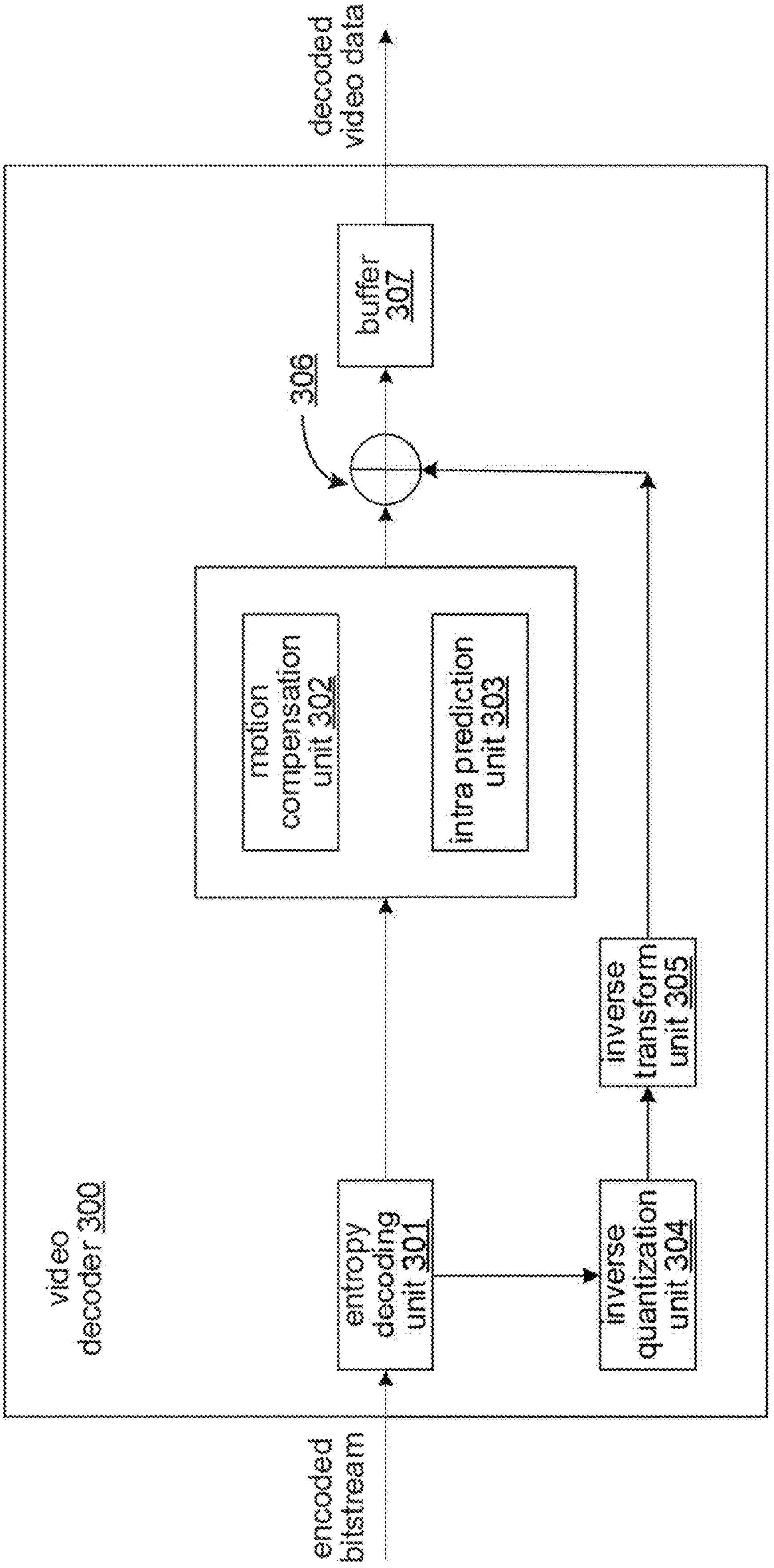
FIG. 16 is a block diagram that illustrates a decoder in accordance with some embodiments of the present disclosure.

In the palette mode, the value of an index for the escape sample is the number of palette entries. And, when escape symbol is part of the run in 'COPY_LEFT' or 'COPY_ABOVE' mode, the escape component values are signaled for each escape symbol. The coding of palette indices is illustrated in FIG. 16.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode. The binarization of escape samples is EG coding with $3^{rd}$ order, i.e., EG-3.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In addition, there is an index adjustment process in the palette index coding. When signaling a palette index, the left neighboring index or the above neighboring index should be different from the current index. Therefore, the range of the current palette index could be reduced by 1 by removing one possibility. After that, the index is signaled with truncated binary (TB) binarization.

The texts related to this part is shown as follows, where the CurrPaletteIndex is the current palette index and the adjustedRefPaletteIndex is the prediction index.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] may be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev =
x0 + TraverseScanOrder[ log2Cb Width ][ log2bHeight ][ PaletteScanPos − 1 ][ 0 ]
  ycPrev =
y0 + TraverseScanOrder[ log2Cb Width ][ log2bHeight ][ PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ] {(7-157)
  }
  else {
    if( !palette_transpose_flag )
    adjustedRefPaletteIndex = PaletteIndexMap[ xC ][ yC − 1 ]
    else
    adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:

if(CurrPaletteIndex>=adjustedRefPaletteIndex) CurrPaletteIndex++

2.10.3.1 Decoding Process of a Palette Coded Block 1) read prediction information to mark which of entries in the predictor palette will be reused; (palette_predictor_run)
2) read new palette entries for the current block
    a) num_signalled_palette_entries
    b) new_palette_entries
3) construct CurrentPaletteEntries based on a) and b)
4) read escape symbol present flag: palette_escape_val_present_flag to derive the MaxPaletteIndex
5) code how many samples that are not coded with copy mode/run mode
    a) num_palette_indices_minus1
    b) for each sample that is not coded with copy mode/run mode, code the palette_idx_idc in the current plt table 2.11 Merge Estimation Region (MER)

Figure 12:
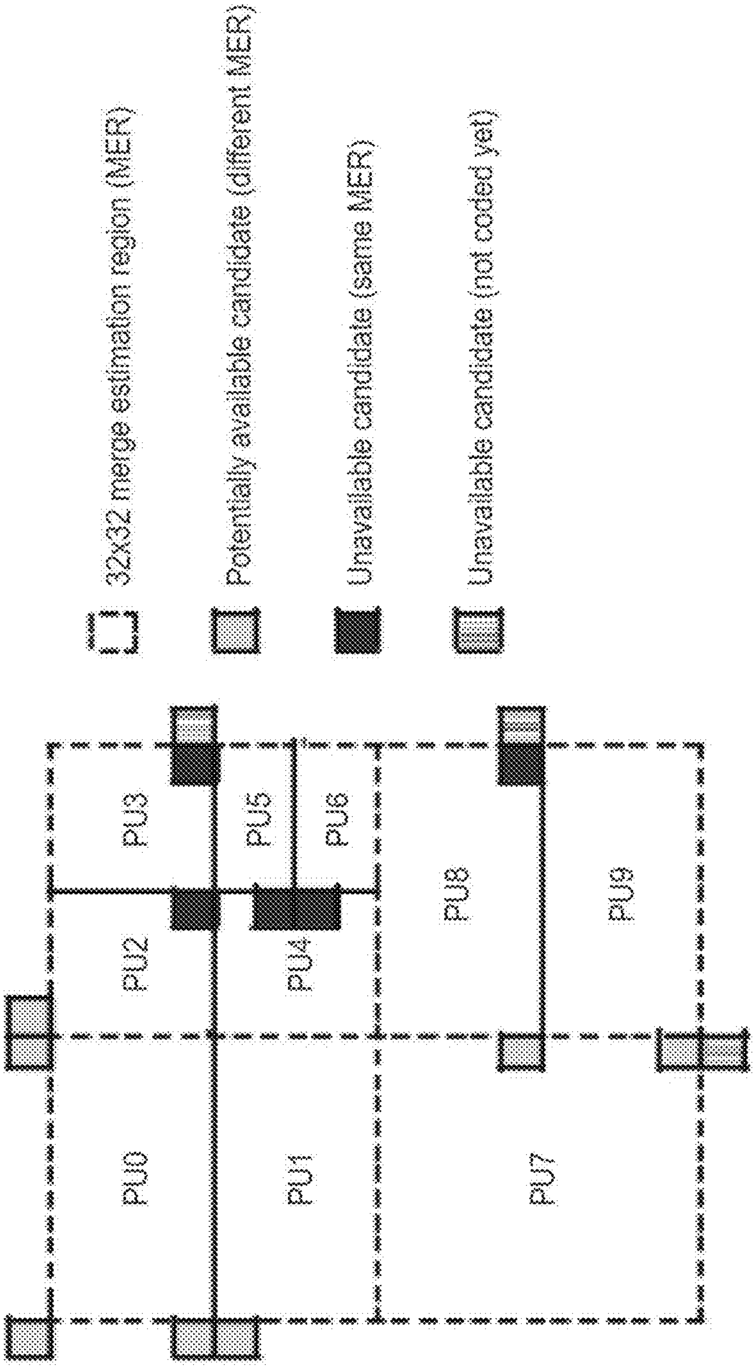
FIG. 12 shows an example of merge estimation region (MER).

MER is adopted into HEVC. The way the merge candidate list is constructed introduces dependencies between neighboring blocks. Especially in embedded encoder implementations, the motion estimation stage of neighboring blocks is typically performed in parallel or at least pipelined to increase the throughput. For AMVP, this is not a big issue since the MVP is generally only used to differentially code the MV found by the motion search. The motion estimation stage for the merge mode, however, would typically just consist of the candidate list construction and the decision which candidate to choose, based on a cost function. Due to the aforementioned dependency between neighboring blocks, merge candidate lists of neighboring blocks cannot be generated in parallel and represent a bottleneck for parallel encoder designs. Therefore, a parallel merge estimation level was introduced in HEVC that indicates the region in which merge candidate lists can be independently derived by checking whether a candidate block is located in that merge estimation region (MER). A candidate block that is in the same MER is not included in the merge candidate list. Hence, its motion data does not need to be available at the time of the list construction. When this level is e.g. 32, all prediction units in a 32×32 area can construct the merge candidate list in parallel since all merge candidates that are in the same 32×32 MER, are not inserted in the list. FIG. 12 illustrates that example showing a CTU partitioning with seven CUs and ten Prediction Units (PUs). All potential merge candidates for the first PUO are available because they are outside the first 32×32 MER.

For the second MER, merge candidate lists of PUs 2-6 cannot include motion data from these PUs when the merge estimation inside that MER should be independent. Therefore, when looking at a PU for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log2_parallel_merge_level_minus2 in the picture parameter set. The following MER sizes are allowed: 44 (no parallel merge estimation possible), 8×8, 16×16, 32×32 and 64×64. A higher degree of parallelization, enabled by a larger MER, excludes more potential candidates from the merge candidate list. That, on the other hand, decreases the coding efficiency. When the merge estimation region is larger than a 4×4 block, another modification of the merge list construction to increase the throughput kicks in. For a CU with an 88 luma CB, only a single merge candidate list is used for all PUs inside that CU.

3. Examples of Technical Problems Solved by Disclosed Embodiments (1) There are some designs that can violate the sub-picture constrain.

A. TMVP in the affine constructed candidates may fetch a MV in the collocated picture out of the range of the current sub-picture.

B. When deriving gradients in Bi-Directional Optical Flow (BDOF) and Prediction Refinement Optical Flow (PROF), two extended rows and two extended columns of integer reference samples are required to be fetched. These reference samples may be out of the range of the current sub-picture.

C. When deriving the chroma residual scaling factor in luma mapping chroma scaling (LMCS), the accessed reconstructed luma samples may be out of the range of the range of the current sub-picture.

D. The neighboring block may be out of the range of the current sub-picture, when deriving the luma intra prediction mode, reference samples for intra prediction, reference samples for cross-component linear model (CCLM), neighboring block availability for spatial neighboring candidates for merge/AMVP/CIIP/IBC/LMCS, quantization parameters, Context-adaptive binary arithmetic coding (CABAC) initialization process, ctxInc derivation using left and above syntax elements, and ctxIncfor the syntax element mtt_split_cu_vertical_flag. The representation of sub-picture may lead to sub-picture with incomplete CTUs. The CTU partitions and CU splitting process may need to consider incomplete CTUs.

(2) The signaled syntax elements related to sub-picture may be arbitrarily large, which may cause an overflow problem.

(3) The representation of sub-pictures may lead to non-rectangular sub-pictures.

(4) Currently the sub-picture and sub-picture grid is defined in units of 4 samples. And the length of syntax element is dependent on the picture height divided by 4. However, since the current pic_width_in_luma_samples and pic_height_in_luma_samples may be an integer multiple of Max(8, MinCbSizeY), the sub-picture grid may need to be defined in units of 8 samples.

(5) The SPS syntax, pic_width_max_in_luma_samples and pic_height_max_in_luma_samples may need to be restricted to be no smaller than 8.

(6) Interaction between reference picture resampling/scalability and sub-picture is not considered in the current design.

(7) In temporal filtering, samples across different sub-pictures may be required.

(8) When signaling the slices, the information could be inferred without signaling in some cases.

(9) It is possible that all the defined slices cannot cover the whole picture or sub-picture.

(10) The IDs of two sub-pictures may be identical.

(11) pic_width_max_in_luma_samples/CtbSizeY may be equal to 0, resulting in a meaningless Log2( ) operation.

(12) ID in PH is more preferable than in PPS, but less preferable than in SPS, which is inconsistent.

(13) log2_transform_skip_max_size_minus2 in PPS is parsed depending on sps_transform_skip_enabled_flag in SPS, resulting in a parsing dependency.

(14) loop_filter_across_subpic_enabled_flag for deblocking only consider the current sub-picture, without considering the neighbouring sub-picture.

(15) In applications, sub-pictures are designed to provide a flexibility that regions at the same positions in pictures of a sequences can be decoded or extracted independently. The region may be under some special requirements. For example, it may be a Region of Interest (ROI), which requires a high quality. In another example, it may serve as a trace for fast skimming the video. In still another example, it may provide a low-resolution, low-complexity and low power-consuming bit-stream, which may be fed to a complexity-sensitive end user. All those applications may require that the region of a sub-picture should be encoded with a configuration different to other parts. However, in the current VVC, there is no mechanisms that can configure sub-pictures independently.

4. Example Techniques and Embodiments

The detailed listing below should be considered as examples to explain general concepts. These items should not be interpreted in a narrow way. Furthermore, these items can be combined in any manner. Hereinafter, temporal filter is used to represent filters that require samples in other pictures. Max (x, y) returns the larger one of x and y. Min (x, y) returns the smaller one of x and y.

1. The position (named position RB) at which a temporal MV predictor is fetched in a picture to generate affine motion candidates (e.g. a constructed affine merge candidate) must be in a required sub-picture, assuming the top-left corner coordinate of the required sub-picture is (xTL, yTL) and bottom-right coordinate of the required sub-picture is (xBR, yBR).
   a. In one example, the required sub-picture is the sub-picture covering the current block.
   b. In one example, if position RB with a coordinate (x, y) is out of the required sub-picture, the temporal MV predictor is treated as unavailable.
      i. In one example, position RB is out of the required sub-picture if x>xBR.
      ii. In one example, position RB is out of the required sub-picture if y>yBR.
      iii. In one example, position RB is out of the required sub-picture if x<xTL.
      iv. In one example, position RB is out of the required sub-picture if y<yTL.
   c. In one example, position RB, if outside of the required sub-picture, a replacement of RB is utilized.
      i. Alternatively, furthermore, the replacement position may be in the required sub-picture.
   d. In one example, position RB is clipped to be in the required sub-picture.
      i. In one example, x is clipped as x=Min (x, xBR).
      ii. In one example, y is clipped as y=Min (y, yBR).
      iii. In one example, x is clipped as x=Max (x, xTL).
      iv. In one example, y is clipped as y=Max (y, yTL).

e. In one example, the position RB may be the bottom right position inside the corresponding block of current block in the collocated picture.
f. The proposed method may be utilized in other coding tools which require to access motion information from a picture different than the current picture.
g. In one example, whether the above methods are applied (e.g., position RB must be in a required sub-picture (e.g. to do as claimed in 1.a and/or 1.b)) may depend on one or more syntax elements signaled in VPS/DPS/SPS/PPS/Adaptation Parameter Set (APS)/slice header/tile group header. For example, the syntax element may be subpic_treated_as_pic_flag[SubPicIdx], where SubPicIdx is the sub-picture index of sub-picture covering the current block.

2. The position (named position S) at which an integer sample is fetched in a reference not used in the interpolation process must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position S with a coordinate (x, y) is out of the required sub-picture, the reference sample is treated as unavailable.
      i. In one example, position S is out of the required sub-picture if x>xBR.
      ii. In one example, position S is out of the required sub-picture if y>yBR.
      iii. In one example, position S is out of the required sub-picture if x<xTL.
      iv. In one example, position S is out of the required sub-picture if y<yTL.
   c. In one example, position S is clipped to be in the required sub-picture.
      i. In one example, x is clipped as x=Min (x, xBR).
      ii. In one example, y is clipped as y=Min (y, yBR).
      iii. In one example, x is clipped as x=Max (x, xTL).
      iv. In one example, y is clipped as y=Max (y, yTL).
   d. In one example, whether position S must be in a required sub-picture (e.g. to do as claimed in 2.a and/or 2.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched integer sample is used to generate gradients in BDOF and/or prediction refinement with the optical flow (PROF).

3. The position (named position R) at which the reconstructed luma sample value is fetched may be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position R with a coordinate (x, y) is out of the required sub-picture, the reference sample is treated as unavailable.
      i. In one example, position R is out of the required sub-picture if x>xBR.
      ii. In one example, position R is out of the required sub-picture if y>yBR.
      iii. In one example, position R is out of the required sub-picture if x<xTL.
      iv. In one example, position R is out of the required sub-picture if y<yTL.
   c. In one example, position R is clipped to be in the required sub-picture.
      i. In one example, x is clipped as x=Min (x, xBR).
      ii. In one example, y is clipped as y=Min (y, yBR).
      iii. In one example, x is clipped as x=Max (x, xTL).
      iv. In one example, y is clipped as y=Max (y, yTL).
   d. In one example, whether position R must be in a required sub-picture (e.g. to do as claimed in 4.a and/or 4.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched luma sample is used to derive the scaling factor for the chroma component(s) in LMCS.

4. The position (named position N) at which the picture boundary check for BT/TT/QT splitting, BT/TT/QT depth derivation, and/or the signaling of CU split flag must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position N with a coordinate (x, y) is out of the required sub-picture, the reference sample is treated as unavailable.
      i. In one example, position N is out of the required sub-picture if x>xBR.
      ii. In one example, position N is out of the required sub-picture if y>yBR.
      iii. In one example, position N is out of the required sub-picture if x<xTL.
      iv. In one example, position N is out of the required sub-picture if y<yTL.
   c. In one example, position N is clipped to be in the required sub-picture.
      i. In one example, x is clipped as x=Min (x, xBR).
      ii. In one example, y is clipped as y=Min (y, yBR).
      iii. In one example, x is clipped as x=Max (x, xTL).
   d. In one example, y is clipped as y=Max (y, yTL). In one example, whether position N must be in a required sub-picture (e.g. to do as claimed in 5.a and/or 5.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.

5. History-based Motion Vector Prediction (HMVP) table may be reset before decoding a new sub-picture in one picture.
   a. In one example, the HMVP table used for IBC coding may be reset
   b. In one example, the HMVP table used for inter coding may be reset
   c. In one example, the HMVP table used for intra coding may be reset 6. The sub-picture syntax elements may be defined in units of N (such as N=8, 32, and etc.) samples.

a. In one example, the width of each element of the sub-picture identifier grid in units of N samples.
b. In one example, the height of each element of the sub-picture identifier grid in units of N samples.
c. In one example, N is set to the width and/or height of CTU.

7. The syntax element of picture width and picture height may be restricted to be no smaller than K (K>=8).
a. In one example, the picture width may need to be restricted to be no smaller than 8.
b. In one example, the picture height may need to be restricted to be no smaller than 8.

8. A conformance bitstream may satisfy that sub-picture coding and Adaptive resolution conversion (ARC)/Dynamic resolution conversion (DRC)/Reference picture resampling (RPR) are disallowed to be enabled for one video unit (e.g., sequence).
a. In one example, signaling of enabling sub-picture coding may be under the conditions of disallowing ARC/DRC/RPR.
i. In one example, when sub-picture is enabled, such as subpics_present_flag equal to 1, pic_width_in_luma_samples for all pictures for which this SPS is active is is equal to max_width_in_luma_samples.
b. Alternatively, sub-picture coding and ARC/DRC/RPR may be both enabled for one video unit (e.g., sequence).
i. In one example, a conformance bitstream may satisfy that the donwsampled sub-picture due to ARC/DRC/RPR may still be in the form of K CTUs in width and M CTUs in height wherein K and M are both integers.
ii. In one example, a conformance bitstream may satisfy that for sub-pictures not located at picture boundaries (e.g., right boundary and/or bottom boundary), the donwsampled sub-picture due to ARC/DRC/RPR may still be in the form of K CTUs in width and M CTUs in height wherein K and M are both integers.
iii. In one example, CTU sizes may be adaptively changed based on the picture resolution.
1) In one example, a max CTU size may be signaled in SPS. For each picture with less resolution, the CTU size may be changed accordingly based on the reduced resolution.
2) In one example, CTU size may be signaled in SPS and PPS, and/or sub-picture level.

9. The syntax element subpic_grid_col_width_minus1 and subpic_grid_row_height_minus1 may be constrained.
a. In one example, subpic_grid_col_width_minus1 must be no larger (or must be smaller) than T1.
b. In one example, subpic_grid_row_height_minus1 must be no larger (or must be smaller) than T2.
c. In one example, in a conformance bit-stream, subpic_grid_col_width_minus1 and/or subpic_grid_row_height_minus1 must follow the constraint such as bullet 3.a or 3.b.
d. In one example, T1 in 3.a and/or T2 in 3.b may depend on profiles/levels/tiers of a video coding standard.
e. In one example, T1 in 3.a may depend on the picture width.
i. For example, T1 is equal to pic_width_max_in_luma_samples/4 or pic_width_max_in_luma_samples/4+Off. Off may be 1, 2,−1,−2, etc.
f. In one example, T2 in 3.b may depend on the picture width.
i. For example, T2 is equal to pic_height_max_in_luma_samples/4 or pic_height_max_in_luma_samples/4-1+Off. Off may be 1, 2,−1, −2, etc.

10. It is constrained that a boundary between two sub-pictures must be a boundary between two CTUs.
a. In other words, a CTU cannot be covered by more than one sub-picture.
b. In one example, the unit of subpic_grid_col_width_minus1 may be the CTU width (such as 32, 64, 128), instead of 4 as in VVC. The sub-picture grid width should be (subpic_grid_col_width_minus1+1)* CTU width.
c. In one example, the unit of subpic_grid_col_height_minus1 may be the CTU height (such as 32, 64, 128), instead of 4 as in VVC. The sub-picture grid height should be (subpic_grid_col_height_minus1+1)* CTU height.
d. In one example, in a conformance bit-stream, the constraint must be satisfied if the sub-picture approach is applied.

11. It is constrained that the shape of a sub-picture must be rectangular.
a. In one example, in a conformance bit-stream, the constraint must be satisfied if the sub-picture approach is applied.
b. Sub-picture may only contain rectangular slices. For example, in a conformance bit-stream, the constraint must be satisfied if the sub-picture approach is applied.

12. It is constrained that two sub-pictures cannot be overlapped.
a. In one example, in a conformance bit-stream, the constraint must be satisfied if the sub-picture approach is applied.
b. Alternatively, two sub-pictures may be overlapped with each other.

13. It is constrained that any position in the picture must be covered by one and only one sub-picture.
a. In one example, in a conformance bit-stream, the constraint must be satisfied if the sub-picture approach is applied.
b. Alternatively, one sample may not belong to any sub-picture.
c. Alternatively, one sample may belong to more than one sub-picture.

14. It may be constrained that sub-pictures defined in a SPS mapped to every resolution presented in the same sequence should obey the location and/or size constrained mentioned above.
a. In one example, the width and height of a sub-picture defined in the SPS mapped to a resolution presented in the same sequence, should be integer multiple times of N (such as 8, 16, 32) luma samples.
b. In one example, sub-pictures may be defined for certain layers and may be mapped to other layers.
i. For example, sub-pictures may be defined for the layer with the highest resolution in the sequence.
ii. For example, sub-pictures may be defined for the layer with the lowest resolution in the sequence.
iii. Which layer the sub-pictures are defined for may be signaled in SPS/VPS/PPS/slice header.
c. In one example, when sub-pictures and different resolutions are both applied, all resolutions (e.g., width or/and height) may be integer multiple of a given resolution.

d. In one example, the width and/or height of a sub-picture defined in the SPS may be integer multiple times (e.g., M) of the CTU size.

e. Alternatively, sub-pictures and different resolutions in a sequence may not be allowed simultaneously.

15. Sub-pictures may only apply to a certain layer(s)

a. In one example, sub-pictures defined in a SPS may only apply to the layer with the highest resolution in a sequence.

b. In one example, sub-pictures defined in a SPS may only apply to the layer with the lowest temporal id in a sequence.

c. Which layer(s) that sub-pictures may be applied to may be indicated by one or multiple syntax elements in SPS/VPS/PPS.

d. Which layer(s) that sub-picture cannot be applied to may be indicated by one or multiple syntax elements in SPS/VPS/PPS.

16. In one example, the position and/or dimensions of a sub-picture may be signaled without using subpic_grid_idx.

a. In one example, the top-left position of a sub-picture may be signaled.

b. In one example, the bottom-right position of a sub-picture may be signaled.

c. In one example, the width of sub-picture may be signaled.

d. In one example, the height of a sub-picture may be signaled.

17. For temporal filter, when performing the temporal filtering of a sample, only samples within the same sub-picture that the current sample belongs to may be used. The required samples may be in the same picture that the current sample belongs to or in other pictures.

18. In one example, whether to and/or how to apply a partitioning method (such as QT, horizontal BT, vertical BT, horizontal TT, vertical TT, or not split, etc.) may depend on whether the current block (or partition) crosses one or multiple boundary of a sub-picture.

a. In one example, the picture boundary handling method for partitioning in VVC may also be applied when a picture boundary is replaced by a sub-picture boundary.

b. In one example, whether to parse a syntax element (e.g. a flag) which represents a partitioning method (such as QT, horizontal BT, vertical BT, horizontal TT, vertical TT, or not split, etc.) may depend on whether the current block (or partition) crosses one or multiple boundary of a sub-picture.

19. Instead of splitting one picture into multiple sub-pictures with independent coding of each sub-picture, it is proposed to split a picture into at least two sets of sub-regions, with the first set including multiple sub-pictures and the second set including all the remaining samples.

a. In one example, a sample in the second set is not in any sub-pictures.

b. Alternatively, furthermore, the second set may be encoded/decoded based on the information of the first set.

c. In one example, a default value may be utilized to mark whether a sample/M×K sub-region belonging to the second set.

i. In one example, the default value may be set equal to (max_subpics_minus1+K) wherein K is an integer greater than 1.

ii. The default value may be assigned to subpic_grid_idx[i][j] to indicate that grid belongs to the second set.

20. It is proposed that the syntax element subpic_grid_idx[i][j] cannot be larger than max_subpics_minus1.

a. For example, it is constrained that in a conformance bit-stream, subpic_grid_idx[i][j] cannot be larger than max_subpics_minus1.

b. For example, the codeword to code subpic_grid_idx[i][j] cannot be larger than max_subpics_minus1.

21. It is proposed that, any integer number from 0 to max_subpics_minus1 must be equal to at least one subpic_grid_idx[i][j].

22. IBC virtual buffer may be reset before decoding a new sub-picture in one picture.

a. In one example, all the samples in the IBC virtual buffer may be reset to −1.

23. Palette entry list may be reset before decoding a new sub-picture in one picture.

a. In one example, PredictorPaletteSize may be set equal to 0 before decoding a new sub-picture in one picture.

24. Whether to signal the information of slices (e.g. number of slices and/or ranges of slices) may depend on the number of tiles and/or the number of bricks.

a. In one example, if the number of bricks in a picture is one, num_slices_in_pic_minus1 is not signaled and inferred to be 0.

b. In one example, if the number of bricks in a picture is one, the information of slices (e.g. number of slices and/or ranges of slices) may not be signaled.

c. In one example, if the number of bricks in a picture is one, the number of slices may be inferred to be one. And the slice covers the whole picture. In one example, if the number of bricks in a picture is one, single_brick_per_slice_flag is not signaled and inferred to be one.

i. Alternatively, if the number of bricks in a picture is one, single_brick_per_slice_flag must be one.

d. An exemplary syntax design is as below:

| pic_parameter_set_rbsp( ) { | Descriptor |
|---|---|
| . . . | |
| ***if(NumBricksInPic > 1){*** | |
| single_brick_per_slice_flag | u(1) |
| if( ! single_brick_per_slice_flag ) | |
| rect_slice_flag | u(1) |
| if( rect_slice_flag && !single_brick_per_slice_flag ) { | |
| num_slices_in_pic_minus1 | ue(v) |
| bottom_right_brick_idx_length_minus1 | ue(v) |
| for( i = 0; i < num_slices_in_pic_minus1; i++ ) { | |
| bottom_right_brick_idx_delta[ i ] | u(v) |
| brick_idx_delta_sign_flag[ i ] | u(1) |
| } | |
| } | |
| } | |
| loop_filter_across_bricks_enabled_flag | u(1) |
| if( loop_filter_across_bricks_enabled_flag ) | |
| loop_filter_across_slices_enabled_flag | u(1) |
| } | |
| . . . | |

25. Whether to signal slice_address may be decoupled from whether slices are signaled to be rectangles (e.g. whether rect_slice_flag is equal to 0 or 1).
    a. An exemplary syntax design is as below:

| | |
|---|---|
| if( [[rect_slice_flag \| \|]] NumBricksInPic > 1 ) | |
| slice_address | u(v) |

26. Whether to signal slice_address may depend on the number of slices when slices are signaled to be rectangles.

| | |
|---|---|
| if(( rect_slice_flag && num_slices_in_pic_minus1 > 0) \|\| (!rect_slice_flag && NumBricksInPic > 1 )) | |
| **slice_address** | u(v) |

27. Whether to signal num_bricks_in_slice_minus1 may depend on the slice_address and/or the number of bricks in the picture.
    a. An exemplary syntax design is as below:

| | |
|---|---|
| if( !rect_slice flag && ! single_brick-_per_slice_flag ***&& slice_address < NumBricksInPic -1*** | |
| num_bricks_in_slice_minus1 | ue(v) |

28. Whether to signal loop_filter_across_bricks_enabled_flag may depend on the number of tiles and/or the number of bricks.
    a. In one example, loop_filter_across_bricks_enabled_flag is not signaled if the number of bricks is less than 2.
    b. An exemplary syntax design is as below:

| | Descriptor |
|---|---|
| pic_parameter_set_rbsp( ) { | |
| ... | |
| ***if(NumBricksInPic > 1)*** | |
| loop_filter_across_bricks_enabled_flag | u(1) |
| if( loop_filter_across_bricks_enabled_flag) | |
| loop_filter_across_slices_enabled_flag | u(1) |
| ... | |

29. It may be a requirement of bitstream conformance that all the slices of a picture must cover the whole picture.
    a. The requirement must be satisfied when slices are signaled to be rectangles (e.g. rect_slice_flag is equal to 1).
30. It may be a requirement of bitstream conformance that all the slices of a sub-picture must cover the whole sub-picture.
    a. The requirement must be satisfied when slices are signaled to be rectangles (e.g. rect_slice_flag is equal to 1).
31. It may be a requirement of bitstream conformance that a slice cannot be overlapped with more than one sub-picture.
32. It may be a requirement of bitstream conformance that a tile cannot be overlapped with more than one sub-picture.
33. It may be a requirement of bitstream conformance that a brick cannot be overlapped with more than one sub-picture.

In the following discussion, a basic unit block (BUB) with dimensions CW× CH is a rectangle region. For example, a BUB may be a Coding Tree Block (CTB).

34. In one example, the number of sub-pictures (denoted as N) may be signaled.
    a. It may be required on a conformance bit-stream that there are at least two sub-pictures in a picture if sub-pictures are used (e.g. subpics_present_flag is equal to 1).
    b. Alternatively, N minus d (i.e., N-d) may be signaled, where d is an integer such as 0, 1, or 2.
    c. For example, N-d may be coded with fixed length coding e.g., u(x).
        i. In one example, x may be a fixed number such as 8.
        ii. In one example, x or x-dx may be signaled before N-d is signaled, where dx is an integer such as 0, 1 or 2. The signaled x may not be larger than a maximum value in a conformance bitstream.
        iii. In one example, x may be derived on-the-fly.
            1) For example, x may be derived as a function of the total number (denoted as M) of BUBs in the picture. E.g., x=Ceil(log2 (M+d0))+d1, where d0 and d1 are two integers, such as −2,−1, 0, 1, 2, etc. Here, Ceil( ) function returns the smallest integer value that is bigger than or equal to the input value.
            2) M may be derived as M=Ceiling (W/CW)× Ceiling (H/CH), where W and H represent the width and height of the picture, and CW and CH represent the width and height of a BUB.
    d. For example, N-d may be coded with a unary code or a truncated unary code.
    e. In one example, the allowed maximum value of N-d may be a fixed number.
        i. Alternatively, the allowed maximum value of N-d may be derived as a function of the total number (denoted as M) of BUBs in the picture. E.g., x=Ceil(log2 (M+d0))+d1, where d0 and d1 are two integers, such as −2, −1, 0, 1, 2, etc. Here, Ceil( ) function returns the smallest integer value that is bigger than or equal to the input value.
35. In one example, a sub-picture may be signaled by indications of one or multiple of its selected positions (e.g., top-left/top-right/bottom-left/bottom-right position) and/or its width and/or its height.
    a. In one example, the top-left position of a sub-picture may be signaled in the granularity of a basic unit block (BUB) with dimensions CW×CH.
        i. For example, the column index (denoted as Col) in terms of BUBs of the top-left BUB of the sub-picture may be signaled.
            1) For example, Col-d may be signaled, where d is an integer such as 0, 1, or 2.
                a) Alternatively, d may be equal to Col of a sub-picture previously coded, added by d1, where d1 is an integer such as −1,0, or 1.
                b) The sign of Col-d may be signaled.
        ii. For example, the row index (denoted as Row) in term of BUBs of the top-left BUB of the sub-picture may be signaled.
            1) For example, Row-d may be signaled, where d is an integer such as 0, 1, or 2.
                a) Alternatively, d may be equal to Row of a sub-picture previously coded, added by d1, where d1 is an integer such as−1,0, or 1.
                b) The sign of Row-d may be signaled.

iii. The row/column index (denoted as Row) mentioned above may be represented in the Coding Tree Block (CTB) unit, e.g., the x or y coordinate relative to the top-left position of a picture may be divided by CTB size and signaled.
iv. In one example, whether to signal the position of a sub-picture may depend on the sub-picture index.
1) In one example, for the first sub-picture within a picture, the top-left position may be not signaled.
a) Alternatively, furthermore, the top-left position may be inferred, e.g., to be (0, 0).
2) In one example, for the last sub-picture within a picture, the top-left position may be not signaled.
a) The top-left position may be inferred depending on information of sub-pictures previously signaled.

b. In one example, indications of the width/height/a selected position of a sub-picture may be signaled with truncated unary/truncated binary/unary/fixed length/K-th EG coding (e.g., K=0, 1, 2, 3).

c. In one example, the width of a sub-picture may be signaled in the granularity of a BUB with dimensions CW×CH.
i. For example, the number of columns of BUBs in the sub-picture (denoted as W) may be signaled.
ii. For example, W-d may be signaled, where d is an integer such as 0, 1, or 2.
1) Alternatively, d may be equal to W of a sub-picture previously coded, added by d1, where d1 is an integer such as−1,0, or 1.
2) The sign of W-d may be signaled.

d. In one example, the height of a sub-picture may be signaled in the granularity of a BUB with dimensions CW×CH.
i. For example, the number of rows of BUBs in the sub-picture (denoted as H) may be signaled.
ii. For example, H-d may be signaled, where d is an integer such as 0, 1, or 2.
1) Alternatively, d may be equal to H of a sub-picture previously coded, added by d1, where d1 is an integer such as−1,0, or 1.
2) The sign of H-d may be signaled.

e. In one example, Col-d may be coded with fixed length coding e.g. u(x).
i. In one example, x may be a fixed number such as 8.
ii. In one example, x or x-dx may be signaled before Col-d is signaled, where dx is an integer such as 0, 1 or 2. The signaled x may not be larger than a maximum value in a conformance bitstream.
iii. In one example, x may be derived on-the-fly.
1) For example, x may be derived as a function of the total number (denoted as M) of BUB columns in the picture. E.g., x=Ceil(log2 (M+d0))+d1, where d0 and d1 are two integers, such as −2,−1, 0, 1, 2, etc. Here, Ceil( ) function returns the smallest integer value that is bigger than or equal to the input value.
2) M may be derived as M=Ceiling (W/CW), where W represents the width of the picture, and CW represents the width of a BUB.

f. In one example, Row-d may be coded with fixed length coding e.g. u(x).
i. In one example, x may be a fixed number such as 8.
ii. In one example, x or x-dx may be signaled before Row-d is signaled, where dx is an integer such as 0, 1 or 2. The signaled x may not be larger than a maximum value in a conformance bitstream.
iii. In one example, x may be derived on-the-fly.
1) For example, x may be derived as a function of the total number (denoted as M) of BUB rows in the picture. E.g., x=Ceil(log2 (M+d0))+d1, where d0 and d1 are two integers, such as −2,−1, 0, 1, 2, etc. Here, Ceil( ) function returns the smallest integer value that is bigger than or equal to the input value.
2) M may be derived as M=Ceiling (H/CH), where H represents the height of the picture, and CH represents the height of a BUB.

g. In one example, W-d may be coded with fixed length coding e.g. u(x).
i. In one example, x may be a fixed number such as 8.
ii. In one example, x or x-dx may be signaled before W-d is signaled, where dx is an integer such as 0, 1 or 2. The signaled x may not be larger than a maximum value in a conformance bitstream.
iii. In one example, x may be derived on-the-fly.
1) For example, x may be derived as a function of the total number (denoted as M) of BUB columns in the picture. E.g., x=Ceil(log2 (M+d0))+d1, where d0 and d1 are two integers, such as −2,−1, 0, 1, 2, etc. Here, Ceil( ) function returns the smallest integer value that is bigger than or equal to the input value.
2) M may be derived as M=Ceiling (W/CW), where W represents the width of the picture, and CW represents the width of a BUB.

h. In one example, H-d may be coded with fixed length coding e.g. u(x).
i. In one example, x may be a fixed number such as 8.
ii. In one example, x or x-dx may be signaled before H-d is signaled, where dx is an integer such as 0, 1 or 2. The signaled x may not be larger than a maximum value in a conformance bitstream.
iii. In one example, x may be derived on-the-fly.
1) For example, x may be derived as a function of the total number (denoted as M) of BUB rows in the picture. E.g., x=Ceil(log2 (M+d0))+d1, where d0 and d1 are two integers, such as −2,−1, 0, 1, 2, etc. Here, Ceil( ) function returns the smallest integer value that is bigger than or equal to the input value.
2) M may be derived as M=Ceiling (H/CH), where H represents the height of the picture, and CH represents the height of a BUB.

i. Col-d and/or Row-d may be signaled for all sub-pictures.
i. Alternatively, Col-d and/or Row-d may not be signaled for all sub-pictures.
1) Col-d and/or Row-d may not be signaled if the number of sub-pictures are less than 2. (equal to 1).
2) For example, Col-d and/or Row-d may not be signaled for the first sub-picture (e.g. with the sub-picture index (or sub-picture ID) equal to 0).

a) When they are not signaled, they may be inferred to be 0.

3) For example, Col-d and/or Row-d may not be signaled for the last sub-picture (e.g. with the sub-picture index (or sub-picture ID) equal to NumSubPics-1).

a) When they are not signaled, they may be inferred depending on the positions and dimensions of sub-pictures already signaled.

j. W-d and/or H-d may be signaled for all sub-pictures.

i. Alternatively, W-d and/or H-d may not be signaled for all sub-pictures.

1) W-d and/or H-d may not be signaled if the number of sub-pictures are less than 2. (equal to 1).

2) For example, W-d and/or H-d may not be signaled for the last sub-picture (e.g. with the sub-picture index (or sub-picture ID) equal to NumSubPics-1).

a) When they are not signaled, they may be inferred depending on the positions and dimensions of sub-pictures already signaled.

k. In the above bullets, a BUB may be a Coding Tree Block (CTB).

36. In one example, the information of sub-pictures should be signaled after information of the CTB size (e.g. log2_ctu_size_minus5) has already been signaled.

37. subpic_treated_as_pic_flag[i] may not be signaled for each sub-pictures. Instead, one subpic_treated_as_pic_flag is signaled to control whether a sub-picture is treated as a picture for all sub-pictures.

38. loop_filter_across_subpic_enabled_flag[i] may not be signaled for each sub-pictures. Instead, one loop_filter_across_subpic_enabled_flag is signaled to control whether loop filters can be applied across sub-pictures for all sub-pictures.

39. subpic_treated_as_pic_flag[i] (subpic_treated_as_pic_flag) and/or loop_filter_across_subpic_enabled_flag[i] (loop_filter_across_subpic_enabled_flag) may be signaled conditionally.

a. In one example, subpic_treated_as_pic_flag[i] and/or loop_filter_across_subpic_enabled_flag[i] may not be signaled if the number of sub-pictures are less than 2. (equal to 1).

40. RPR may be applied when sub-pictures are used.

a. In one example, the scaling ratio in RPR may be constrained to be a limited set when sub-pictures are used, such as {1:1, 1:2 and/or 2:1}, or {1:1, 1:2 and/or 2:1, 1:4 and/or 4:1}, {1:1, 1:2 and/or 2:1, 1:4 and/or 4:1, 1:8 and/or 8:1}.

b. In one example, the CTB size of a picture A and the CTB size of a picture B may be different if the resolution of picture A and picture B are different.

c. In one example, suppose a sub-picture SA with dimensions SAW×SAH is in picture A and a sub-picture SB with dimensions SBWxSBH is in picture B, SA corresponds to SB, and the scaling ratios between picture A and picture B are Rw and Rh along the horizontal and vertical directions, then i. SAW/SBW or SBW/SAW should be equal to Rw.

ii. SAH/SBH or SBH/SAH should be equal to Rh.

41. When sub-pictures are used (e.g. sub_pics_present_flag is true), a subpiccutre index (or sub-picture ID) may be signaled in the slice header, and the slice address is interrupted as the address in a sub-picture instead of the whole picture.

42. It is required that the sub-picture ID of a first sub-picture must be different to the sub-picture ID of a second sub-picture, if the first sub-picture and the second sub-picture are not the same sub-picture.

a. In one example, it may be a requirement in a conformance bitstream that sps_subpic_id[i] must be different from sps_subpic_id[j], if i is not equal to j.

b. In one example, it may be a requirement in a conformance bitstream that pps_subpic_id[i] must be different from pps_subpic_id[j], if i is not equal to j.

c. In one example, it may be a requirement in a conformance bitstream that ph_subpic_id[i] must be different from ph_subpic_id[j], if i is not equal to j.

d. In one example, it may be a requirement in a conformance bitstream that SubpicIdList[i] must be different from SubpicIdList[j], if i is not equal to j.

e. In one example, a difference denoted as D[i] equal to X_subpic_id[i]-X_subpic_id[i-P] may be signaled.

i. For example, X may be sps, pps or ph.

ii. For example, P is equal to 1.

iii. For example, i>P.

iv. For example, D[i] must be larger than 0.

v. For example, D[i]-1 may be signaled.

43. It is proposed that the length of a syntax element specifying the horizontal or vertical position of top left CTU (e.g. subpic_ctu_top_left_x or subpic_ctu_top_left_y) may be derived to be Ceil(Log2(SS)) bits, wherein SS must be larger than 0. Here, Ceil( ) function returns the smallest integer value that is bigger than or equal to the input value.

a. In one example, SS=(pic_width_max_in_luma_samples+RR)/CtbSizeY when the syntax element specifies the horizontal position of top left CTU (e.g. subpic_ctu_top_left_x).

b. In one example, SS=(pic_height_max_in_luma_samples+RR)/CtbSizeY when the syntax element specifies the vertical position of top left CTU (e.g. subpic_ctu_top_left_y).

c. In one example, RR is a non-zero integer such as CtbSizeY-1.

44. It is proposed that the length of a syntax element specifying the horizontal or vertical position of top left CTU of a sub-picture (e.g. subpic_ctu_top_left_x or subpic_ctu_top_left_y) may be derived to be Ceil(Log2(SS)) bits, wherein SS must be larger than 0. Here, Ceil( ) function returns the smallest integer value that is bigger than or equal to the input value.

a. In one example, SS=(pic_width_max_in_luma_samples+RR)/CtbSizeY when the syntax element specifies the horizontal position of top left CTU of a sub-picture (e.g. subpic_ctu_top_left_x).

b. In one example, SS=(pic_height_max_in_luma_samples+RR)/CtbSizeY when the syntax element specifies the vertical position of top left CTU of a sub-picture (e.g. subpic_ctu_top_left_y).

c. In one example, RR is a non-zero integer such as CtbSizeY-1.

45. It is proposed that the default value of the length of a syntax element (which may plus an offset P such as 1) specifying the width or height of a sub-picture (e.g. subpic_width_minus1 or subpic_height_minus1) may be derived to be Ceil(Log2(SS))−P, wherein SS must be larger than 0. Here, Ceil( ) function returns the smallest integer value that is bigger than or equal to the input value.

a. In one example, SS=(pic_width_max_in_luma_samples+RR)/CtbSize Y when the syntax element specifies the default width (which may plus an offset P) of a sub-picture (e.g. subpic_width_minus1).
b. In one example, SS=(pic_height_max_in_luma_samples+RR)/CtbSizeY when the syntax element specifies the default height (which may plus an offset P) of a sub-picture (e.g. subpic_height_minus1).
c. In one example, RR is a non-zero integer such as CtbSizeY-1.

46. It is proposed that, the information of IDs of sub-pictures should be signaled at least in one of SPS, PPS, and the picture header if it is determined that the information should be signaled.
a. In one example, it may be a requirement in a conformance bitstream that at least one of sps_subpic_id_signalling_present_flag, pps_subpic_id_signalling_present_flag and ph_subpic_id_signalling_present_flag should be equal to 1 if sps_subpic_id_present_flag is equal to 1.

47. It is proposed that, if the information of IDs of sub-pictures is not signaled in any one of SPS, PPS, and the picture header, but it is determined that the information should be signaled, default IDs should be assigned.
a. In one example, if sps_subpic_id_signalling_present_flag, pps_subpic_id_signalling_present_flag and ph_subpic_id_signalling_present_flag are all equal to 0 and sps_subpic_id_present_flag is equal to 1, SubpicIdList[i] should be set equal to i+P, where P is an offset such as 0. An exemplary description is as below:

for (i=0; i<=sps_num_subpics_minus1; i++)
SubpicIdList[i]=sps_subpic_id_present_flag? (sps_subpic_id_signalling_present_flag? sps_subpic_id[i]: (ph_subpic_id_signalling_present_flag? ph_subpic_id[i]: (pps_subpic_id_signalling_present_flag? pps_subpic_id[i]: i))): i 48. It is proposed that the information of sub-picture IDs are not signaled in a picture header if they are signaled in the corresponding PPS.
a. An exemplary syntax design is as below,

| | Descriptor |
|---|---|
| picture_header_rbsp( ) { | |
| non_reference_picture_flag | u(1) |
| gdr_pic_flag | u(1) |
| no_output_of_prior_pics_flag | u(1) |
| if( gdr_pic_flag ) | |
| recovery_poc_cnt | ue(v) |
| ph_pic_parameter_set_id | ue(v) |
| if( sps_subpic_id_present_flag && !sps_subpic_id_signalling_flag && ! pps_subpic_id_signalling_flag ) { | |
| ph_subpic_id_signalling_present_flag | u(1) |
| if( ph_subpics_id_signalling_present_flag ) { | |
| ph_subpic_id_len_minus1 | ue(v) |
| for( i = 0; i <= sps_num_subpics_minus1; i++ ) | |
| ph_subpic_id[ i ] | u(v) |
| } | |
| } | |
| ... | |

b. In one example, the sub-picture IDs are set according to the information of sub-picture IDs signaled in SPS if they are signaled in SPS; otherwise, the sub-picture IDs are set according to the information of sub-picture IDs signaled in PPS if they are signaled in PPS, otherwise, the sub-picture IDs are set according to the information of sub-picture IDs signaled in the the picture header if they are signaled in the picture header. An exemplary description is as below, for (i=0; i<=sps_num_subpics_minus1; i++)
SubpicIdList[i]=sps_subpic_id_present_flag? (sps_subpic_id_signalling_present_flag? sps_subpic_id[i]:
(pps_subpic_id_signalling_present_flag? pps_subpic_id[i]:
(ph_subpic_id_signalling_present_flag? ph_subpic_id[i]: i))): i c. In one example, the sub-picture IDs are set according to the information of sub-picture IDs signaled in the picture header if they are signaled in the picture header; otherwise, the sub-picture IDs are set according to the information of sub-picture IDs signaled in PPS if they are signaled in PPS, otherwise, the sub-picture IDs are set according to the information of sub-picture IDs signaled in the SPS if they are signaled in SPS. An exemplary description is as below, for (i=0; i<=sps_num_subpics_minus1; i++)
SubpicIdList[i]=sps_subpic_id_present_flag?
(ph_subpic_id_signalling_present_flag? ph_subpic_id[i]:
(pps_subpic_id_signalling_present_flag? pps_subpic_id[i]:
(sps_subpic_id_signalling_present_flag? sps_subpic_id[i]: i))): i 49. It is proposed that the deblocking process on an edge E should depend on the determination of whether loop-filtering is allowed across the sub-picture boundaries (e.g. determined by loop_filter_across_subpic_enabled_flag) on both sides (denoted as P-side and Q-side) of the edge. P-side represents the side in the current block, and Q-side represents the side in the neighbouring block, which may belong to a different sub-picture. In the following discussion, it is assumed that P-side and Q-side belongs two different sub-pictures. loop_filter_across_subpic_enabled_flag[P]=0/1 means that loop-filtering is disallowed/allowed across the sub-picture boundaries of the sub-picture containing P-side. loop_filter_across_subpic_enabled_flag[Q]=0/1 means that loop-filtering is disallowed/allowed across the sub-picture boundaries of the sub-picture containing Q-side.
a. In one example, E is not filtered if loop_filter_across_subpic_enabled_flag[P] is equal to 0 or loop_filter_across_subpic_enabled_flag[Q] is equal to 0.
b. In one example, E is not filtered if loop_filter_across_subpic_enabled_flag[P] is equal to 0 and loop_filter_across_subpic_enabled_flag[Q] is equal to 0.
c. In one example, whether to filter the two sides of E are controlled separately.
i. For example, P-side of E is filtered if and only if loop_filter_across_subpic_enabled_flag[P] is equal 1.
ii. For example, Q-side of E is filtered if and only if loop_filter_across_subpic_enabled_flag[Q] is equal 1.

50. It is proposed that, the signaling/parsing of a syntax element SE in PPS specifying the maximum block used as size for transform skip (such log2_transform_skip_max_size_minus2) should be decoupled from any syntax element in SPS (such as sps_transform_skip_enabled_flag).

a. An exemplary syntax change is as below:

```
pic_parameter_set_rbsp( ) {
...
  [[if( sps_transform_skip_enabled_flag )]]
    log2_transform_skip_max_size_minus2    ue(v)
...
```

b. Alternatively, SE may be signaled in SPS, such as:

```
seq_parameter_set_rbsp( ) {
...
  if( sps_transform_skip_enabled_flag)
    log2_transform_skip_max_size_minus2              ue(v)
...
```

c. Alternatively, SE may be signaled in the picture header, such as:

```
picture_header_rbsp( ) {
...
  if( sps_transform_skip_enabled_flag )
    log2_transform_skip_max_size_minus2              ue(v)
...
```

51. Whether to and/or how to update the HMVP table (or named as list/storage/map etc.) after decoding a first block may depend on whether the first block is coded with geometric partition (GEO).
   a. In one example, the HMVP table may not be updated after decoding the first block if the first block is coded with GEO.
   b. In one example, the HMVP table may be updated after decoding the first block if the first block is coded with GEO.
      i. In one example, the HMVP table may be updated with the motion information of one partition divided by GEO.
      ii. In one example, the HMVP table may be updated with the motion information of multiple partitions divided by GEO
52. In CC-ALF, luma samples out of the current processing unit (e.g., ALF processing unit bounded by two ALF virtual boundaries) is excluded from filtering on chroma samples in the corresponding processing unit.
   a. Padded luma samples out of the current processing unit may be used to filter the chroma samples in the corresponding processing unit.
      i. Any padding method disclosed in this document may be used to pad the luma samples.
   b. Alternatively, luma samples out of the current processing unit may be used to filter chroma samples in the corresponding processing unit.

Signaling of parameters in sub-picture level

53. It is proposed that a set of parameters controlling the coding behavior of a sub-picture may be signaled associated with the sub-picture. That is, for each sub-picture, a set of parameters may be signalled. The set of parameters may comprise:
   a. Quantization Parameter (QP) or delta QP for the luma component in the sub-picture for inter and/or intra slices/picture.
   b. Quantization Parameter (QP) or delta QP for chroma components in the sub-picture for inter and/or intra slices/picture.
   c. The reference picture list management information.
   d. CTU size for inter and/or intra slices/picture.
   e. Minimum CU size for inter and/or intra slices/picture.
   f. Maximum TU size for inter and/or intra slices/picture.
   g. Maximum/Minimum Qual-Tree (QT) split size for inter and/or intra slices/picture.
   h. Maximum/Minimum Qual-Tree (QT) split depth for inter and/or intra slices/picture.
   i. Maximum/Minimum Binary-Tree (BT) split size for inter and/or intra slices/picture.
   j. Maximum/Minimum Binary-Tree (BT) split depth for inter and/or intra slices/picture.
   k. Maximum/Minimum Ternary-Tree (TT) split size for inter and/or intra slices/picture.
   l. Maximum/Minimum Ternary-Tree (TT) split depth for inter and/or intra slices/picture.
   m. Maximum/Minimum Multi-Tree (MTT) split size for inter and/or intra slices/picture.
   n. Maximum/Minimum Multi-Tree (MTT) split depth for inter and/or intra slices/picture.
   o. Controls (including on/off control and/or setting control) for coding tools, comprising: (The abbreviations can be found in JVET-P2001-v14).
      i. Weighted Prediction
      ii. Sample Adaptive Offset (SAO)
      iii. ALF
      iv. Transform Skip
      v. block-based delta pulse code modulation (BDPCM)
      vi. Joint Cb-Cr Residual coding (JCCR)
      vii. Reference wrap-around
      viii. TMVP
      ix. sbTMVP
      x. Adaptive motion vector resolution (AMVR)
      xi. BDOF
      xii. Symmetric Motion Vector Difference (SMVD)
      xiii. decoder side motion vector refinement (DMVR)
      xiv. merge mode with motion vector difference (MMVD)
      xv. intra sub-partitions (ISP)
      xvi. Multiple Reference Line (MRL)
      xvii. Matrix-Based Intra Prediction (MIP)
      xviii. CCLM
      xix. CCLM collocated chroma control
      xx. Multi Transform Selection (MTS) for intra and/or inter
      xxi. MTS for inter
      xxii. Sub-block transform (SBT)
      xxiii. SBT maximum size
      xxiv. Affine
      xxv. Affine type
      xxvi. Palette
      xxvii. Biprediction with CU level weights (BCW)
      xxviii. IBC
      xxix. CIIP
      xxx. Triangular shape based motion compensation
      xxxi. LMCS
   p. Any other parameter with the same meaning to a parameter in VPS/SPS/PPS/picture header/slice header, but controlling a sub-picture.

54. One flag may be firstly signaled to indicate whether all sub-pictures share the same parameters.
    q. Alternatively, furthermore, if parameters are shared, then there is no need to signal multiple sets of parameters for different sub-pictures.
    r. Alternatively, furthermore, if parameters are NOT shared, then multiple sets of parameters for different sub-pictures may need to be further signaled.
55. Predictive coding of parameters among different sub-pictures may be applied.
    s. In one example, the differences of two values of the same syntax element for two sub-pictures may be coded.
56. A default set of parameters may be firstly signaled. Then the differences compared to the default values may be further signalled.
    t. Alternatively, furthermore, one flag may be firstly signaled to indicate whether the set of parameters of all sub-pictures are identical to those in the default set.
57. In one example, the set of parameters controlling the coding behavior of a sub-picture may be signaled in SPS or PPS or picture header.
    u. Alternatively, the set of parameters controlling the coding behavior of a sub-picture may be signaled in a SEI message (such as the sub-picture level information SEI message defined in JVET-P2001-v14) or a video usability information (VUI) message.
58. In the example, the set of parameters controlling the coding behavior of a sub-picture may be signaled associated with the sub-picture ID.
59. In one example, a video unit (named SPPS, Sub-Picture Parameter Set), different to VPS/SPS/PPS/picture header/slice header, comprising the set of parameters controlling the coding behavior of a sub-picture, may be signaled.
    v. In one example, a SPPS_index is signaled associated with a SPPS.
    w. In one example, a SPPS_index is signaled for a sub-picture to indicate the SPPS associated with sub-picture.
60. In one example, a first control parameter in the set of parameters controlling a coding behavior of a sub-picture may overwrite or be overwritten by a second control parameter out of the set of parameters but controlling the same coding behavior. For example, the on/off control flag for a coding tool such as BDOF in the set of parameters of a sub-picture may overwrite or be overwritten by the on/off control flag for the coding tool out of the set of parameters.
    x. The second control parameter out of the set of parameters may be in VPS/SPS/PPS/picture header/slice header.
61. When any of above examples is applied, the syntax elements associated with a slice/tile/brick/sub-picture are dependent on the parameters associated with a sub-picture containing the current slice, instead of being dependent on the parameters associated with a picture/sequence.
62. It is constrained that in a conformance bit-stream, a first control parameter in the set of parameters controlling a coding behavior of a sub-picture must be the same to a second control parameter out of the set of parameters but controlling the same coding behavior.
63. In one example, a first flag is signalled in the SPS, one per each sub-picture, and the first flag specifies whether a general_constraint_info ( ) syntax structure is signalled for the sub-picture associated with the first flag. When present for a sub-picture, the general_constraint_info ( ) syntax structure indicates tools that are not applied for the sub-picture across the CLVS.
    y. Alternatively, a general_constraint_info ( ) syntax structure is signalled for each sub-picture.
    z. Alternatively, a second flag is signalled in the SPS, just once, and the second flag specifies whether the first flag is present or absent in the SPS for each sub-picture.
64. In one example, an SEI message or some VUI parameter are specified to indicate that certain coding tools are not applied or applied in a specific way for a set of one or more sub-pictures (i.e., for the coded slices of the set of sub-pictures) in the CLVS, such that when the set of sub-pictures are extracted and decoded, e.g., decoded by a mobile device, the decoding complexity is relatively low and consequently power consumption for the decoding is relatively low.
    a. Alternatively, the same information is signalled in the Dependency Parameter Set (DPS), Video Parameter Set (VPS), SPS, or a standalone NAL unit.

Palette Coding

65. The maximum number of palette size and/or plt predictor size may be restricted to be equal to m*N, e.g., N=8, wherein m is an integer.
    a. The value of m or m+offset may be signaled as a first syntax element, wherein offset is an integer such as 0.
        i. The first syntax element may be binarized by unary coding, exponential Golomb coding, rice coding, fixed length coding.

Merge Estimation Region (MER)

66. The size of MER which may be signaled may depend on the maximum or minimum CU or CTU size. The term "size" herein may refer to width, height, both width and height, or width×height.
    a. In one example, S-Delta or M-S may be signaled, wherein S is the size of MER. Delta and S are integers which depend on the maximum or minimum CU or CTU size. For example:
        i. Delta may be the minimum CU or CTU size.
        ii. M may be the maximum CU or CTU size.
        iii. Delta may be minimum CU or CTU size+offset, wherein offset is an integer such as 1 or −1.
        iv. M may be maximum CU or CTU size+offset, wherein offset is an integer such as 1 or −1.
67. In a conformance bitstream, the size of MER which may be constrained, depending on the maximum or minimum CU or CTU size. The term "size" herein may refer to width, height, both width and height, or width×height.
    a. For example, the size of MER is not allowed to be larger than or equal to the size of the size of maiximum CU or CTU size.
    b. For example, the size of MER is not allowed to be larger than the size of the size of maiximum CU or CTU size.
    c. For example, the size of MER is not allowed to be smaller than or equal to the size of the size of minimum CU or CTU size.
    d. For example, the size of MER is not allowed to be smaller than the size of the size of minimum CU or CTU size.
68. The size of MER may be signaled by an index.
    a. The size of MER can be mapped to the index by a 1-1 mapping.

69. The size of MER or its index may be coded by a unary code, an exponential Golomb code, a rice code or a fixed length code.

5. Embodiments

In the following embodiments, the newly added texts are enclosed in "{{ }}" and the deleted texts are marked by "[[ ]]".

5.1 Embodiment 1: Sub-Picture Constraint on Affine Constructed Merge Candidates 8.5.5.6 Derivation process for constructed affine control point motion vector merging candidates Inputs to this process are:

- a luma location (xCb, yCb) specifying the top-left sample of the current luma coding block relative to the top-left luma sample of the current picture,
- two variables cbWidth and cbHeight specifying the width and the height of the current luma coding block,
- the availability flags availableA$_0$, availableA$_1$, availableA$_2$, availableB$_0$, availableB$_1$, availableB2, availableB3,
- the sample locations (xNbA$_0$, yNbA$_0$), (xNbA$_1$, yNbA$_1$), (xNbA$_2$, yNbA$_2$), (xNbB0, yNbB0), (xNbB$_1$, yNbB1), (xNbB2, yNbB2) and (xNbB3, yNbB3).

Output of this process are:

- the availability flag of the constructed affine control point motion vector merging candidiates availableFlagConstK, with K=1 . . . 6,
- the reference indices refIdxLXConstK, with K=1 . . . 6, X being 0 or 1,
- the prediction list utilization flags predFlagLXConstK, with K=1 . . . 6, X being 0 or 1,
- the affine motion model indices motionModelIdcConstK, with K=1 . . . 6,
- the bi-prediction weight indices bcwIdxConstK, with K=1 . . . 6, the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:

- The reference indices for the temporal merging candidate, refIdxLXCorner[3], with X being 0 or 1, are set equal to 0.
- The variables mvLXCol and availableFlagLXCol, with X being 0 or 1, are derived as follows:
  - If slice_temporal_mvp_enabled_flag is equal to 0, both components of mvLXCol are set equal to 0 and availableFlagLXCol is set equal to 0.
  - Otherwise (slice_temporal_mvp_enabled_flag is equal to 1), the following applies:

$$xColBr=xCb+cbWidth \quad (8\text{-}601)$$

$$yColBr=yCb+cbHeight \quad (8\text{-}602)$$

{{rightBoundaryPos=subpic_treated_as_pic_flag[SubPicIdx]? SubPicRightBoundaryPos: pic_width_in_luma_samples-1
botBoundaryPos=subpic_treated_as_pic_flag[SubPicIdx]? SubPicBotBoundaryPos: pic_height_in_luma_samples-1}}

If yCb>>CtbLog2SizeY is equal to yColBr>>CtbLog2SizeY, {{yColBr is less than or equal to botBoundaryPos and xColBr is less than or equal to rightBoundaryPos, the following applies}}:

- The variable colCb specifies the luma coding block covering the modified location given by ((xColBr>>3)<<3, (yColBr>>3)<<3) inside the collocated picture specified by ColPic.
- The luma location (xColCb, yColCb) is set equal to the top-left sample of the collocated luma coding block specified by colCb relative to the top-left luma sample of the collocated picture specified by ColPic.
- The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.

Otherwise, both components of mvLXCol are set equal to 0 and availableFlagLXCol is set equal to 0.

. . .

5.2 Embodiment 2: Sub-Picture Constraint on Affine Constructed Merge Candidates 8.5.5.6 Derivation process for constructed affine control point motion vector merging candidates Inputs to this process are:

- a luma location (xCb, yCb) specifying the top-left sample of the current luma coding block relative to the top-left luma sample of the current picture,
- two variables cbWidth and cbHeight specifying the width and the height of the current luma coding block,
- the availability flags availableA$_0$, availableA1, availableA$_2$, availableB$_0$, availableB$_1$, availableB2, availableB3,
- the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).

Output of this process are:

- the availability flag of the constructed affine control point motion vector merging candidiates availableFlagConstK, with K=1 . . . 6,
- the reference indices refIdxLXConstK, with K=1 . . . 6, X being 0 or 1,
- the prediction list utilization flags predFlagLXConstK, with K=1 . . . 6, X being 0 or 1,
- the affine motion model indices motionModelIdcConstK, with K=1 . . . 6,
- the bi-prediction weight indices bcwIdxConstK, with K=1 . . . 6,
- the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:

- The reference indices for the temporal merging candidate, refIdxLXCorner[3], with X being 0 or 1, are set equal to 0.
- The variables mvLXCol and availableFlagLXCol, with X being 0 or 1, are derived as follows:
  - If slice_temporal_mvp_enabled_flag is equal to 0, both components of mvLXCol are set equal to 0 and availableFlagLXCol is set equal to 0.
  - Otherwise (slice_temporal_mvp_enabled_flag is equal to 1), the following applies:

$$xColBr=xCb+cbWidth \quad (8\text{-}601)$$

$$yColBr=yCb+cbHeight \quad (8\text{-}602)$$

{{rightBoundaryPos=subpic_treated_as_pic_flag[SubPicIdx]? SubPicRightBoundaryPos: pic_width_in_luma_samples-1}}{{botBoundaryPos=subpic_treated_as_pic_flag [SubPicldx]? SubPicBotBoundaryPos: pic_height_in_luma_samples-1}}{{xColBr=Min (rightBoundaryPos, xColBr) yColBr=Min (botBoundaryPos, yColBr)}}

If yCb>>CtbLog2SizeY is equal to yColBr>>CtbLog2SizeY,[[yColBr is less than pic_height_in_luma_samples and xColBr is less than pic_width_in_luma_samples, the following applies]]:

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.

Otherwise, both components of mvLXCol are set equal to 0 and availableFlagLXCol is set equal to 0.

. . .

5.3 Embodiment 3: Fetching Integer Samples Under the Sub-Picture Constraint 8.5.6.3.3 Luma Integer Sample Fetching Process Inputs to this process are:

a luma location in full-sample units ($xInt_L$, $yInt_L$), the luma reference sample array $refPicLX_L$, Output of this process is a predicted luma sample value predSampleLXL The variable shift is set equal to Max (2, 14-$BitDepth_Y$).

The variable picW is set equal to pic_width_in_luma_samples and the variable picH is set equal to pic_height_in_luma_samples.

The luma locations in full-sample units (xInt, yInt) are derived as follows:

{{If subpic_treated_as_pic_flag[SubPicIdx] is equal to 1, the following applies: }}

{{xInt=Clip3(SubPicLeftBoundaryPos, SubPicRightBoundaryPos, xInt)}}

{{yInt=Clip3(SubPicTopBoundaryPos, SubPicBotBoundaryPos, yInt)}}

{{Otherwise: }} xInt=Clip3(0, picW-1, sps_ref_wraparound_enabled_flag? ClipH((sps_ref_wraparound_offset_minus1+1)*MinCbSizeY, picW, $xInt_L$): $xInt_L$) (8-782)

yInt=Clip3(0, picH-1, $yInt_L$) (8-783)

The predicted luma sample value $predSampleLX_L$ is derived as follows:

$predSampleLX_L$=$refPicLX_L$ [xInt][yInt]<<shift3 (8-784)

5.4 Embodiment 4: Deriving the Variable invAvgLuma in Chroma Residual Scaling of LMCS 8.7.5.3 Picture Reconstruction with Luma Dependent Chroma Residual Scaling Process for Chroma Samples Inputs to this process are:

a chroma location (xCurr, yCurr) of the top-left chroma sample of the current chroma transform block relative to the top-left chroma sample of the current picture, a variable nCurrSw specifying the chroma transform block width, a variable nCurrSh specifying the chroma transform block height, a variable tuCbfChroma specifying the coded block flag of the current chroma transform block, an (nCurrSw)×(nCurrSh) array predSamples specifying the chroma prediction samples of the current block, an (nCurrSw)×(nCurrSh) array resSamples specifying the chroma residual samples of the current block, Output of this process is a reconstructed chroma picture sample array recSamples.

The variable sizeY is set equal to Min (CtbSizeY, 64).

The reconstructed chroma picture sample recSamples is derived as follows for $i$=0..nCurrSw−1, $j$=0..nCurrSh−1:

. . .

Otherwise, the following applies:

The variable currPic specifies the array of reconstructed luma samples in the current picture.

For the derivation of the variable varScale the following ordered steps apply:

1. The variable invAvgLuma is derived as follows:

The array recLuma[i] with i=0..(2*sizeY−1) and the variable cnt are derived as follows:

The variable cnt is set equal to 0.

{{The variablerightBoundaryPos and botBoundaryPos are derived as follows: }}

{{rightBoundaryPos=subpic_treated_as_pic_flag [SubPicIdx]?}}

{{SubPicRightBoundaryPos: pic_width_in_luma_samples−1}}

{{botBoundaryPos=subpic_treated_as_pic_flag[SubPicIdx]?}}

{{SubPicBotBoundaryPos: pic_height_in_luma_samples−1}}

When availL is equal to TRUE, the array recLuma[i] with i=0..sizeY−1 is set equal to currPic[xCuCb−1][Min (yCuCb+i,[pic_height_in_luma_samples−1] {{botBoundaryPos}})] with i=0..sizeY−1, and cnt is set equal to sizeY When availT is equal to TRUE, the array recLuma[cnt+i] with i=0..sizeY−1 is set equal to currPic[Min (xCuCb+i,[pic_width_in_luma_samples−1] {{rightBoundaryPos}})][yCuCb−1] with i=0..sizeY−1, and cnt is set equal to (cnt+sizeY)

The variable invAvgLuma is derived as follows:

If cnt is greater than 0, the following applies:

$$invAvgLuma=Clip1_Y((\sum_{k=0}^{cnt-1} recLuma[k]+(cnt>>1))>>Log2(cnt)) \quad (8\text{–}1013)$$

Otherwise (cnt is equal to 0), the following applies:

invAvgLuma=1<< (BitDepth$_Y$−1) (8-1014)

5.5 Embodiment 5: An Example of Defining the Sub-Picture Element in Unit of N (Such as N=8 or 32) Other than 4 Samples 7.4.3.3 Sequence Parameter Set Raw Byte Sequence Payload (RBSP) Semantics subpic_grid_col_width_minus1 plus 1 specifies the width of each element of the sub-picture identifier grid in units of {{4-N}} samples. The length of the syntax element is Ceil(Log2(pic_width_max_in_luma_samples/{{4-N}})) bits.

The variable NumSubPicGridCols is derived as follows:

NumSubPicGridCols=(pic_width_max_in_luma_samples +subpic_grid_col_width_minus1* [[4+3]] {{N+N−1}})/(subpic_grid_col_width_minus1*[4+3] {{N+N−1}}) (7-5)

subpic_grid_row_height_minus1 plus 1 specifies the height of each element of the sub-picture identifier grid in units of 4 samples. The length of the syntax element is Ceil(Log2(pic_height_max_in_luma_samples/{{4-N}})) bits.

The variable NumSubPicGridRows is derived as follows:

NumSubPicGridRows= (pic_height_max_in_luma_samples+subpic_grid_row_height_minus1*{{4 N+N−1}})/(subpic_grid_row_height_minus1*[4+3] {{N+N−1}})

7.4.7.1 General Slice Header Semantics

The variables SubPicIdx, SubPicLeftBoundaryPos, SubPicTopBoundaryPos, SubPicRightBoundaryPos, and SubPicBotBoundaryPos are derived as follows:

btSplit is equal to SPLIT_BT_VER y0+cbHeight is greater than [[pic_height_in_luma_samples]] {{subpic_treated_as_pic_flag[SubPicIdx]? SubPicBotBoundaryPos+1: pic_height_in_luma_samples}}.

Otherwise, if all of the following conditions are true, allowBtSplit is set equal to FALSE btSplit is equal to SPLIT_BT_VER cbHeight is greater than MaxTbSizeY x0+cbWidth is greater than[[pic_width_in_luma_samples]] {{subpic_treated_as_pic_flag[SubPicIdx]? SubPicRightBoundaryPos+1: pic_width_in_luma_samples}}

Otherwise, if all of the following conditions are true, allowBtSplit is set equal to FALSE btSplit is equal to SPLIT_BT HOR cbWidth is greater than MaxTbSizeY y0+cbHeight is greater[[pic_height_in_luma_samples]] than {{subpic_treated_as_pic_flag[SubPicIdx]? SubPicBotBoundaryPos+1: pic_height_in_luma_samples.}}

Otherwise, if all of the following conditions are true, allowBtSplit is set equal to FALSE x0+cbWidth is greater than[[pic_width_in_luma_samples]] {{subpic_treated_as_pic_flag[SubPicIdx]? SubPicRightBoundaryPos+1: pic_width_in_luma_samples}} y0+cbHeight is greater than[[pic_height_in_luma_samples]] {{subpic_treated_as_pic_flag[SubPicIdx]? SubPicBotBoundaryPos+1: pic_height_in_luma_samples}}.

cbWidth is greater than minQtSize

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
  SubPicLeftBoundaryPos =
SubPicLeft[ SubPicIdx ] * ( subpic_grid_col_width_minus1 + 1 ) * 4 N
  SubPicRightBoundaryPos =
( SubPicLeft[ SubPicIdx ] + SubPicWidth[ SubPicIdx ] ) *
    ( subpic_grid_col_width_minus1 + 1 ) * 4 N                (7-93)
  SubPicTopBoundaryPos =
SubPicTop[ SubPicIdx ] * ( subpic_grid_row_height_minus1 + 1 )* 4 N
  SubPicBotBoundaryPos = ( SubPicTop[ SubPicIdx ] + SubPicHeight[ SubPicIdx ] ) *
    ( subpic_grid_row_height_minus1 + 1 ) * 4N
}
```

5.6 Embodiment 6: Restrict the Picture Width and the Picture Height to be Equal or Larger than 8

7.4.3.3 Sequence Parameter Set RBSP Semantics pic_width_max_in_luma samples specifies the maximum width, in units of luma samples, of each decoded picture referring to the SPS. pic_width_max_in_luma_samples may not be equal to 0 and may be an integer multiple of[[MinCbSizeY]] {{Max (8, MinCbSizeY)}}. pic_height_max_in_luma_samples specifies the maximum height, in units of luma samples, of each decoded picture referring to the SPS. pic_height_max_in_luma_samples may not be equal to 0 and may be an integer multiple of[[MinCbSizeY]] {{Max (8, MinCbSizeY)}}.

5.7 Embodiment 7: Sub-Picture Boundary Check for BT/TT/QT Splitting, BT/TT/QT Depth Derivation, and/or the Signaling of CU Split Flag 6.4.2 Allowed Binary Split Process The variable allowBtSplit is derived as follows:

. . . .

Otherwise, if all of the following conditions are true, allowBtSplit is set equal to FALSE Otherwise, if all of the following conditions are true, allowBtSplit is set equal to FALSE btSplit is equal to SPLIT_BT HOR x0+cbWidth is greater than[[pic_width_in_luma_samples]] {{subpic_treated_as_pic_flag[SubPicIdx]? SubPicRightBoundaryPos+1: pic_width_in_luma_samples}} y0+cbHeight is less than or equal to[[pic_height_in_luma_samples]] {{subpic_treated_as_pic_flag[SubPicIdx]? SubPicBotBoundaryPos+1: pic_height_in_luma_samples.}}

6.4.2 Allowed Ternary Split Process

The variable allowTtSplit is derived as follows:

If one or more of the following conditions are true, allowTtSplit is set equal to FALSE:

cbSize is less than or equal to 2*MinTtSizeY cbWidth is greater than Min (MaxTbSizeY, maxTtSize)

cbHeight is greater than Min (MaxTbSizeY, maxTtSize)

mttDepth is greater than or equal to maxMttDepth x0+cbWidth is greater than[[pic_width_in_luma_samples]] {{subpic_treated_as_pic_flag[SubPicIdx]? SubPicRightBoundaryPos+1: pic_width_in_luma_samples}} y0+cbHeight is greater than[[pic_height_in_luma_samples]] {{subpic_treated_as_pic_flag[SubPicIdx]? SubPicBotBoundaryPos+1: pic_height_in_luma_samples}}.

treeType is equal to DUAL_TREE_CHROMA and (cbWidth/SubWidthC)*(cbHeight/SubHeightC) is less than or equal to 32 treeType is equal to DUAL_TREE_CHROMA and modeType is equal to MODE TYPE_INTRA

Otherwise, allowTtSplit is set equal to TRUE.

7.3.8.2 Coding Tree Unit Syntax

| | Descriptor |
|---|---|
| dual_tree_implicit_qt_split( x0, y0, cbSize, cqtDepth ) { | |
| ... | |
| if( x1 < [[pic_width_in_luma_samples]] ***(subpic treated as pic flag***[ ***SubPicIdx*** ] ***? SubPicRightBoundaryPos + 1 : pic width in luma samples***)) | |
| dual_tree_implicit_qt_split( x1, y0, cbSize / 2, cqtDepth + 1 ) | |
| if( y1 < [[pic_height_in_luma_samples]] ***(subpic treated as pic flag***[ ***SubPicIdx*** ] ***? SubPicBotBoundaryPos + 1: pic height in luma samples***) ) | |
| dual_tree_implicit_qt_split( x0, y1, cbSize / 2, cqtDepth + 1 ) | |
| if( x1 < [[pic_width_in_luma_samples]] ***(subpic treated as pic flag***[ ***SubPicIdx*** ] ***? SubPicRightBoundaryPos + 1 : pic width in luma samples)*** && y1 < [[pic_height_in_luma_samples]] ***(subpic treated as pic flag***[ ***SubPicIdx*** ] ***? SupPicBotBoundaryPos + 1: pic height in luma samples***) ) | |
| dual_tree_implicit_qt_split( x1, y1, cbSize / 2, cqtDepth + 1 ) | |
| } else { | |
| ... | |
| } | |
| } | |

7.3.8.4 Coding Tree Syntax

| | Descriptor |
|---|---|
| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
| if( ( allowSplitBtVer \| \| allowSplitBtHor \| \| allowSplitTtVer \| \| allowSplitTtHor \| \| allowSplitQT ) | |
| &&( x0 + cbWidth <= [[pic_width_in_luma_samples]] ***(subpic treated as pic flag***[ ***SubPicIdx*** ] ***? SubPicRightBoundaryPos + 1 : pic width in luma samples***) ) | |
| && (y0 + cbHeight <= [[pic_height_in_luma_samples]] ***(subpic treated as pic flag***[ ***SubPicIdx*** ] ***? SubPicBotBoundaryPos + 1: pic height in luma samples***) ) ) | |
| **split_cu_flag** | ae(v) |
| if( cu_qp_delta_enabled_flag && qgOnY && cbSubdiv <= cu_qp_delta_subdiv ) { | |
| ... | |
| depthOffset += ( y0 + cbHeight > [[pic_height_in_luma_samples]] ***(subpic treated as pic flag***[ ***SubPicIdx*** ] ***? SubPicBotBoundaryPos + 1: pic height in luma samples***) ) ? 1 : 0 | |
| y1 = y0 + ( cbHeight / 2 ) | |
| coding_tree( x0, y0, cbWidth, cbHeight / 2, qgOnY, qgOnC, cbSubdiv + 1, cqtDepth, mttDepth + 1, depthOffset, 0, treeType, modeType ) | |
| if( y1 < [[pic_height_in_luma_samples]] ***(subpic treated as pic flag***[ ***SubPicIdx*** ] ***? SubPicBotBoundaryPos + 1: pic height in luma samples***) ) | |
| coding_tree( x0, y1, cbWidth, cbHeight / 2, qgOnY, qgOnC, cbSubdiv + 1, cqtDepth, mttDepth + 1, depthOffset, 1, treeType, modeType ) | |
| ... | |
| if( x1 < [[pic_width_in_luma_samples]] ***(subpic treated as pic flag***[ ***SubPicIdx*** ] ***? SubPicRightBoundaryPos + 1 : pic width in luma samples***) ) | |
| coding_tree( x1, y0, cbWidth / 2, cbHeight / 2, qgOnY, qgOnC, cbSubdiv + 2, cqtDepth + 1, 0, 0, 1, treeType, modeType ) | |

-continued

| | Descriptor |
|---|---|
| if( y1 < [[pic_height_in_luma_samples]] ***(subpic treated as pic flag[ SubPicIdx ] ? SubPicBotBoundaryPos + 1: pic height in luma samples)***) | |
| coding_tree( x0, y1, cbWidth / 2, cbHeight / 2, qgOnY, qgOnC, cbSubdiv + 2, | |
| cqtDepth + 1, 0, 0, 2, treeType, modeType ) | |
| if( y1 < [[pic_height_in_luma_samples]] ***(subpic_treated_as_pic_ flag[ SubPicIdx ] ? SubPicBotBoundaryPos + 1: pic_height_in_luma_samples)*** && x1 < [[pic_width_in_luma_samples]] ***(subpic treated as pic flag[ SubPicIdx ] ? SubPicRightBoundaryPos + 1 : pic width in luma samples)*** ) | |
| coding_tree( x1, y1, cbWidth / 2, cbHeight / 2, qgOnY, qgOnC, cbSubdiv + 2, | |
| cqtDepth + 1, 0, 0, 3, treeType, modeType ) | |

5.8 Embodiment 8: An Example of Defining the Sub-Pictures

| | Descriptor |
|---|---|
| seq_parameter_set_rbsp( ) { | |
| **sps_decoding_parameter_set_id** | u(4) |
| ... | |
| **pic_width_max_in_luma_samples** | ue(v) |
| **pic_height_max_in_luma_samples** | ue(v) |
| [[**subpics_present_flag** | u(1) |
| if( subpics_present_flag ) { | |
| **max_subpics_minus1** | u(8) |
| **subpic_grid_col_width_minus1** | u(v) |
| **subpic_grid_row_height_minus1** | u(v) |
| for( i = 0; i < NumSubPicGridRows; i++ ) | |
| for( j = 0; j < NumSubPicGridCols; j++ ) | |
| **subpic_grid_idx**[ i ][ j ] | u(v) |
| for( i = 0; i <= NumSubPics; i++ ) { | |
| **subpic_treated_as_pic_flag**[ i ] | u(1) |
| **loop_filter_across_subpic_enabled_flag**[ i ] | u(1) |
| } | |
| }]] | |
| **bit_depth_luma_minus8** | ue(v) |
| ... | |
| **log2_ctu_size_minus5** | u(2) |
| ... | |
| ***subpics present flag*** | ***u(1)*** |
| ***if( subpics present flag )*** { | |
| ***num supics minus1*** | ***u(8)*** |
| ***for ( i = 0; i <= num subpics minus1; i++ )*** { | |
| ***subpic ctb addr x[i]*** | ***u(8)*** |
| ***subpic ctb addr y[i]*** | ***u(8)*** |
| ***subpic ctb width minus1[i]*** | ***u(8)*** |
| ***subpic ctb height minus1[i]*** | ***u(8)*** |
| ***subpic treated as pic flag[ i ]*** | ***u(1)*** |
| ***loop filter across subpic enabled flag[ i ]*** | ***u(1)*** |
| } | |
| ... | |

5.9 Embodiment 9: An Example of Defining the Sub-Pictures

| | Descriptor |
|---|---|
| seq_parameter_set_rbsp( ) { | |
| **sps_decoding_parameter_set_id** | u(4) |
| ... | |
| **pic_width_max_in_luma_samples** | ue(v) |
| **pic_height_max_in_luma_samples** | ue(v) |
| [[**subpics_present_flag** | u(1) |

-continued

| | Descriptor |
|---|---|
| if( subpics_present_flag ) { | |
| **max_subpics_minus1** | u(8) |
| **subpic_grid_col_width_minus1** | u(v) |
| **subpic_grid_row_height_minus1** | u(v) |
| for( i = 0; i < NumSubPicGridRows; i++ ) | |
| for( j = 0; j < NumSubPicGridCols; j++ ) | |
| **subpic_grid_idx**[ i ][ j ] | u(v) |
| for( i = 0; i <= NumSubPics; i++ ) { | |
| **subpic_treated_as_pic_flag**[ i ] | u(1) |
| **loop_filter_across_subpic_enabled_flag**[ i ] | u(1) |
| } | |
| }]] | |
| **bit_depth_luma_minus8** | ue(v) |
| ... | |
| **log2_ctu_size_minus5** | u(2) |
| ... | |
| ***subpics present flag*** | ***u(1)*** |
| ***if( subpics present flag )*** { | |
| ***num subpics minus1*** | ***ue(v)*** |
| ***for( i = 0; i <= num subpics minus1; i++ )*** { | |
| ***subpic ctb addr x[i]*** | ***u(8)*** |
| ***subpic ctb addr y[i]*** | ***u(8)*** |
| ***subpic ctb width minus1[i]*** | ***u(8)*** |
| ***subpic ctb height minus1[i]*** | ***u(8)*** |
| ***subpic treated as pic flag[ i ]*** | ***u(1)*** |
| ***loop filter across subpic enables flag[ i ]*** | ***u(1)*** |
| } | |
| ... | |

5.10 Embodiment 10: An Example of Defining the Sub-Pictures

| | Descriptor |
|---|---|
| seq_parameter_set_rbsp( ) { | |
| **sps_decoding_parameter_set_id** | u(4) |
| ... | |
| **pic_width_max_in_luma_samples** | ue(v) |
| **pic_height_max_in_luma_samples** | ue(v) |
| [[**subpics_present_flag** | u(1) |
| if( subpics_present_flag ) { | |
| **max_subpics_minus1** | u(8) |
| **subpic_grid_col_width_minus1** | u(v) |
| **subpic_grid_row_height_minus1** | u(v) |
| for( i = 0; i < NumSubPicGridRows; i++ ) | |
| for( j = 0; j < NumSubPicGridCols; j++ ) | |
| **subpic_grid_idx**[ i ][ j ] | u(v) |

-continued

| | Descriptor |
|---|---|
| for( i = 0; i <= NumSubPics; i++ ) { | |
| **subpic_treated_as_pic_flag**[ i ] | u(1) |
| **loop_filter_across_subpic_enabled_flag**[ i ] | u(1) |
| } | |
| }]] | |
| ... | |
| **log2_ctu_size_minus5** | u(2) |
| ... | |
| ***subpics present flag*** | ***u(1)*** |
| ***if( subpics present flag )*** { | |
| ***num subpics minus2*** | ***u(v)*** |
| **subpic_addr_x_length_minus1** | ***ue(v)*** |
| **subpic_addr_y_length_minus1** | ***ue(v)*** |
| ***for( i = 0; i < NumSubPics; i++ )*** { | |
| ***subpic ctb addr x***[***i***] | ***u(v)*** |
| ***subpic ctb addr y***[***i***] | ***u(v)*** |
| ***subpic ctb width minus1***[***i***] | ***u(v)*** |
| ***subpic ctb height minus1***[***i***] | ***u(v)*** |
| ***subpic treated as pic flag***[ ***i*** ] | ***u(1)*** |
| ***loop filter across subpic enabled flag***[ ***i*** ] | ***u(1)*** |
| } | |
| ... | |

5.11 Embodiment 11: An Example of Defining the Sub-Pictures

| | Descriptor |
|---|---|
| seq_parameter_set_rbsp( ) { | |
| sps_decoding_parameter_set_id | u(4) |
| ... | |
| pic_width_max_in_luma_samples | ue(v) |
| pic_height_max_in_luma_samples | ue(v) |
| [[subpics_present_flag | u(1) |
| if( subpics_present_flag ) { | |
| max_subpics_minus1 | u(8) |
| subpic_grid_col_width_minus1 | u(v) |
| subpic_grid_row_height_minus1 | u(v) |
| for( i = 0; i < NumSubPicGridRows; i++ ) | |
| for( j = 0; j < NumSubPicGridCols; j++ ) | |
| subpic_grid_idx[ i ][ j ] | u(v) |
| for( i = 0; i <= NumSubPics; i++ ) { | |
| subpic_treated_as_pic_flag[ i ] | u(1) |
| loop_filter_across_subpic_enabled _flag[ i ] | u(1) |
| } | |
| }]] | |
| ... | |
| log2_ctu_size_minus5 | u(2) |
| ... | |
| subpics_present_flag | u(1) |
| if ( subpics_present_flag ) { | |
| num_subpics_minus2 | u(v) |
| subpic_addr_x_length_minus1 | ue(v) |
| subpic_addr_y_length_minus1 | ue(v) |
| for( i = 0; i < NumSubPics; i++ ) { | |
| if( i = 0; i < NumSubPics − 1 ) { | |
| subpic_ctb_addr_x[i] | u(v) |
| subpic_ctb_addr_y[i] | u(v) |
| subpic_ctb_width_minus1[i] | u(v) |
| subpic_ctb_height_minus1[i] | u(v) |
| } | |
| subpic_treated_as_pic_flag[ i ] | u(1) |
| loop_filter_across_subpic_enabled_flag[ i ] | u(1) |
| } | |
| ... | |

{{NumSubPics=num_subpics_minus2+2.}}

5.12 Embodiment: Deblocking Considering Sub-Pictures 8.8.3 Deblocking Filter Process 8.8.3.1 General Inputs to this process are the reconstructed picture prior to deblocking, i.e., the array $recPicture_L$ and, when ChromaArrayType is not equal to 0, the arrays $recPicture_{Cb}$ and $recPicture_{Cr}$.

Outputs of this process are the modified reconstructed picture after deblocking, i.e., the array recPicture, and, when ChromaArrayType is not equal to 0, the arrays $recPicture_{Cb}$ and $recPicture_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,

[[Edges that coincide with the boundaries of a sub-picture for which loop_filter_across_subpic_enabled_flag [SubPicIdx] is equal to 0,]]

Edges that coincide with the virtual boundaries of the picture when pps_loop_filter_across_virtual boundaries_disabled_flag is equal to 1, Edges that coincide with tile boundaries when loop_filter_across_tiles_enabled_flag is equal to 0, Edges that coincide with slice boundaries when loop_filter_across_slices_enabled_flag is equal to 0, Edges that coincide with upper or left boundaries of slices with slice_deblocking_filter_disabled_flag equal to 1, Edges within slices with slice_deblocking_filter_disabled_flag equal to 1, Edges that do not correspond to 4×4 sample grid boundaries of the luma component, Edges that do not correspond to 8×8 sample grid boundaries of the chroma component, Edges within the luma component for which both sides of the edge have intra_bdpcm_luma_flag equal to 1, Edges within the chroma components for which both sides of the edge have intra_bdpcm_chroma_flag equal to 1, Edges of chroma subblocks that are not edges of the associated transform unit.

. . .

Deblocking Filter Process for One Direction

Inputs to this process are:

the variable treeType specifying whether the luma (DUAL_TREE_LUMA) or chroma components (DUAL_TREE_CHROMA) are currently processed, when treeType is equal to DUAL_TREE_LUMA, the reconstructed picture prior to deblocking, i.e., the array recPicture, when ChromaArrayType is not equal to 0 and treeType is equal to DUAL_TREE_CHROMA, the arrays $recPicture_{Cb}$ and $recPicture_{Cr}$, a variable edgeType specifying whether a vertical (EDGE_VER) or a horizontal (EDGE_HOR) edge is filtered.

Outputs of this process are the modified reconstructed picture after deblocking, i.e:

when treeType is equal to DUAL_TREE_LUMA, the array $recPicture_L$, when ChromaArrayType is not equal to 0 and treeType is equal to DUAL_TREE_CHROMA, the arrays $recPicture_{Cb}$ and $recPicture_{Cr}$.

The variables firstCompIdx and lastCompIdx are derived as follows:

firstCompIdx=(treeType==DUAL_TREE_CHROMA)? 1:0 (8-1010)

lastCompIdx=(treeType==DUAL_TREE_LUMA ||ChromaArrayType==0)? 0:2 (8-1011)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edgeType is equal to EDGE_HOR and yCb % 8 is equal to 0, the edges are filtered by the following ordered steps:

2. The variable filterEdgeFlag is derived as follows:

If edgeType is equal to EDGE_VER and one or more of the following conditions are true, filterEdgeFlag is set equal to 0:

The left boundary of the current coding block is the left boundary of the picture.

[[The left boundary of the current coding block is the left or right boundary of the sub-picture and loop_filter_across_subpic_enabled_flag[SubPicIdx] is equal to 0.]]

The left boundary of the current coding block is the left boundary of the tile and loop_filter_across_tiles_enabled_flag is equal to 0.

The left boundary of the current coding block is the left boundary of the slice and loop_filter_across_slices_enabled_flag is equal to 0.

The left boundary of the current coding block is one of the vertical virtual boundaries of the picture and VirtualBoundariesDisabledFlag is equal to 1.

Otherwise, if edgeType is equal to EDGE_HOR and one or more of the following conditions are true, the variable filterEdgeFlag is set equal to 0:

The top boundary of the current luma coding block is the top boundary of the picture.

[[The top boundary of the current coding block is the top or bottom boundary of the sub-picture and loop_filter_across_subpic_enabled_flag[SubPicIdx] is equal to 0.]]

The top boundary of the current coding block is the top boundary of the tile and loop_filter_across_tiles_enabled_flag is equal to 0.

The top boundary of the current coding block is the top boundary of the slice and loop_filter_across_slices_enabled_flag is equal to 0.

The top boundary of the current coding block is one of the horizontal virtual boundaries of the picture and VirtualBoundariesDisabledFlag is equal to 1.

Otherwise, filterEdgeFlag is set equal to 1.

. . .

Filtering Process for a Luma Sample Using Short Filters

Inputs to this process are:

the sample values $p_i$ and $q_i$ with i=0 . . . 3, the locations of $p_i$ and $q_i$, ($xP_i$, $yP_i$) and ($xQ_i$, $yQ_i$) with i=0 . . . 2, a variable dE, the variables dEp and dEq containing decisions to filter samples p1 and q1, respectively, a variable $t_C$.

Outputs of this process are:

the number of filtered samples nDp and nDq, the filtered sample values $p_i'$ and qj' with i=0..nDp−1, j=0..nDq−1.

Depending on the value of dE, the following applies:

If the variable dE is equal to 2, nDp and nDq are both set equal to 3 and the following strong filtering applies:

$$p_0'=\mathrm{Clip3}(p_0-3*t_C,\ p_0+3*t_C,(p_2+2*p_1+2*p_0+2*q_0+q_1+4)>>3) \quad (8\text{-}1150)$$

$$p_1'=\mathrm{Clip3}(p_1-2*t_C,\ p_{1+2}*t_C,\ (p_2+p_1+p_0+q_0+2)>>2) \quad (8\text{-}1151)$$

$$p_2'=\mathrm{Clip3}(p_2-1*t_C,p_2+1*t_C,\ (2*p_{3+3}*p_2+p_1+p_0+q_0+4)>>3) \quad (8\text{-}1152)$$

$$q_0'=\mathrm{Clip3}(q_0-3*t_C,\ q_0+3*t_C,\ (p_{1+2}*p_0+2*q_0+2*q_1+q_2+4)>>3) \quad (8\text{-}1153)$$

$$q_1'=\mathrm{Clip3}(q_1-2*t_C,\ q_{1+2}*t_C,\ (p_0+q_0+q_1+q_2+2)>>2) \quad (8\text{-}1154)$$

$$q_2'=\mathrm{Clip3}(q_2-1*t_C,\ q_2+1*t_C,\ (p_0+q_0+q_1+3*q_2+2*q_{3+4})>>3) \quad (8\text{-}1155)$$

Otherwise, nDp and nDq are set both equal to 0 and the following weak filtering applies:

The following applies:

$$\Delta=(9*(q_0-p_0)-3*(q_1-p_1)+8)>>4 \quad (8\text{-}1156)$$

When Abs(Δ) is less than $t_C$*10, the following ordered steps apply:

The filtered sample values $p_0'$ and $q_0'$ are specified as follows:

$$\Delta=\mathrm{Clip3}(-t_C,\ t_C,\ \Delta) \quad (8\text{-}1157)$$

$$p_0'=\mathrm{Clip1}(p_0+\Delta) \quad (8\text{-}1158)$$

$$q_0'=\mathrm{Clip1}(q_0-\Delta) \quad (8\text{-}1159)$$

When dEp is equal to 1, the filtered sample value $p_i'$ is specified as follows:

$$\Delta p=\mathrm{Clip3}(-(t_C>>1),\ t_C>>1,\ (((p_2+p_0+1)>>1)-p_1+\Delta)>>1) \quad (8\text{-}1160)$$

$$p_1'=\mathrm{Clip1}(p_1+\Delta p) \quad (8\text{-}1161)$$

When dEq is equal to 1, the filtered sample value $q_1'$ is specified as follows:

$$\Delta q=\mathrm{Clip3}(-(t_C>>1),t_C>>1,\ (((q_2+q_0+1)>>1)-q_1-\Delta)>>1) \quad (8\text{-}1162)$$

$$q_1'=\mathrm{Clip1}(q_1+\Delta q) \quad (8\text{-}1163)$$

nDp is set equal to dEp+1 and nDq is set equal to dEq+1.

When nDp is greater than 0 and pred_mode_plt_flag of the coding unit that includes the coding block containing the sample $p_0$ is equal to 1, nDp is set equal to 0

When nDq is greater than 0 and pred_mode_plt_flag of the coding unit that includes the coding block containing the sample $q_0$ is equal to 1, nDq is set equal to 0

{{When nDp is greater than 0 and loop_filter_across_subpic_enabled_flag[subPicIdxP] is equal to 0, nDp is set equal to 0, wherein subPicIdxP is the sub-picture index of the sub-picture containing the sample $p_0$.}}

{{When nDq is greater than 0 and loop_filter_across_subpic_enabled_flag[subPicIdxQ] is equal to 0, nDq is set equal to 0, wherein subPicIdxQ is the sub-picture index of the sub-picture containing the sample $q_0$.}}

Filtering Process for a Luma Sample Using Long Filters

Inputs to this process are:

the variables maxFilterLengthP and maxFilterLengthQ, the sample values $p_i$ and $q_j$ with i=0.. maxFilterLengthP and j=0.. maxFilterLengthQ, the locations of $p_i$ and $q_j$, $(xP_i, yP_i)$ and $(xQ_j, yQ_j)$ with i=0.. maxFilterLengthP−1 and j=0.. maxFilterLengthQ−1, a variable $t_C$.

Outputs of this process are:

the filtered sample values $p_i'$ and $q_j'$ with i=0.. maxFilterLengthP−1, j=0.. maxFilterLenghtQ−1.

The variable refMiddle is derived as follows:

If maxFilterLengthP is equal to maxFilterLengthQ and maxFilterLengthP is equal to 5, the following applies:

$$refMiddle=(p_4+p_3+2*(p_2+p_1+p_0+q_0+q_1+q_2)+q_3+q_4+8)>>4 \quad (8-1164)$$

Otherwise, if maxFilterLengthP is equal to maxFilterLengthQ and maxFilterLengthP is not equal to 5, the following applies:

$$refMiddle=(p_6+p_5+p_4+p_3+p_2+p_1+2*(p_0+q_0)+q_1+q_2+q_3+q_4+q_5+q_6+8)>>4 \quad (8-1165)$$

Otherwise, if one of the following conditions are true, maxFilterLengthQ is equal to 7 and maxFilterLengthP is equal to 5, maxFilterLengthQ is equal to 5 and maxFilterLengthP is equal to 7, the following applies:

$$refMiddle=(p_5+p_4+p_3+p_2+2*(p_1+p_0+q_0+q_1)+q_2+q_3+q_4+q_{5+8})>>4 \quad (8-1166)$$

Otherwise, if one of the following conditions are true, maxFilterLengthQ is equal to 5 and maxFilterLengthP is equal to 3, maxFilterLengthQ is equal to 3 and maxFilterLengthP is equal to 5, the following applies:

$$refMiddle=(p_3+p_2+p_1+p_0+q_0+q_1+q_2+q_3+4)>>3 \quad (8-1167)$$

Otherwise, if maxFilterLengthQ is equal to 7 and maxFilterLengthP is equal to 3, the following applies:

$$refMiddle=(2*(p_2+p_1+p_0+q_0)+p_0+p_i+q_1+q_2+q_3+q_4+q_5+q_6+8)>>4 \quad (8-1168)$$

Otherwise, the following applies:

$$refMiddle=(p_6+p_5+p_4+p_3+p_2+p_1+2*(q_2+q_1+q_0+p_0)+q_0+q_1+8)>>4 \quad (8-1169)$$

The variables refP and refQ are derived as follows:

$$refP=(p_{maxFilterLengtP}+p_{maxFilterLengthP-1}+1)>>1 \quad (8-1170)$$

$$refQ=(q_{maxFilterLengtQ}+q_{maxFilterLengthQ-1}+1)>>1 \quad (8-1171)$$

The variables $f_i$ and $t_CPD_i$ are defined as follows:

If maxFilterLengthP is equal to 7, the following applies:

$$f_{0..6}=\{59, 50, 41, 32, 23, 14, 5\} \quad (8-1172)$$

$$t_CPD_{0..6}=\{6, 5, 4, 3, 2, 1,1\} \quad (8-1173)$$

Otherwise, if maxFilterLengthP is equal to 5, the following applies:

$$f_{0..4}=\{58, 45, 32, 19, 6\} \quad (8-1174)$$

$$t_CPD_{0..4}=\{6, 5, 4, 3, 2\} \quad (8-1175)$$

Otherwise, the following applies:

$$f_{0..2}=\{53, 32, 11\} \quad (8-1176)$$

$$t_CPD_{0..2}=\{6,4,2\} \quad (8-1177)$$

The variables $g_j$ and $t_CQD_j$ are defined as follows:

If maxFilterLengthQ is equal to 7, the following applies:

$$g_{0..6}=\{59, 50, 41, 32, 23, 14, 5\} \quad (8-1178)$$

$$t_CQD_{0..6}=\{6, 5,4, 3, 2, 1,1\} \quad (8-1179)$$

Otherwise, if maxFilterLengthQ is equal to 5, the following applies:

$$g_{0..4}=\{58, 45, 32, 19, 6\} \quad (8-1180)$$

$$t_CQD_{0..4}=\{6,5,4, 3,2\} \quad (8-1181)$$

Otherwise, the following applies:

$$g_{0..2}=\{53, 32, 11\} \quad (8-1182)$$

$$t_CQD_{0..2}=\{6,4,2\} \quad (8-1183)$$

The filtered sample values $p_i'$ and $q_j'$ with i=0.. maxFilterLengthP−1 and j=0.. maxFilterLengthQ−1 are derived as follows:

$$p_i'=Clip3(p_i-(t_C*t_CPD_i)>>1, p_i+(t_C*t_CPD_i)>>1, (refMiddle*f_i+refP*(64-f_i)+32)>>6) \quad (8-1184)$$

$$q_i'=Clip3(q_i-(t_C*t_CQD_j)>>1, q_j+(t_C*t_CQD_j)>>1, (refMiddle*g_j+refQ*(64-g_j)+32)>>6) \quad (8-1185)$$

When pred_mode_plt_flag of the coding unit that includes the coding block containing the sample $p_i$ is equal to 1, the filtered sample value, $p_i'$ is substituted by the corresponding input sample value $p_i$ with i=0.. maxFilterLengthP−1.

When pred_mode_plt_flag of the coding unit that includes the coding block containing the sample $q_i$ is equal to 1, the filtered sample value, $q_i'$ is substituted by the corresponding input sample value $q_j$ with j=0.. maxFilterLengthQ−1.

{{When loop_filter_across_subpic_enabled_flag[subPicIdxP] is equal to 0, wherein subPicIdxP is the sub-picture index of the sub-picture containing the sample $p_0$, the filtered sample value, $p_i'$ is substituted by the corresponding input sample value $p_i$ with i=0.. maxFilterLengthP−1.}}

{{When loop_filter_across_subpic_enabled_flag[subPicIdxQ] is equal to 0, wherein subPicIdxQ is the sub-picture index of the sub-picture containing the sample $q_0$, the filtered sample value, $q_i'$ is substituted by the corresponding input sample value $q_j$ with j=0.. maxFilterLengthQ−1.}}

Filtering process for a chroma sample

This process is only invoked when ChromaArrayType is not equal to 0.

Inputs to this process are:

the variable maxFilterLength, the chroma sample values p; and $q_i$ with i=0.. maxFilterLengthCbCr, the chroma locations of $p_i$ and $q_i$, $(xP_i, yP_i)$ and $(xQ_i, yQ_i)$ with i=0.. maxFilterLengthCbCr−1, a variable $t_C$.

Outputs of this process are the filtered sample values $p_i'$ and $q_i'$ with i=0.. maxFilterLengthCbCr−1.

The filtered sample values $p_i'$ and $q_i'$ with i=0.. maxFilterLengthCbCr−1 are derived as follows:

If maxFilterLengthCbCr is equal to 3, the following strong filtering applies:

$$p_0'=\text{Clip3}(p_0-t_C,\ p_0+t_C,\ (p_3+p_2+p_1+2*p_0+q_0+q_1+q_2+4)>>3) \quad (8\text{-}1186)$$

$$p_1'=\text{Clip3}(p_1-t_C,\ p_1+t_C,\ (2*p_3+p_2+2*p_1+p_0+q_0+q_1+4)>>3) \quad (8\text{-}1187)$$

$$p_2'=\text{Clip3}(p_2-t_C,\ p_2+t_C,\ (3*p_3+2*p_2+p_1+p_0+q_0+4)>>3) \quad (8\text{-}1188)$$

$$q_0'=\text{Clip3}(q_0-t_C,\ q_0+t_C,\ (p_2+p_1+p_0+2*q_0+q_1+q_2+q_3+4)>>3) \quad (8\text{-}1189)$$

$$q_1'=\text{Clip3}(q_1-t_C,\ q_1+t_C,\ (p_1+p_0+q_0+2*q_1+q_2+2*q_3+4)>>3) \quad (8\text{-}1190)$$

$$q_2'=\text{Clip3}(q_2-t_C,\ q_2+t_C,\ (p_0+q_0+q_1+2*q_2+3*q_3+4)>>3) \quad (8\text{-}1191)$$

Otherwise, the following weak filtering applies:

$$\Delta=\text{Clip3}(-t_C,\ t_C,\ ((((q_0-p_0)<<2)+p_1-q_1+4)>>3)) \quad (8\text{-}1192)$$

$$p_0'=\text{Clip1}(p_0+\Delta) \quad (8\text{-}1193)$$

$$q_0'=\text{Clip1}(q_0-\Delta) \quad (8\text{-}1194)$$

When pred_mode_plt_flag of the coding unit that includes the coding block containing the sample $p_i$ is equal to 1, the filtered sample value, $p_i'$ is substituted by the corresponding input sample value $p_i$ with i=0.. maxFilterLengthCbCr-1.

When pred_mode_plt_flag of the coding unit that includes the coding block containing the sample $q_i$ is equal to 1, the filtered sample value, $q_i'$ is substituted by the corresponding input sample value $q_i$ with i=0.. maxFilterLengthCbCr-1:

{{When loop_filter_across_subpic_enabled_flag[subPicIdxP] is equal to 0, wherein subPicIdxP is the sub-picture index of the sub-picture containing the sample $p_0$, the filtered sample value, $p_i'$ is substituted by the corresponding input sample value $p_i$ with i=0.. maxFilterLengthCbCr-1.}}

{{When loop_filter_across_subpic_enabled_flag[subPicIdxQ] is equal to 0, wherein subPicIdxQ is the sub-picture index of the sub-picture containing the sample $q_0$, the filtered sample value, $q_i'$ is substituted by the corresponding input sample value $q_i$ with i=0.. maxFilterLengthCbCr-1: }}

5.13 Embodiment: Deblocking Considering Sub-Pictures (Solution #2)

8.8.3 Deblocking Filter Process 8.8.3.1 General

Inputs to this process are the reconstructed picture prior to deblocking, i.e., the array $\text{recPicture}_L$ and, when ChromaArrayType is not equal to 0, the arrays $\text{recPicture}_{Cb}$ and $\text{recPicture}_{Cr}$.

Outputs of this process are the modified reconstructed picture after deblocking, i.e., the array $\text{recPicture}_L$ and, when ChromaArrayType is not equal to 0, the arrays $\text{recPicture}_{Cb}$ and $\text{recPicture}_{Cr}$.

. . .

The deblocking filter process is applied to all coding subblock edges and transform block edges of a picture, except the following types of edges:

Edges that are at the boundary of the picture,

[[Edges that coincide with the boundaries of a sub-picture for which loop_filter_across_subpic_enabled_flag [SubPicIdx] is equal to 0,]]

{{Edges that coincide with the boundaries of a sub-picture X and loop_filter_across_subpic_enabled_flag [SubPicXIdx] is equal to 0, wherein SubPicXidx is the sub-picture index of the sub-picture X.}}

Edges that coincide with the virtual boundaries of the picture when

VirtualBoundariesDisabledFlag is equal to 1, . . .

. . .

8.8.3.2 Deblocking Filter Process for One Direction

Inputs to this process are:

the variable treeType specifying whether the luma (DUAL_TREE_LUMA) or chroma components (DUAL_TREE_CHROMA) are currently processed,

. . .

3. The variable filterEdgeFlag is derived as follows:

If edgeType is equal to EDGE_VER and one or more of the following conditions are true, filterEdgeFlag is set equal to 0:

The left boundary of the current coding block is the left boundary of the picture.

[[The left boundary of the current coding block is the left or right boundary of the sub-picture and loop_filter_across_subpic_enabled_flag[SubPicIdx] is equal to 0.]]

{{The left boundary of the current coding block concides with a left or a right boundary of a sub-picture X and loop_filter_across_subpic_enabled_flag[SubPicXIdx] is equal to 0, wherein SubPicXidx is the sub-picture index of the sub-picture X.}}

. . .

Otherwise, if edgeType is equal to EDGE_HOR and one or more of the following conditions are true, the variable filterEdgeFlag is set equal to 0:

The top boundary of the current luma coding block is the top boundary of the picture.

[[The top boundary of the current coding block is the top or bottom boundary of the sub-picture and loop_filter_across_subpic_enabled_flag[SubPicIdx] is equal to 0.]]

{{The top boundary of the current coding block concides with a top or a bottom boundary of a sub-picture X and loop_filter_across_subpic_enabled_flag[SubPicXIdx] is equal to 0, wherein SubPicXidx is the sub-picture index of the sub-picture X.}}

Figure 3:
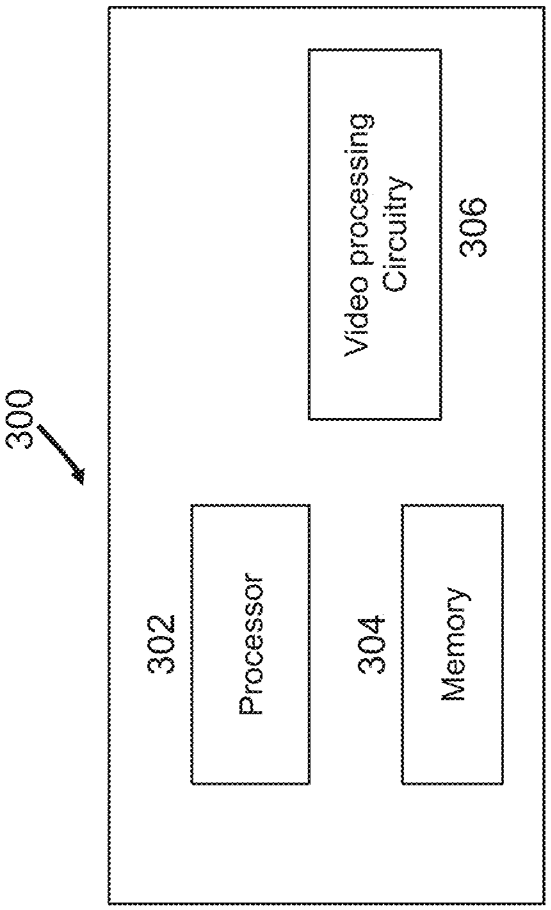
FIG. 3 is a block diagram of an example of a hardware platform used for implementing techniques described in the present document.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 302, one or more memories 304 and video processing hardware 306. The processor(s) 302 may be configured to implement one or more methods described in the present document. The memory (memories) 304 may be used for storing data and code used for implementing the methods and techniques described herein. The video processing hardware 306 may be used to implement, in hardware circuitry, some techniques described in the present document.

Figure 4:
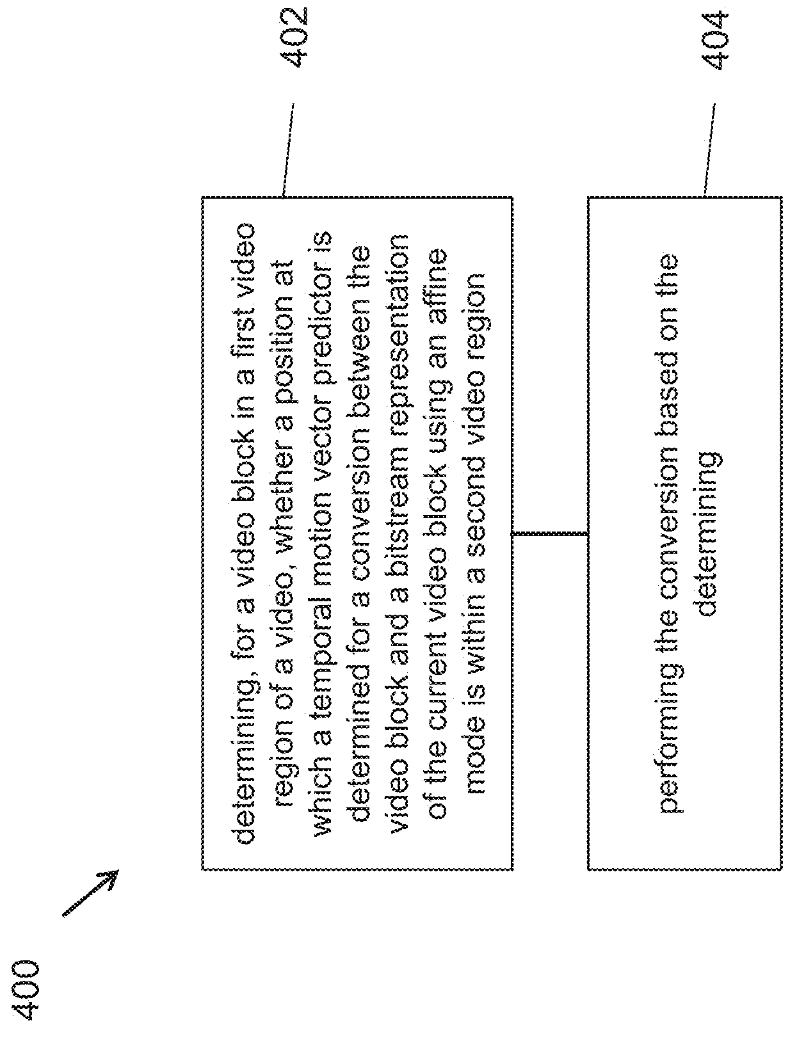
FIG. 4 is a flowchart for an example method of video processing.

FIG. 4 is a flowchart for a method 400 of processing a video. The method 400 includes determining (402), for a video block in a first video region of a video, whether a position at which a temporal motion vector predictor is determined for a conversion between the video block and a bitstream representation of the current video block using an affine mode is within a second video region, and performing (404) the conversion based on the determining.

The following solutions may be implemented as preferred solutions in some embodiments.

The following solutions may be implemented together with additional techniques described in items listed in the previous section (e.g., item 1).

1. A method of video processing, comprising: determining, for a video block in a first video region of a video, whether a position at which a temporal motion vector predictor is determined for a conversion between the video block and a bitstream representation of the current video block using an affine mode is within a second video region; and performing the conversion based on the determining.
2. The method of solution 1, wherein the video block is covered by the first region and the second region.
3. The method of any of solutions 1-2, wherein, in case that the position of the temporal motion vector predictor is outside of the second video region, then the temporal motion vector predictor is marked as unavailable and is unused in the conversion.

The following solutions may be implemented together with additional techniques described in items listed in the previous section (e.g., item 2).

4. A method of video processing, comprising: determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.
5. The method of solution 4, wherein the video block is covered by the first region and the second region.
6. The method of any of solutions 4-5, wherein, in case that the position of the sample is outside of the second video region, then the sample is marked as unavailable and is unused in the conversion.

The following solutions may be implemented together with additional techniques described in items listed in the previous section (e.g., item 3).

7. A method of video processing, comprising: determining, for a video block in a first video region of a video, whether a position at which a reconstructed luma sample value is fetched for a conversion between the video block and a bitstream representation of the current video block is within a second video region; and performing the conversion based on the determining.
8. The method of solution 7, wherein the luma sample is covered by the first region and the second region.
9. The method of any of solutions 7-8, wherein, in case that the position of the luma sample is outside of the second video region, then the luma sample is marked as unavailable and is unused in the conversion.

The following solutions may be implemented together with additional techniques described in items listed in the previous section (e.g., item 4).

10. A method of video processing, comprising: determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.
11. The method of solution 10, wherein the position is covered by the first region and the second region.
12. The method of any of solutions 10-11, wherein, in case that the position is outside of the second video region, then the luma sample is marked as unavailable and is unused in the conversion.

The following solutions may be implemented together with additional techniques described in items listed in the previous section (e.g., item 8).

13. A method of video processing, comprising: performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.
14. The method of solution 13, wherein the video unit corresponds to a sequence of the one or more video pictures.
15. The method of any of solutions 13-14, wherein the dynamic resolution conversion coding/decoding tool comprises an adaptive resolution conversion coding/decoding tool.
16. The method of any of solutions 13-14, wherein the dynamic resolution conversion coding/decoding tool comprises a dynamic resolution conversion coding/decoding tool.
17. The method of any of solutions 13-16, wherein the coded representation indicates that the video unit complies with the coding syntax requirement.
18. The method of solution 17, wherein the coded representation indicates that the video unit uses sub-picture coding.
19. The method of solution 17, wherein the coded representation indicates that the video unit uses the dynamic resolution conversion coding/decoding tool or the reference picture resampling tool.

The following solutions may be implemented together with additional techniques described in items listed in the previous section (e.g., item 10).

20. The method of any of solutions 1-19, wherein the second video region comprises a video sub-picture and wherein boundaries of the second video region and another video region is also a boundary between two coding tree units.
21. The method of any of solutions 1-19, wherein the second video region comprises a video sub-picture and wherein boundaries of the second video region and another video region is also a boundary between two coding tree units.

The following solutions may be implemented together with additional techniques described in items listed in the previous section (e.g., item 11).

22. The method of any of solutions 1-21, wherein the first video region and the second video region have rectangular shapes.

The following solutions may be implemented together with additional techniques described in items listed in the previous section (e.g., item 12).

23. The method of any of solutions 1-22, wherein the first video region and the second video region are non-overlapping.

The following solutions may be implemented together with additional techniques described in items listed in the previous section (e.g., item 13).

24. The method of any of solutions 1-23, wherein the video picture is divided into video regions such that a pixel in the video picture is covered by one and only one video region.

The following solutions may be implemented together with additional techniques described in items listed in the previous section (e.g., item 15).

25. The method of any of solutions 1-24, wherein the video picture is split into the first video region and the second video region due to the video picture being in a specific layer of the video sequence.

The following solutions may be implemented together with additional techniques described in items listed in the previous section (e.g., item 10).

26. A method of video processing, comprising: performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

27. The method of solution 26, wherein a codeword representing the first syntax element is not larger than a codeword representing the second syntax element.

28. The method of any of solutions 1-27, wherein the first video region comprises a video sub-picture.

29. The method of any of solutions 1-28, wherein the second video region comprises a video sub-picture.

30. The method of any of solutions 1 to 29, wherein the conversion comprises encoding the video into the coded representation.

31. The method of any of solutions 1 to 29, wherein the conversion comprises decoding the coded representation to generate pixel values of the video.

32. A video decoding apparatus comprising a processor configured to implement a method recited in one or more of solutions 1 to 31.

33. A video encoding apparatus comprising a processor configured to implement a method recited in one or more of solutions 1 to 31.

34. A computer program product having computer code stored thereon, the code, when executed by a processor, causes the processor to implement a method recited in any of solutions 1 to 31.

35. A method, apparatus or system described in the present document.

Figure 13:
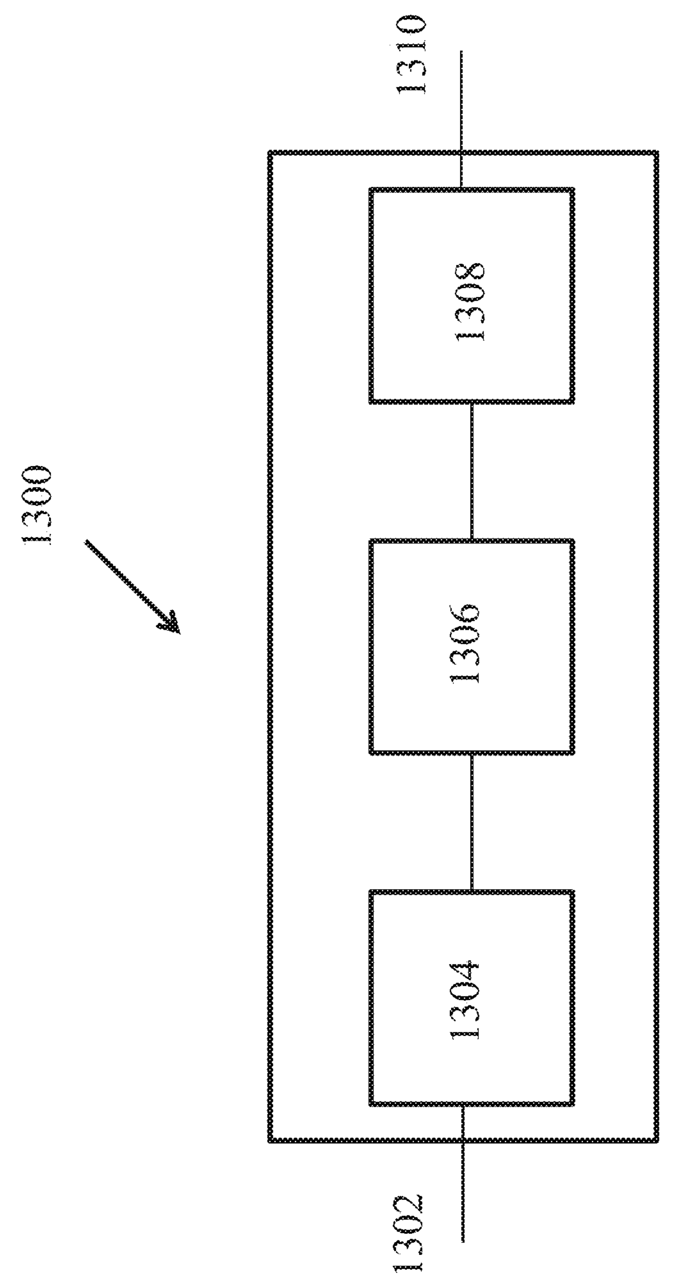
FIG. 13 is a block diagram showing an example video processing system in which various techniques disclosed herein may be implemented.

FIG. 13 is a block diagram showing an example video processing system 1300 in which various techniques disclosed herein may be implemented. Various implementations may include some or all of the components of the system 1300. The system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1300 may include a coding component 1304 that may implement the various coding or encoding methods described in the present document. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), Peripheral Component Interconnect (PCI), Integrated Device Electronics (IDE) interface, and the like. The techniques described in the present document may be embodied in various electronic devices such as mobile phones, laptops, smartphones or other devices that are capable of performing digital data processing and/or video display.

Figure 14:
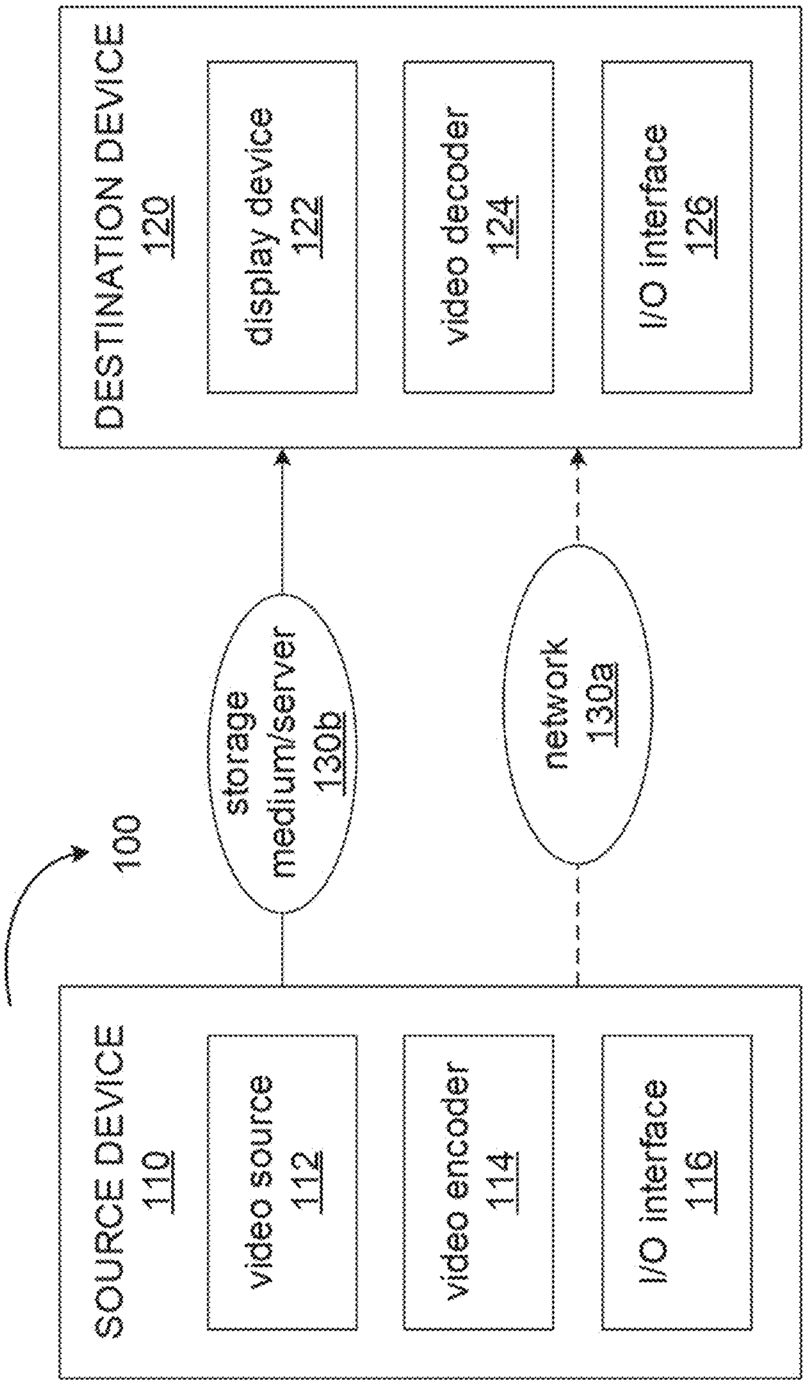
FIG. 14 is a block diagram that illustrates an example video coding system.

FIG. 14 is a block diagram that illustrates an example video coding system 100 that may utilize the techniques of this disclosure.

As shown in FIG. 14, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the HEVC standard, VVC standard and other current and/or further standards.

FIG. 15 is a block diagram illustrating an example of video encoder 200, which may be video encoder 114 in the system 100 illustrated in FIG. 14.

Video encoder 200 may be configured to perform any or all of the techniques of this disclosure. In the example of FIG. 15, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 15 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

FIG. 16 is a block diagram illustrating an example of video decoder 300 which may be video decoder 124 in the system 100 illustrated in FIG. 14.

The video decoder 300 may be configured to perform any or all of the techniques of this disclosure. In the example of FIG. 16, the video decoder 300 includes a plurality of functional components. The techniques described in this disclosure may be shared among the various components of the video decoder 300. In some examples, a processor may be configured to perform any or all of the techniques described in this disclosure.

In the example of FIG. 16, video decoder 300 includes an entropy decoding unit 301, a motion compensation unit 302, an intra prediction unit 303, an inverse quantization unit 304, an inverse transformation unit 305, a reconstruction unit 306 and a buffer 307. Video decoder 300 may, in some examples, perform a decoding pass generally reciprocal to the encoding pass described with respect to video encoder 200 (e.g., FIG. 15).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 17:
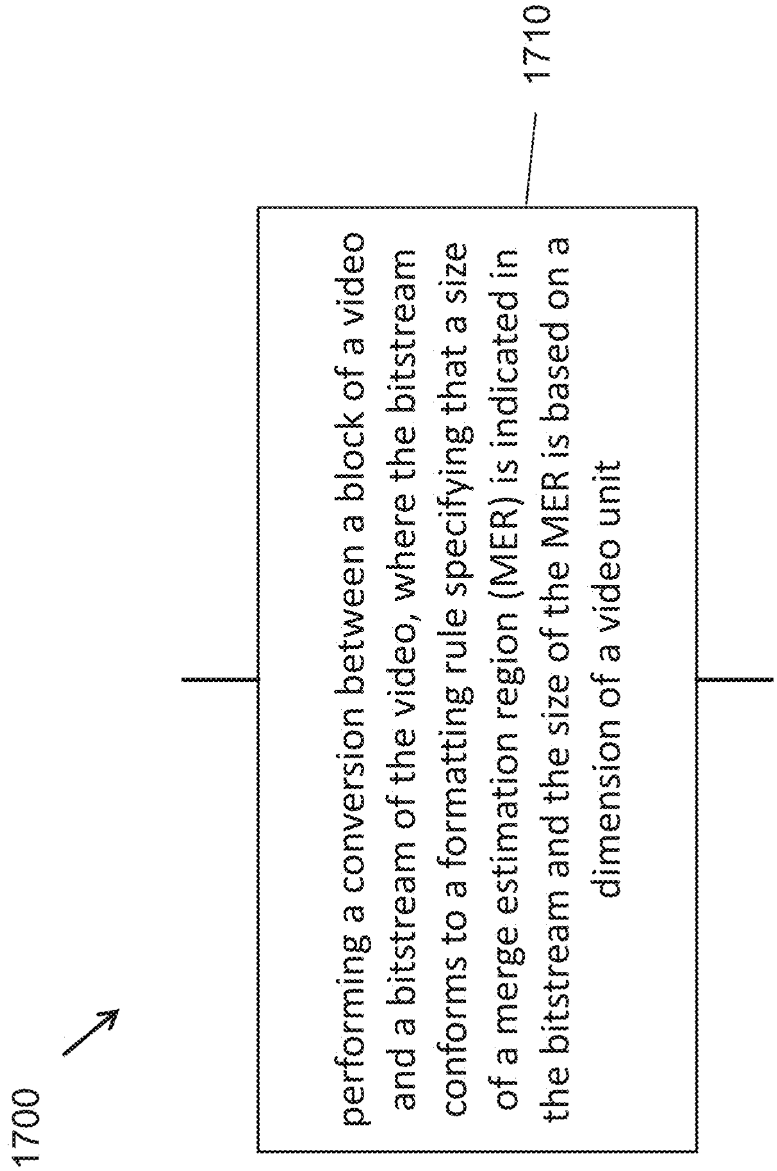
FIG. 17 is a flowchart representation of a method for video processing in accordance with the present technology.

FIG. 17 is a flowchart representation of a method 1700 for video processing in accordance with the present technology. The method 1700 includes, at operation 1710, performing a conversion between a block of a video and a bitstream of the video. The bitstream conforms to a formatting rule specifying that a size of a merge estimation region (MER) is indicated in the bitstream and the size of the MER is based on a dimension of a video unit. The MER comprises a region used for deriving a motion candidate for the conversion.

In some embodiments, the video unit comprises a coding unit or a coding tree unit. In some embodiments, the dimension of the video unit comprises at least a width, a height, or an area of the video unit. In some embodiments, the dimension of the MER is constrained to be smaller than the dimension of the video unit. In some embodiments, the dimension of the MER is constrained to be smaller than or equal to the dimension of the video unit.

In some embodiments, the dimension of the MER is indicated as an index value in the bitstream. In some embodiments, the index value has a one-to-one mapping relationship with the dimension of the MER. In some embodiments, the dimension of the MER or the index value is coded in the bitstream based on an exponential Golomb code. In some embodiments, the dimension of the MER or the index value is coded in the bitstream based on a unary code, a rice code, or a fixed length code. In some embodiments, the index indicating the dimension of the MER is represented as S-A or M-S in the bitstream representation, where S represents the dimension of the MER, and A and/or M are integer values. In some embodiments, the A and/or M are determined based on the dimension of the maximum or minimum video unit. In some embodiments, A is equal to the dimension of the minimum video unit. In some embodiments, M is equal to the dimension of the maximum video unit. In some embodiments, A is equal to (the dimension of the minimum video unit+offset), offset being an integer. In some embodiments, M is equal to (the dimension of the maximum video unit+offset), offset being an integer. In some embodiments, the offset is equal to 1 or −1.

Figure 18:
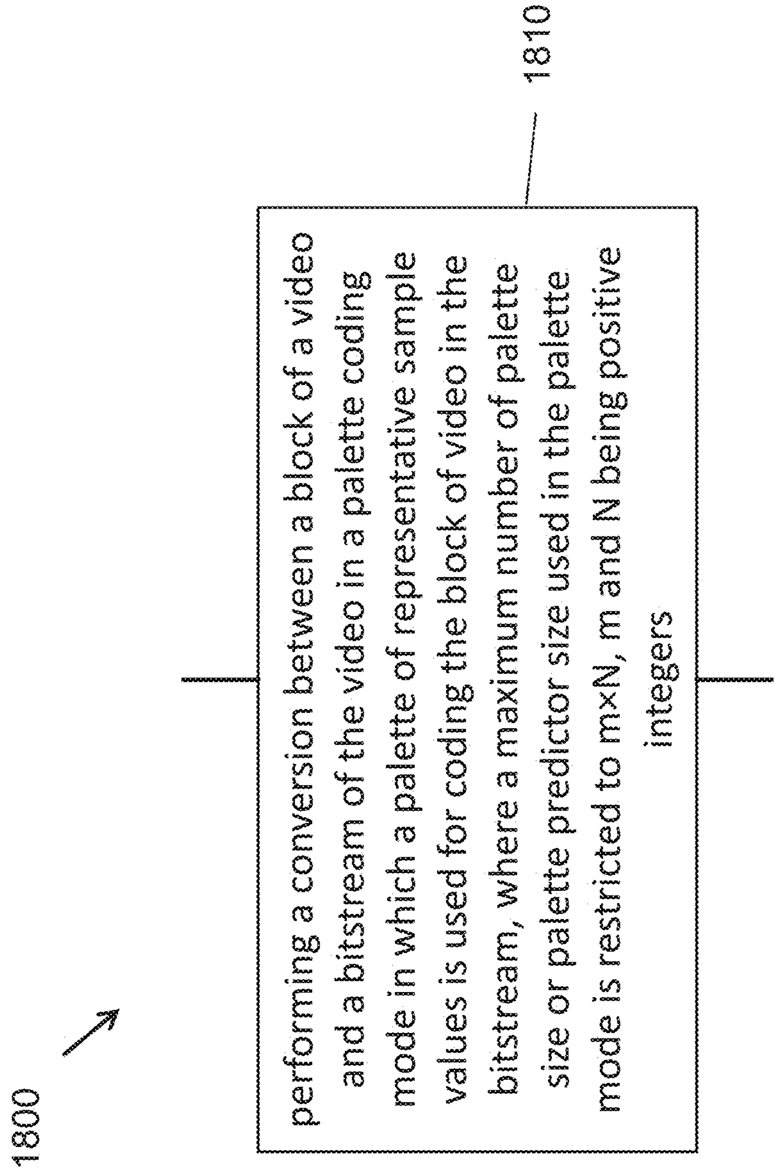
FIG. 18 is a flowchart representation of another method for video processing in accordance with the present technology.

FIG. 18 is a flowchart representation of a method 1800 for video processing in accordance with the present technology. The method 1800 includes, at operation 1810, performing a conversion between a block of a video and a bitstream of the video in a palette coding mode in which a palette of representative sample values is used for coding the block of video in the bitstream. A maximum number of palette size or palette predictor size used in the palette mode is restricted to m×N, m and N being positive integers.

In some embodiments, N is equal to 8. In some embodiments, a value associated with m is signaled as a syntax element in the bitstream. In some embodiments, the value comprises m or m+offset, where offset is an integer. In some embodiments, the syntax element is binarized in the bitstream based on unary coding, exponential Golomb coding, rice coding, or fixed length coding.

Figure 19:
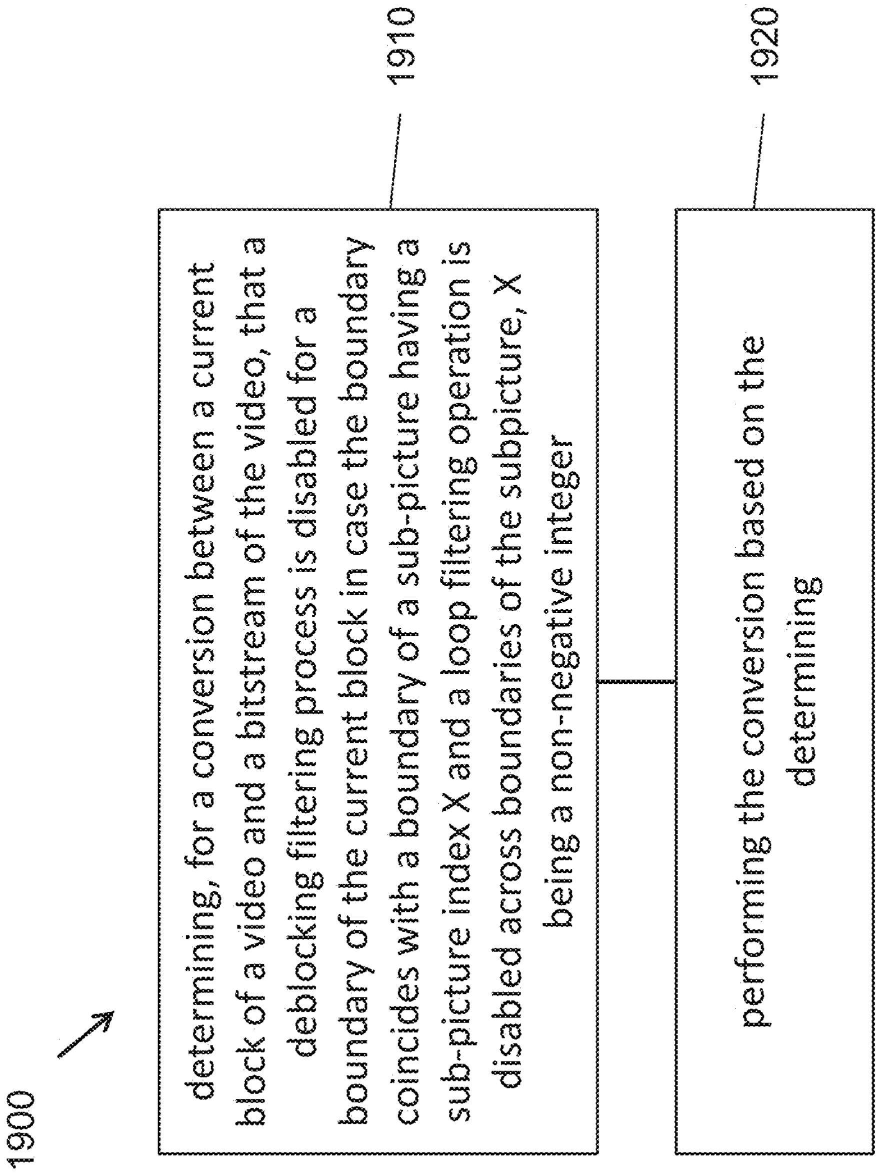
FIG. 19 is a flowchart representation of yet another method for video processing in accordance with the present technology.

FIG. 19 is a flowchart representation of a method 1900 for video processing in accordance with the present technology. The method 1900 includes, at operation 1910, determining, for a conversion between a current block of a video and a bitstream of the video, that a deblocking filtering process is disabled for a boundary of the current block in case the boundary coincides with a boundary of a sub-picture having a sub-picture index X and a loop filtering operation is disabled across boundaries of the subpicture, X being a non-negative integer. The method 1900 also includes, at operation 1920, performing the conversion based on the determining.

In some embodiments, the deblocking filtering process is applicable to vertical boundaries, and the deblocking filtering process is disabled for a left boundary of the current block in case the left boundary coincides with a left or a right boundary of the sub-picture having the sub-picture index X and the loop filtering operation is disabled across boundaries of the subpicture. In some embodiments, the deblocking filtering process is applicable to horizontal boundaries, and the deblocking filtering process is disabled for a top boundary of the current block in case the top boundary coincides with a top or a bottom boundary of the sub-picture having the sub-picture index X and the loop filtering operation is disabled across boundaries of the subpicture.

In some embodiments, the conversion generates the video from the bitstream representation. In some embodiments, the conversion generates the bitstream representation from the video.

In one example aspect, a method for storing bitstream of a video includes generating a bitstream of the video from a block and storing the bitstream in a non-transitory computer-readable recording medium. The bitstream conforms to a formatting rule that specifies a size of a merge estimation region (MER) is indicated in the bitstream and the size of the MER is based on a dimension of a size of a video unit. The MER comprises a region used for deriving a motion candidate for the conversion.

In another example aspect, a method for storing bitstream of a video includes applying, during a conversion between a block of a video and a bitstream of the video, a palette coding mode in which a palette of representative sample values is used for coding the block of video in the bitstream, generating the bitstream from the block based on the applying, and storing the bitstream in a non-transitory computer-readable recording medium. A maximum number of palette size or palette predictor size used in the palette mode is restricted to m×N, m and N being positive integers.

In yet another example aspect, a method for storing bitstream of a video includes determining that a deblocking filtering process is disabled for a boundary of a current block in case the boundary coincides with a boundary of a sub-picture having a sub-picture index X and a loop filtering operation is disabled across boundaries of the subpicture, X being a non-negative integer. The method also includes generating the bitstream from the current block based on the determining and storing the bitstream in a non-transitory computer-readable recording medium.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, for a conversion between a current block of a video and a bitstream of the video, that a first prediction mode is applied to the current block;

maintaining a predictor palette table;

constructing, in the first prediction mode, a current palette comprising one or more palette predictors for the current block based on the predictor palette table; and performing the conversion based on the first prediction mode, wherein in the first prediction mode, reconstructed samples of the current block are represented by a set of representative color values, and the set of representative color values comprises at least one of 1) palette predictors derived from the current palette, 2) escaped samples, or 3) palette information included in the bitstream, wherein a maximum number of entries in the current palette is restricted to m×8, and a maximum number of entries in the predictor palette table are restricted to n×8, and wherein m and n are positive integers, and m and n are equal to 8;

wherein a syntax element indicating a parallel merge estimation level is included in the bitstream, and wherein a maximum value of the syntax element depends on a size of a coding tree unit (CTU);

wherein the maximum value of the syntax element is not allowed to be larger than the size of the CTU;

wherein the predictor palette table is initialized at beginning of each slice or each tile, otherwise the predictor palette table is initialized when a first set of conditions are satisfied and at least that a variable indicating availability of a spatial neighbouring block is not equal to 1; and wherein the predictor palette table is initialized when the first set of conditions are not satisfied.

2. The method of claim 1, wherein the syntax element is coded by an exponential Golomb code.

3. The method of claim 1, wherein the conversion includes encoding the current block into the bitstream.

4. The method of claim 1, wherein the conversion includes decoding the current block from the bitstream.

5. The method of claim 1, wherein the first set of conditions comprise that an entropy coding synchronization enabled flag is equal to 1.

6. An apparatus for processing video data comprising a processor and a non-transitory memory with instructions thereon, wherein the instructions upon execution by the processor, cause the processor to:

determine, for a conversion between a current block of a video and a bitstream of the video, that a first prediction mode is applied to the current block;

maintain a predictor palette table;

construct, in the first prediction mode, a current palette comprising one or more palette predictors for the current block based on the predictor palette table; and perform the conversion based on the first prediction mode, wherein in the first prediction mode, reconstructed samples of the current block are represented by a set of representative color values, and the set of representative color values comprises at least one of 1) palette predictors derived from the current palette, 2) escaped samples, or 3) palette information included in the bitstream, wherein a maximum number of entries in the current palette is restricted to m×8, and a maximum number of entries in the predictor palette table are restricted to n×8, and wherein m and n are positive integers, and m and n are equal to 8;

wherein a syntax element indicating a parallel merge estimation level is included in the bitstream, and wherein a maximum value of the syntax element depends on a size of a coding tree unit (CTU);

wherein the maximum value of the syntax element is not allowed to be larger than the size of the CTU;

wherein the predictor palette table is initialized at beginning of each slice or each tile, otherwise the predictor palette table is initialized when a first set of conditions are satisfied and at least that a variable indicating availability of a spatial neighbouring block is not equal to 1; and wherein the predictor palette table is initialized when the first set of conditions are not satisfied.

7. The apparatus of claim 6, wherein the syntax element is coded by an exponential Golomb code.

8. The apparatus of claim 6, wherein the conversion includes encoding the current block into the bitstream.

9. The apparatus of claim 6, wherein the conversion includes decoding the current block from the bitstream.

10. A non-transitory computer-readable storage medium storing instructions that cause a processor to:

determine, for a conversion between a current block of a video and a bitstream of the video, that a first prediction mode is applied to the current block;

maintain a predictor palette table;

construct, in the first prediction mode, a current palette comprising one or more palette predictors for the current block based on the predictor palette table; and perform the conversion based on the first prediction mode, wherein in the first prediction mode, reconstructed samples of the current block are represented by a set of representative color values, and the set of representative color values comprises at least one of 1) palette predictors derived from the current palette, 2) escaped samples, or 3) palette information included in the bitstream, wherein a maximum number of entries in the current palette is restricted to m×8, and a maximum number of entries in the predictor palette table are restricted to n×8, and wherein m and n are positive integers, and m and n are equal to 8;

wherein a syntax element indicating a parallel merge estimation level is included in the bitstream, and wherein a maximum value of the syntax element depends on a size of a coding tree unit (CTU);

wherein the maximum value of the syntax element is not allowed to be larger than the size of the CTU;

wherein the predictor palette table is initialized at beginning of each slice or each tile, otherwise the predictor palette table is initialized when a first set of conditions are satisfied and at least that a variable indicating availability of a spatial neighbouring block is not equal to 1; and wherein the predictor palette table is initialized when the first set of conditions are not satisfied.

11. The non-transitory computer-readable storage medium of claim 10, wherein the syntax element is coded by an exponential Golomb code.

12. A method for storing a bitstream of a video, comprising:

determining that a first prediction mode is applied to a current block of a video;

maintaining a predictor palette table;

constructing, in the first prediction mode, a current palette comprising one or more palette predictors for the current block based on the predictor palette table;

generating the bitstream based on the first prediction mode; and storing the bitstream in a non-transitory computer-readable recording medium, wherein in the first prediction mode, reconstructed samples of the current block are represented by a set of representative color values, and the set of representative color values comprises at least one of 1) palette predictors derived from the current palette, 2) escaped samples, or 3) palette information included in the bitstream, wherein a maximum number of entries in the current palette is restricted to m×8, and a maximum number of entries in the predictor palette table are restricted to n×8, and wherein m and n are positive integers, and m and n are equal to 8;

wherein a syntax element indicating a parallel merge estimation level is included in the bitstream, and wherein a maximum value of the syntax element depends on a size of a coding tree unit (CTU);

wherein the maximum value of the syntax element is not allowed to be larger than the size of the CTU;

wherein the predictor palette table is initialized at beginning of each slice or each tile, otherwise the predictor palette table is initialized when a first set of conditions are satisfied and at least that a variable indicating availability of a spatial neighbouring block is not equal to 1; and wherein the predictor palette table is initialized when the first set of conditions are not satisfied.

* * * * *